United States Patent
Chadeayne

(10) Patent No.: US 12,497,361 B2
(45) Date of Patent: Dec. 16, 2025

(54) CRYSTALLINE TRYPTAMINE COMPOUNDS

(71) Applicant: CAAMTECH, INC., Issaquah, WA (US)

(72) Inventor: Andrew R. Chadeayne, Issaquah, WA (US)

(73) Assignee: CAAMTECH, INC., Issaquah, WA (US)

( * ) Notice: Subject to any disclaimer, the term of this patent is extended or adjusted under 35 U.S.C. 154(b) by 0 days.

(21) Appl. No.: 18/700,875

(22) PCT Filed: Oct. 13, 2022

(86) PCT No.: PCT/US2022/078019
§ 371 (c)(1),
(2) Date: Apr. 12, 2024

(87) PCT Pub. No.: WO2023/064840
PCT Pub. Date: Apr. 20, 2023

(65) Prior Publication Data
US 2024/0409513 A1      Dec. 12, 2024

Related U.S. Application Data

(60) Provisional application No. 63/256,211, filed on Oct. 15, 2021, provisional application No. 63/256,158, (Continued)

(51) Int. Cl.
*A61K 31/4045* (2006.01)
*A61K 45/06* (2006.01)
*C07D 209/16* (2006.01)

(52) U.S. Cl.
CPC ........ *C07D 209/16* (2013.01); *A61K 31/4045* (2013.01); *A61K 45/06* (2013.01)

(58) Field of Classification Search
CPC ..... A61K 31/4045; A61K 45/06; A61P 25/28; A61P 25/18; A61P 25/26; C07D 209/16
See application file for complete search history.

(56) References Cited

U.S. PATENT DOCUMENTS

| | | |
|---|---|---|
| 2018/0221396 A1 | 8/2018 | Chadeayne |
| 2019/0142851 A1 | 5/2019 | Chadeayne |
| 2020/0370073 A1 | 11/2020 | Leo |
| 2021/0069170 A1 | 3/2021 | Stamets |
| 2021/0300870 A1 | 9/2021 | Chadeayne |

(Continued)

FOREIGN PATENT DOCUMENTS

WO      2021/041407 A1      3/2021

OTHER PUBLICATIONS

Dogan, The etiology of anxiety disorders, Anadolu Psikiyatri Dergisi, 2012, 13(3), pp. 224-231 (Year: 2012).*

(Continued)

*Primary Examiner* — Renee Claytor
*Assistant Examiner* — Andrew P Lee
(74) *Attorney, Agent, or Firm* — Raphael Bellum PLLC

(57) ABSTRACT

The disclosure relates to 2-(5-hydroxy-1H-indol-3-yl)ethan-1-aminium hydrate chloride (5-HT hydrochloride hydrate) and its crystalline form 1, and to pharmaceutical compositions containing 5-HT hydrochloride hydrate or its crystalline form 1 and to methods of treatment using them. The disclosure further relates to crystalline form 1 of (2E)-but-2-enedioic acid bis({2-[4-(acetyloxy)-1H-indol-3-yl]ethyl}(ethyl)propylazanium) (2E)-but-2-enedioate (4-AcO-EPT fumarate fumaric acid), and to pharmaceutical compositions containing crystalline form 1 of 4-AcO-EPT fumarate fumaric acid and to methods of treatment using it. The disclosure further relates to [2-(1H-indol-3-yl)ethyl](methyl)propylazanium iodide (MPT iodide) and its crystalline form 1, and to pharmaceutical compositions containing MPT iodide or its crystalline form 1 and to methods of treatment using them. The disclosure further relates to (Continued)

bis(ethyl[2-(1H-indol-3-yl)ethyl]propylazanium) (2E)-but-2-enedioate (EPT fumarate) and its crystalline form 1, and to pharmaceutical compositions containing EPT fumarate or its crystalline form 1 and to methods of treatment using them. EPT fumarate is a novel compound and crystalline form.

3 Claims, 11 Drawing Sheets

Related U.S. Application Data filed on Oct. 15, 2021, provisional application No. 63/256,233, filed on Oct. 15, 2021, provisional application No. 63/256,221, filed on Oct. 15, 2021.

(56) References Cited

OTHER PUBLICATIONS

Dolomanov, O. V., Bourhis, L. J., Gildea, R. J., Howard, J. A. K. & Puschmann, H. (2009). J. Appl. Cryst. 42, 339-341.

Sheldrick, G. M. (2015). Acta Cryst. C71, 3-8.
Balbach et al. (2004), "Pharmaceutical evaluation of early development candidates 'the 100 mg-approach'", International Journal of Pharmaceutics, 275, 1-12.
Singhal et al. (2004), "Drug polymorphism and dosage form design: a practical perspective", Advanced Drug Delivery Reviews, 56, 335-347.
Caira (1998), "Crystalline Polymorphism of Organic Compounds", Topics in Current Chemistry, 198, 163-208.
International Search Report and Written Opinion in International Application No. PCT/US2022/078019 dated Feb. 27, 2023.
International Preliminary Report on Patentability in International Application No. PCT/2022/078019 dated Apr. 25, 2024.
Serajuddin (2007), "Salt formation to improve drug solubility", Advanced Drug Delivery Reviews, 59, 603-616.
Byrn et al. (1995), "Pharmaceutical Solids: A Strategic Approach to Regulatory Considerations", Pharmaceutical Research, 12(7), 945-954.
Stahl (2003), "Preparation of Water-Soluble Compounds Through Salt Formation", The Practice of Medicinal Chemistry, 601-615.

* cited by examiner

CRYSTALLINE TRYPTAMINE COMPOUNDS

CROSS REFERENCE TO RELATED APPLICATIONS

This application claims priority to U.S. Provisional Application No. 63/256,158, filed on Oct. 15, 2021; U.S. Provisional Application No. 63/256,211, filed on Oct. 15, 2021; U.S. Provisional Application No. 63/256,221, filed on Oct. 15, 2021; and U.S. Provisional Application No. 63/256,233, filed on Oct. 15, 2021; the disclosures of which are incorporated by reference.

TECHNICAL FIELD

This disclosure relates to 2-(5-hydroxy-1H-indol-3-yl)ethan-1-aminium hydrate chloride (serotonin hydrochloride hydrate or 5-HT hydrochloride hydrate) and its crystalline form 1; to pharmaceutical compositions containing them; and to methods of treatment/therapeutic uses of 5-HT hydrochloride hydrate or crystalline form 1 of 5-HT hydrochloride hydrate.

This disclosure further relates to crystalline form 1 of (2E)-but-2-enedioic acid bis({2-[4-(acetyloxy)-1H-indol-3-yl]ethyl}(ethyl)propylazanium) (2E)-but-2-enedioate (4-AcO-EPT fumarate fumaric acid), to pharmaceutical compositions containing it, and to methods of treatment/therapeutic uses of crystalline form 1 of 4-AcO-EPT fumarate fumaric acid.

This disclosure further relates to [2-(1H-indol-3-yl)ethyl](methyl)propylazanium iodide (MPT iodide) and its crystalline form 1, to pharmaceutical compositions containing them, and to methods of treatment/therapeutic uses of MPT iodide or crystalline form 1 of MPT iodide.

This disclosure relates to bis(ethyl[2-(1H-indol-3-yl)ethyl]propylazanium) (2E)-but-2-enedioate (EPT fumarate) and its crystalline form 1; to pharmaceutical compositions containing them and to methods of treatment/therapeutic uses of EPT fumarate or crystalline form 1 of EPT fumarate. EPT fumarate is a novel compound and a novel crystalline form.

BACKGROUND OF THE INVENTION

Obtaining crystalline forms of an active pharmaceutical ingredient (API) is extremely useful in drug development. It permits better characterization of the drug candidate's chemical and physical properties. Crystalline forms often have better chemical and physical properties than the API in its amorphous state. Such crystalline forms may possess more favorable pharmaceutical and pharmacological properties or be easier to process. Additionally, preparing a crystalline API and solving its crystal structure provides the gold standard for chemical characterization and determining the molecular formula (and molecular weight) of the API. Accordingly, preparing a crystalline form with an accompanying crystal structure thereof prevents potential ambiguities and/or inaccuracies in the API's molecular weight. This is important because the API's molecular weight is used to calculate the concentration of compositions comprising that API. Thus, inaccuracies in molecular weight may lead to errors in the calculations pertaining to dosing, potency, toxicity, etc. in all downstream in vitro and in vivo assays that correlated the concentration of the API with a measured property. Accordingly, there remains a need to obtain and characterize crystalline forms of APIs, such as tryptamines and other psychedelic drug compounds.

SUMMARY OF THE INVENTION

This disclosure relates to 2-(5-hydroxy-1H-indol-3-yl)ethan-1-aminium hydrate chloride (serotonin hydrochloride hydrate or 5-HT hydrochloride hydrate). This disclosure also pertains to crystalline form 1 of 5-HT hydrochloride hydrate. In one embodiment crystalline form 1 of 5-HT hydrochloride hydrate is characterized by at least one of: a monoclinic, $P2_1/c$ space group at a temperature of about 297 K; unit cell dimensions a=9.3078 (4) Å, b=15.2990 (6) Å, c=8.0488 (3) Å, and β=92.285 (2)°; an X-ray powder diffraction (XRPD) pattern substantially similar to FIG. 3; and an X-ray powder diffraction pattern characterized by peaks at 11.1, 20.6, and 26.5°2θ±0.2°2θ.

The disclosure further relates to a composition comprising 5-HT hydrochloride hydrate or crystalline form 1 of 5-HT hydrochloride hydrate, according to this disclosure, and an excipient.

The disclosure also provides a composition comprising 5-HT hydrochloride hydrate or crystalline form 1 of 5-HT hydrochloride hydrate according to this disclosure as a first component and a second component selected from at least one of (a) a serotonergic drug, (b) a purified psilocybin derivative, (c) a purified cannabinoid, (d) a purified terpene, (e) an adrenergic drug, (f) a dopaminergic drug, (g) a monoamine oxidase inhibitor, (h) a purified erinacine, and (i) a purified hericenone; and a pharmaceutically acceptable excipient.

The disclosure also relates to a method of preventing or treating a psychological disorder comprising the step of administering to a subject in need thereof a therapeutically effective amount of 5-HT hydrochloride hydrate or crystalline form 1 of 5-HT hydrochloride hydrate according to this disclosure or a composition according to this disclosure.

The disclosure further relates to a method of preventing or treating inflammation and/or pain, preventing or treating a neurological disorder, modulating activity of a mitogen activated protein kinase (MAPK), modulating neurogenesis, or modulating neurite outgrowth comprising the step of administering to a subject in need thereof a therapeutically effective amount of a compound of 5-HT hydrochloride hydrate or crystalline form 1 of 5-HT hydrochloride hydrate and to administering a pharmaceutical composition or a composition according to the invention.

This disclosure further relates to crystalline form 1 of (2E)-but-2-enedioic acid bis({2-[4-(acetyloxy)-1H-indol-3-yl]ethyl}(ethyl)propylazanium) (2E)-but-2-enedioate (4-AcO-EPT fumarate fumaric acid). Crystalline form 1 of 4-AcO-EPT fumarate fumaric acid may be characterized by at least one of: a triclinic, P"1 space group at a temperature of about 297 K; unit cell dimensions a=8.7642 (8) Å, b=10.8653 (9) Å, c=12.6564 (11) Å, α=65.094 (3)°, β=75.354 (3)°, and γ=76.718 (3)°; an x-ray powder diffraction (XRPD) pattern substantially similar to FIG. 7; and an X-ray powder diffraction pattern characterized by peaks at 7.8, 9.1, 10.5, and 15.6°2θ±0.2°2θ.

The disclosure further relates to a composition comprising crystalline form 1 of 4-AcO-EPT fumarate fumaric acid according to this disclosure and an excipient.

The disclosure also provides a composition comprising crystalline form 1 of 4-AcO-EPT fumarate fumaric acid according to this disclosure as a first component and a second component selected from at least one of (a) a serotonergic drug, (b) a purified psilocybin derivative, (c) a purified cannabinoid, (d) a purified terpene, (e) an adrenergic drug, (f) a dopaminergic drug, (g) a monoamine oxidase inhibitor, (h) a purified erinacine, and (i) a purified hericenone; and a pharmaceutically acceptable excipient.

The disclosure also relates to a method of preventing or treating a psychological disorder comprising the step of administering to a subject in need thereof a therapeutically effective amount of crystalline form 1 of 4-AcO-EPT fumarate fumaric acid according to this disclosure or a composition according to this disclosure.

The disclosure further relates to a method of preventing or treating inflammation and/or pain, preventing or treating a neurological disorder, modulating activity of a mitogen activated protein kinase (MAPK), modulating neurogenesis, or modulating neurite outgrowth comprising the step of administering to a subject in need thereof a therapeutically effective amount of a compound of crystalline form 1 of 4-AcO-EPT fumarate fumaric acid and to administering a pharmaceutical composition or a composition according to the invention.

This disclosure further relates to [2-(1H-indol-3-yl)ethyl](methyl)propylazanium iodide (MPT iodide) and crystalline form 1 of MPT iodide. Crystalline form 1 of MPT iodide may be characterized by at least one of: an orthorhombic, $P2_12_12_1$ space group at a temperature of about 297 K; unit cell dimensions a=8.1126 (3) Å, b=8.7837 (4) Å, and c=21.1953 (8) Å; an x-ray powder diffraction (XRPD) pattern substantially similar to FIG. 10; and an X-ray powder diffraction pattern characterized by peaks at 8.3, 11.7, 13.1, and 14.9°2θ±0.2°2θ.

The disclosure further relates to a composition comprising MPT iodide or crystalline form 1 of MPT iodide according to this disclosure and an excipient.

The disclosure also provides a composition comprising MPT iodide or crystalline form 1 of MPT iodide according to this disclosure as a first component and a second component selected from at least one of (a) a serotonergic drug, (b) a purified psilocybin derivative, (c) a purified cannabinoid, (d) a purified terpene, (e) an adrenergic drug, (f) a dopaminergic drug, (g) a monoamine oxidase inhibitor, (h) a purified erinacine, and (i) a purified hericenone; and a pharmaceutically acceptable excipient.

The disclosure also relates to a method of preventing or treating a psychological disorder comprising the step of administering to a subject in need thereof a therapeutically effective amount of MPT iodide or crystalline form 1 of MPT iodide according to this disclosure or a composition according to this disclosure.

The disclosure further relates to a method of preventing or treating inflammation and/or pain, preventing or treating a neurological disorder, modulating activity of a mitogen activated protein kinase (MAPK), modulating neurogenesis, or modulating neurite outgrowth comprising the step of administering to a subject in need thereof a therapeutically effective amount of a compound of MPT iodide or crystalline form 1 of MPT iodide and to administering a pharmaceutical composition or a composition according to the invention.

This disclosure relates to bis(ethyl[2-(1H-indol-3-yl)ethyl]propylazanium) (2E)-but-2-enedioate (EPT fumarate) and crystalline form 1 of EPT fumarate. EPT fumarate is a novel compound and a novel crystalline form.

Crystalline form 1 of EPT fumarate may be characterized by at least one of: a monoclinic $P2_1/n$ space group at a temperature of about 297 K; unit cell dimensions a=8.4443 (7) Å, b=24.284 (2) Å, c=9.0222 (8) Å, and β=116.548 (2)°; an X-ray powder diffraction (XRPD) pattern substantially similar to FIG. 14; and an X-ray powder diffraction pattern characterized by peaks at 7.3, 12.5, and 14.0°2θ±0.2°2θ.

The disclosure further relates to a composition comprising EPT fumarate or crystalline form 1 of EPT fumarate, according to this disclosure, and an excipient.

The disclosure also provides a composition comprising EPT fumarate or crystalline form 1 of EPT fumarate according to this disclosure as a first component and a second component selected from at least one of (a) a serotonergic drug, (b) a purified psilocybin derivative, (c) a purified cannabinoid, (d) a purified terpene, (e) an adrenergic drug, (f) a dopaminergic drug, (g) a monoamine oxidase inhibitor, (h) a purified erinacine, and (i) a purified hericenone; and a pharmaceutically acceptable excipient.

The disclosure also relates to a method of preventing or treating a psychological disorder comprising the step of administering to a subject in need thereof a therapeutically effective amount of EPT fumarate or crystalline form 1 of EPT fumarate according to this disclosure or a composition according to this disclosure.

The disclosure further relates to a method of preventing or treating inflammation and/or pain, preventing or treating a neurological disorder, modulating activity of a mitogen activated protein kinase (MAPK), modulating neurogenesis, or modulating neurite outgrowth comprising the step of administering to a subject in need thereof a therapeutically effective amount of a compound of EPT fumarate or crystalline form 1 of EPT fumarate and to administering a pharmaceutical composition or a composition according to the invention.

As used herein, the term "a subject in need thereof" refers a person requiring a composition to treat a particular disease or condition (e.g., inflammation, pain, a psychological disorder, modulating activity at a receptor, etc.). In one embodiment, the "subject in need thereof" may be identified by analyzing, diagnosing, and/or determining whether the person (or subject) requires the composition for treatment of a particular disease or condition. In one embodiment, identifying a person in need of treatment comprises diagnosing a person with a medical condition, e.g., a neurological disorder, a chemical imbalance, a hereditary condition, etc. In one embodiment, identifying a person in need of treatment comprises performing a psychiatric evaluation. In one embodiment, identifying a person in need of treatment comprises performing a blood test. In one embodiment, identifying a person in need of treatment comprises determining whether a person has a compulsive disorder. In one embodiment, identifying a person in need of treatment comprises self-identifying as having a compulsive disorder.

DETAILED DESCRIPTION

Compounds

Figure 1:
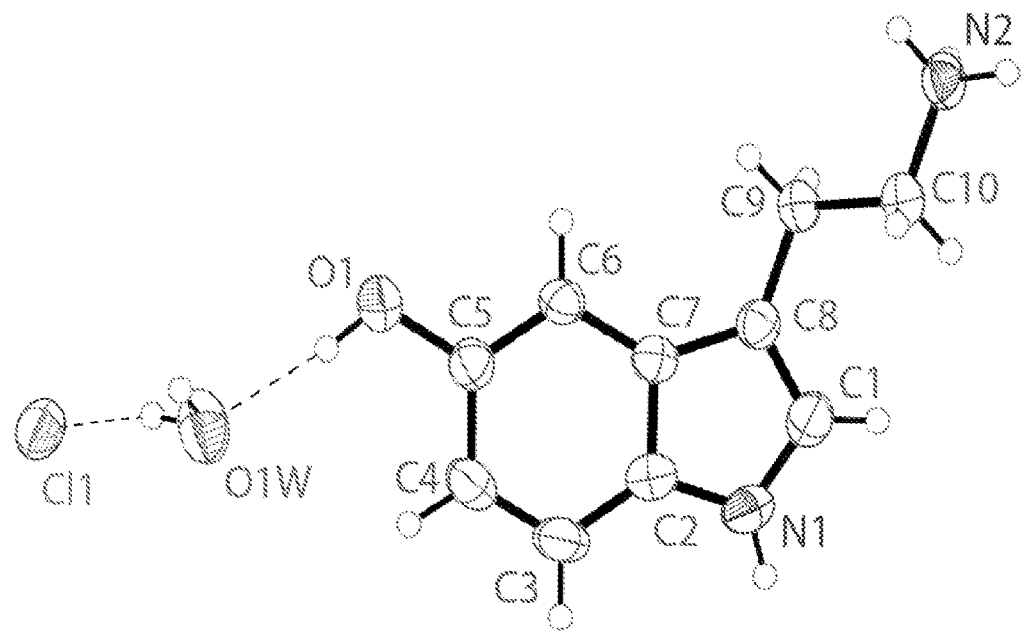
FIG. 1 shows the molecular structure of crystalline form 1 of 5-HT hydrochloride hydrate.

This disclosure relates to 2-(5-hydroxy-1H-indol-3-yl)ethan-1-aminium hydrate chloride (serotonin hydrochloride hydrate or 5-HT hydrochloride hydrate) and its crystalline form 1, and to pharmaceutical compositions containing 5-HT hydrochloride hydrate or crystalline form 1 of 5-HT hydrochloride hydrate according to the disclosure. The therapeutic uses of 5-HT hydrochloride hydrate or crystalline form 1 of 5-HT hydrochloride hydrate according to the disclosure are described below as well as compositions containing it. 5-HT hydrochloride hydrate or crystalline form 1 of 5-HT hydrochloride hydrate and the methods used to characterize it are described in the examples below. 5-HT hydrochloride hydrate has the following chemical formula:

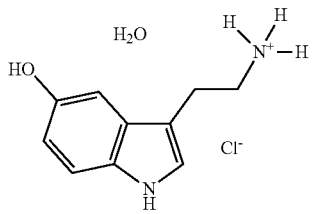 [SMILES: [NH3+]CCc1c[nH]c2ccc(O)cc12 ; O ; [Cl-]]

This disclosure further relates to crystalline form 1 of (2E)-but-2-enedioic acid bis({2-[4-(acetyloxy)-1H-indol-3-yl]ethyl}(ethyl)propylazanium) (2E)-but-2-enedioate (4-AcO-EPT fumarate fumaric acid), and to pharmaceutical compositions containing crystalline form 1 of 4-AcO-EPT fumarate fumaric acid according to the disclosure. The therapeutic uses of crystalline form 1 of 4-AcO-EPT fumarate fumaric acid according to the disclosure are described below as well as compositions containing it. Crystalline form 1 of 4-AcO-EPT fumarate fumaric acid and the methods used to characterize it are described in the examples below.

4-AcO-EPT fumarate fumaric acid has the following chemical formula:

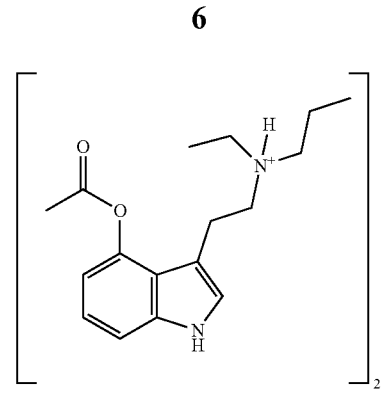

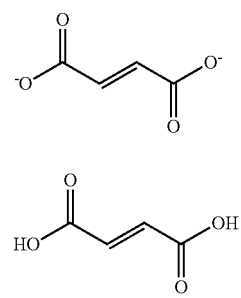

This disclosure further relates to [2-(1H-indol-3-yl)ethyl](methyl)propylazanium iodide (MPT iodide) and its crystalline form 1, and to pharmaceutical compositions containing MPT iodide or crystalline form 1 of MPT iodide according to the disclosure. The therapeutic uses of MPT iodide or crystalline form 1 of MPT iodide according to the disclosure are described below as well as compositions containing each of them. MPT iodide or crystalline form 1 of MPT iodide and the methods used to characterize them are described in the examples below.

MPT iodide has the following chemical formula:

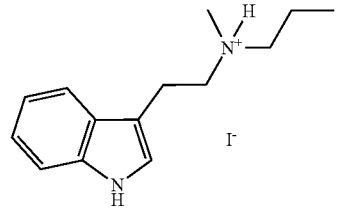 [SMILES: CCC[NH+](C)CCc1c[nH]c2ccccc12 ; [I-]]

This disclosure further relates to bis(ethyl[2-(1H-indol-3-yl)ethyl]propylazanium) (2E)-but-2-enedioate (EPT fumarate) and its crystalline form 1, and to pharmaceutical compositions containing EPT fumarate or crystalline form 1 of EPT fumarate according to the disclosure. The therapeutic uses of EPT fumarate or crystalline form 1 of EPT fumarate according to the disclosure are described below as well as compositions containing them. EPT fumarate or crystalline form 1 of EPT fumarate and the methods used to characterize it are described in the examples below. EPT fumarate is a novel compound and a novel crystalline form.

EPT fumarate has the following chemical formula:

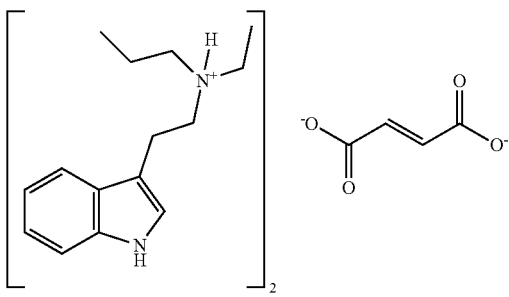

Methods of Treatment and Therapeutic Uses

5-HT hydrochloride hydrate or crystalline form 1 of 5-HT hydrochloride hydrate according to the disclosure, and the methods and the compositions (e.g., pharmaceutical compositions) are used to regulate the activity of a neurotransmitter receptor by administering a therapeutically effective dose of 5-HT hydrochloride hydrate or crystalline form 1 of 5-HT hydrochloride hydrate of the disclosure. In one embodiment, 5-HT hydrochloride hydrate or crystalline form 1 of 5-HT hydrochloride hydrate according to the disclosure, and the methods and the compositions (e.g., pharmaceutical compositions) are used to treat inflammation and/or pain by administering a therapeutically effective dose of 5-HT hydrochloride hydrate or crystalline form 1 of 5-HT hydrochloride hydrate of the disclosure.

Methods of the disclosure also relate to the administration of a therapeutically effective amount of 5-HT hydrochloride hydrate or crystalline form 1 of 5-HT hydrochloride hydrate to prevent or treat a disease or condition, such as those discussed below for a subject in need of treatment. 5-HT hydrochloride hydrate or crystalline form 1 of 5-HT hydrochloride hydrate may be administered neat or as a composition comprising 5-HT hydrochloride hydrate or crystalline form 1 of 5-HT hydrochloride hydrate as discussed below.

5-HT hydrochloride hydrate or crystalline form 1 of 5-HT hydrochloride hydrate may be used to prevent and/or treat a psychological disorder. The disclosure provides a method for preventing and/or treating a psychological disorder by administering to a subject in need thereof a therapeutically effective amount of 5-HT hydrochloride hydrate or crystalline form 1 of 5-HT hydrochloride hydrate, including the exemplary embodiments discussed herein. The psychological disorder may be chosen from depression; psychotic disorder; schizophrenia; schizophreniform disorder (acute schizophrenic episode); schizoaffective disorder; bipolar I disorder (mania, manic disorder, manic-depressive psychosis); bipolar II disorder; major depressive disorder; major depressive disorder with psychotic feature (psychotic depression); delusional disorders (paranoia); Shared Psychotic Disorder (Shared paranoia disorder); Brief Psychotic disorder (Other and Unspecified Reactive Psychosis); Psychotic disorder not otherwise specified (Unspecified Psychosis); paranoid personality disorder; schizoid personality disorder; schizotypal personality disorder; anxiety disorder; social anxiety disorder; substance-induced anxiety disorder; selective mutism; panic disorder; panic attacks; agoraphobia; attention deficit syndrome; post-traumatic stress disorder (PTSD); premenstrual dysphoric disorder (PMDD); and premenstrual syndrome (PMS).

5-HT hydrochloride hydrate or crystalline form 1 of 5-HT hydrochloride hydrate may be used to prevent and/or treat a brain disorder. The disclosure provides a method for preventing and/or treating a brain disorder (e.g., Huntington's disease, Alzheimer's disease, dementia, and Parkinson's disease) by administering to a subject in need thereof a therapeutically effective amount of 5-HT hydrochloride hydrate or crystalline form 1 of 5-HT hydrochloride hydrate.

5-HT hydrochloride hydrate or crystalline form 1 of 5-HT hydrochloride hydrate may be used to prevent and/or treat developmental disorders, delirium, dementia, amnestic disorders and other cognitive disorders, psychiatric disorders due to a somatic condition, drug-related disorders, schizophrenia and other psychotic disorders, mood disorders, anxiety disorders, somatoform disorders, factitious disorders, dissociative disorders, eating disorders, sleep disorders, impulse control disorders, adjustment disorders, or personality disorders. The disclosure provides a method for preventing and/or treating these disorders by administering to a subject in need thereof a therapeutically effective amount of 5-HT hydrochloride hydrate or crystalline form 1 of 5-HT hydrochloride hydrate, including the exemplary embodiments discussed above.

5-HT hydrochloride hydrate or crystalline form 1 of 5-HT hydrochloride hydrate may be used to prevent and/or treat inflammation and/or pain, such as for example inflammation and/or pain associated with inflammatory skeletal or muscular diseases or conditions. The disclosure provides a method for preventing and/or treating an inflammation and/or pain by administering to a subject in need thereof a therapeutically effective amount of 5-HT hydrochloride hydrate or crystalline form 1 of 5-HT hydrochloride hydrate, including the exemplary embodiments discussed herein. Generally speaking, for the purposes of this disclosure, treatable "pain" includes nociceptive, neuropathic, and mix-type. A method of the disclosure may reduce or alleviate the symptoms associated with inflammation, including but not limited to treating localized manifestation of inflammation characterized by acute or chronic swelling, pain, redness, increased temperature, or loss of function in some cases. A method of the disclosure may reduce or alleviate the symptoms of pain regardless of the cause of the pain, including but not limited to reducing pain of varying severity, i.e., mild, moderate and severe pain, acute pain and chronic pain. A method of the disclosure is effective in treating joint pain, muscle pain, tendon pain, burn pain, and pain caused by inflammation such as rheumatoid arthritis. Skeletal or muscular diseases or conditions which may be treated include but are not limited to musculoskeletal sprains, musculoskeletal strains, tendinopathy, peripheral radiculopathy, osteoarthritis, joint degenerative disease, polymyalgia rheumatica, juvenile arthritis, gout, ankylosing spondylitis, psoriatic arthritis, systemic lupus erythematosus, costochondritis, tendonitis, bursitis, such as the common lateral epicondylitis (tennis elbow), medial epicondylitis (pitchers elbow) and trochanteric bursitis, temporomandibular joint syndrome, and fibromyalgia.

5-HT hydrochloride hydrate or crystalline form 1 of 5-HT hydrochloride hydrate may be used to modulate activity of a mitogen activated protein kinase (MAPK), comprising administering a composition of the invention. MAPKs provide a wide-ranging signaling cascade that allow cells to quickly respond to biotic and abiotic stimuli. Exemplary MAPKs include, but are not limited to, Tropomyosin Receptor Kinase A (TrkA), P38-alpha, and c-Jun N-Terminal Kinase 3 (JNK3). TrkA is a high affinity catalytic receptor of nerve growth factor (NGF) protein. TrkA regulates NGF response, influencing neuronal differentiation and outgrowth as well as programmed cell death. p38-alpha is involved with the regulation of pro-inflammatory cytokines, including TNF-a. In the central nervous system, p38-alpha regulates neuronal death and neurite degeneration, and it is a common target of Alzheimer's disease therapies. JNK3 is neuronal specific protein isoform of the JNKs. It is involved with the regulation of apoptosis. JNK3 also plays a role in modulating the response of cytokines, growth factors, and oxidative stress.

As used herein, for the purposes of this disclosure, the term "modulating activity of a mitogen activated protein kinase" refers to changing, manipulating, and/or adjusting the activity of a mitogen activated protein kinase. In one embodiment, modulating the activity of a MAPK can influence neural health, neurogenesis, neural growth and differentiation, and neurodegenerative diseases.

5-HT hydrochloride hydrate or crystalline form 1 of 5-HT hydrochloride hydrate may be used to modulate neurogenesis, comprising administering a composition of the invention. As used herein, for the purposes of this disclosure, the term "modulating neurogenesis" refers to changing, manipulating, and/or adjusting the growth and development of neural tissue. In one embodiment, neurogenesis comprises adult neurogenesis, in which new neural stem cells are generated from neural stem cells in an adult animal. In one embodiment, modulating neurogenesis comprises increasing and/or enhancing the rate at which new neural tissue is developed.

5-HT hydrochloride hydrate or crystalline form 1 of 5-HT hydrochloride hydrate may be used to modulate neurite outgrowth, comprising administering a composition of the invention. As used herein, for the purposes of this disclosure, the term "modulating neurite outgrowth" refers to changing, manipulating, and/or adjusting the growth and development of neural projections, or "neurites." In one embodiment, neurogenesis comprises modulating the growth of new neurites, the number of neurites per neuron, and/or neurite length. In one embodiment, modulating neurite outgrowth comprises increasing and/or enhancing the rate and/or length at which neurites develop.

5-HT hydrochloride hydrate or crystalline form 1 of 5-HT hydrochloride hydrate may be used to prevent and/or treat sexual health disorders including, but not limited to, hypoactive sexual desire disorder, hyperactive sexual desire disorder, orgasmic disorder, arousal disorder, vaginismus, and dyspareunia. In some embodiments, the disorder is a male sexual dysfunction disorder. In some embodiments, the disorder is a female sexual dysfunction disorder.

5-HT hydrochloride hydrate or crystalline form 1 of 5-HT hydrochloride hydrate may be used to prevent and/or treat women's health disorders including, but not limited to, menstrual cramping, dysmenorrhea, post hysterectomy pain, vaginal or vulvar vestibule mucosa disorder, menopausal-related disorders, vaginal atrophy, or vulvar vestibulitis.

Crystalline form 1 of 4-AcO-EPT fumarate fumaric acid according to the disclosure and the methods and the compositions (e.g., pharmaceutical compositions) are used to regulate the activity of a neurotransmitter receptor by administering a therapeutically effective dose of crystalline form 1 of 4-AcO-EPT fumarate fumaric acid of the disclosure. In one embodiment, crystalline form 1 of 4-AcO-EPT fumarate fumaric acid according to the disclosure, and the methods and the compositions (e.g., pharmaceutical compositions) are used to treat inflammation and/or pain by administering a therapeutically effective dose of crystalline form 1 of 4-AcO-EPT fumarate fumaric acid of the disclosure.

Methods of the disclosure also related to the administration of a therapeutically effective amount of crystalline form 1 of 4-AcO-EPT fumarate fumaric acid to prevent or treat a disease or condition, such as those discussed below for a subject in need of treatment. Crystalline form 1 of 4-AcO-EPT fumarate fumaric acid may be administered neat or as a composition comprising crystalline form 1 of 4-AcO-EPT fumarate fumaric acid as discussed below.

Crystalline form 1 of 4-AcO-EPT fumarate fumaric acid may be used to prevent and/or treat a psychological disorder. The disclosure provides a method for preventing and/or treating a psychological disorder by administering to a subject in need thereof a therapeutically effective amount of crystalline form 1 of 4-AcO-EPT fumarate fumaric acid, including the exemplary embodiments discussed herein. The psychological disorder may be chosen from depression; psychotic disorder; schizophrenia; schizophreniform disorder (acute schizophrenic episode); schizoaffective disorder; bipolar I disorder (mania, manic disorder, manic-depressive psychosis); bipolar II disorder; major depressive disorder; major depressive disorder with psychotic feature (psychotic depression); delusional disorders (paranoia); Shared Psychotic Disorder (Shared paranoia disorder); Brief Psychotic disorder (Other and Unspecified Reactive Psychosis); Psychotic disorder not otherwise specified (Unspecified Psychosis); paranoid personality disorder; schizoid personality disorder; schizotypal personality disorder; anxiety disorder; social anxiety disorder; substance-induced anxiety disorder; selective mutism; panic disorder; panic attacks; agoraphobia; attention deficit syndrome; post-traumatic stress disorder (PTSD); premenstrual dysphoric disorder (PMDD); and premenstrual syndrome (PMS).

Crystalline form 1 of 4-AcO-EPT fumarate fumaric acid may be used to prevent and/or treat a brain disorder. The disclosure provides a method for preventing and/or treating a brain disorder (e.g., Huntington's disease, Alzheimer's disease, dementia, and Parkinson's disease) by administering to a subject in need thereof a therapeutically effective amount of crystalline form 1 of 4-AcO-EPT fumarate fumaric acid, including the exemplary embodiments discussed above.

Crystalline form 1 of 4-AcO-EPT fumarate fumaric acid may be used to prevent and/or treat developmental disorders, delirium, dementia, amnestic disorders and other cognitive disorders, psychiatric disorders due to a somatic condition, drug-related disorders, schizophrenia and other psychotic disorders, mood disorders, anxiety disorders, somatoform disorders, factitious disorders, dissociative disorders, eating disorders, sleep disorders, impulse control disorders, adjustment disorders, or personality disorders. The disclosure provides a method for preventing and/or treating these disorders by administering to a subject in need thereof a therapeutically effective amount of crystalline form 1 of 4-AcO-EPT fumarate fumaric acid, including the exemplary embodiments discussed above.

Crystalline form 1 of 4-AcO-EPT fumarate fumaric acid may be used to prevent and/or treat inflammation and/or pain, such as for example inflammation and/or pain associated with inflammatory skeletal or muscular diseases or conditions, as disclosed above. The disclosure provides a method for preventing and/or treating an inflammation and/or pain by administering to a subject in need thereof a therapeutically effective amount of crystalline form 1 of 4-AcO-EPT fumarate fumaric acid, including the exemplary embodiments discussed herein.

Crystalline form 1 of 4-AcO-EPT fumarate fumaric acid may be used to modulate activity of a mitogen activated protein kinase (MAPK), as disclosed above, comprising administering a composition of the invention. MAPKs provide a wide-ranging signaling cascade that allow cells to quickly respond to biotic and abiotic stimuli. Exemplary MAPKs include, but are not limited to, Tropomyosin Receptor Kinase A (TrkA), P38-alpha, and c-Jun N-Terminal Kinase 3 (JNK3). TrkA is a high affinity catalytic receptor of nerve growth factor (NGF) protein. TrkA regulates NGF response, influencing neuronal differentiation and outgrowth as well as programmed cell death. p38-alpha is involved with the regulation of pro-inflammatory cytokines, including TNF-a. In the central nervous system, p38-alpha regulates neuronal death and neurite degeneration, and it is a common target of Alzheimer's disease therapies. JNK3 is neuronal specific protein isoform of the JNKs. It is involved with the regulation of apoptosis. JNK3 also plays a role in modulating the response of cytokines, growth factors, and oxidative stress.

Crystalline form 1 of 4-AcO-EPT fumarate fumaric acid may be used to modulate neurogenesis, as disclosed above, comprising administering a composition of the invention.

Crystalline form 1 of 4-AcO-EPT fumarate fumaric acid may be used to modulate neurite outgrowth, as disclosed above, comprising administering a composition of the invention.

Crystalline form 1 of 4-AcO-EPT fumarate fumaric acid may be used to prevent and/or treat sexual health disorders including, but not limited to, hypoactive sexual desire disorder, hyperactive sexual desire disorder, orgasmic disorder, arousal disorder, vaginismus, and dyspareunia. In some embodiments, the disorder is a male sexual dysfunction disorder. In some embodiments, the disorder is a female sexual dysfunction disorder.

Crystalline form 1 of 4-AcO-EPT fumarate fumaric acid may be used to prevent and/or treat women's health disorders including, but not limited to, menstrual cramping, dysmenorrhea, post hysterectomy pain, vaginal or vulvar vestibule mucosa disorder, menopausal-related disorders, vaginal atrophy, or vulvar vestibulitis.

MPT iodide according to the disclosure, crystalline form 1 of MPT iodide, and the methods and the compositions (e.g., pharmaceutical compositions) are used to regulate the activity of a neurotransmitter receptor by administering a therapeutically effective dose of MPT iodide or crystalline form 1 of MPT iodide of the disclosure. In one embodiment, MPT iodide or crystalline form 1 of MPT iodide according to the disclosure, and the methods and the compositions (e.g., pharmaceutical compositions) are used to treat inflammation and/or pain by administering a therapeutically effective dose of MPT iodide or crystalline form 1 of MPT iodide of the disclosure.

Methods of the disclosure also related to the administration of a therapeutically effective amount of MPT iodide or crystalline form 1 of MPT iodide to prevent or treat a disease or condition, such as those discussed below for a subject in need of treatment. MPT iodide or crystalline form 1 of MPT iodide may be administered neat or as a composition comprising MPT iodide or crystalline form 1 of MPT iodide as discussed below.

MPT iodide or crystalline form 1 of MPT iodide may be used to prevent and/or treat a psychological disorder. The disclosure provides a method for preventing and/or treating a psychological disorder by administering to a subject in need thereof a therapeutically effective amount of MPT iodide or crystalline form 1 of MPT iodide, including the exemplary embodiments discussed herein. The psychological disorder may be chosen from depression; psychotic disorder; schizophrenia; schizophreniform disorder (acute schizophrenic episode); schizoaffective disorder; bipolar I disorder (mania, manic disorder, manic-depressive psychosis); bipolar II disorder; major depressive disorder; major depressive disorder with psychotic feature (psychotic depression); delusional disorders (paranoia); Shared Psychotic Disorder (Shared paranoia disorder); Brief Psychotic disorder (Other and Unspecified Reactive Psychosis); Psychotic disorder not otherwise specified (Unspecified Psychosis); paranoid personality disorder; schizoid personality disorder; schizotypal personality disorder; anxiety disorder; social anxiety disorder; substance-induced anxiety disorder; selective mutism; panic disorder; panic attacks; agoraphobia; attention deficit syndrome; post-traumatic stress disorder (PTSD); premenstrual dysphoric disorder (PMDD); and premenstrual syndrome (PMS).

MPT iodide or crystalline form 1 of MPT iodide may be used to prevent and/or treat a brain disorder. The disclosure provides a method for preventing and/or treating a brain disorder (e.g., Huntington's disease, Alzheimer's disease, dementia, and Parkinson's disease) by administering to a subject in need thereof a therapeutically effective amount of MPT iodide or crystalline form 1 of MPT iodide, including the exemplary embodiments discussed above.

MPT iodide or crystalline form 1 of MPT iodide may be used to prevent and/or treat developmental disorders, delirium, dementia, amnestic disorders and other cognitive disorders, psychiatric disorders due to a somatic condition, drug-related disorders, schizophrenia and other psychotic disorders, mood disorders, anxiety disorders, somatoform disorders, factitious disorders, dissociative disorders, eating disorders, sleep disorders, impulse control disorders, adjustment disorders, or personality disorders. The disclosure provides a method for preventing and/or treating these disorders by administering to a subject in need thereof a therapeutically effective amount of MPT iodide or crystalline form 1 of MPT iodide, including the exemplary embodiments discussed above.

MPT iodide or crystalline form 1 of MPT iodide may be used to prevent and/or treat inflammation and/or pain, such as for example inflammation and/or pain associated with inflammatory skeletal or muscular diseases or conditions, as disclosed above. The disclosure provides a method for preventing and/or treating an inflammation and/or pain by administering to a subject in need thereof a therapeutically effective amount of MPT iodide or crystalline form 1 of MPT iodide, including the exemplary embodiments discussed herein.

MPT iodide or crystalline form 1 of MPT iodide may be used to modulate activity of a mitogen activated protein kinase (MAPK), as disclosed above, comprising administering a composition of the invention. MAPKs provide a wide-ranging signaling cascade that allow cells to quickly respond to biotic and abiotic stimuli. Exemplary MAPKs include, but are not limited to, Tropomyosin Receptor Kinase A (TrkA), P38-alpha, and c-Jun N-Terminal Kinase 3 (JNK3). TrkA is a high affinity catalytic receptor of nerve growth factor (NGF) protein. TrkA regulates NGF response, influencing neuronal differentiation and outgrowth as well as programmed cell death. p38-alpha is involved with the regulation of pro-inflammatory cytokines, including TNF-a. In the central nervous system, p38-alpha regulates neuronal death and neurite degeneration, and it is a common target of Alzheimer's disease therapies. JNK3 is neuronal specific protein isoform of the JNKs. It is involved with the regulation of apoptosis. JNK3 also plays a role in modulating the response of cytokines, growth factors, and oxidative stress.

MPT iodide or crystalline form 1 of MPT iodide may be used to modulate neurogenesis, as disclosed above, comprising administering a composition of the invention.

MPT iodide or crystalline form 1 of MPT iodide may be used to modulate neurite outgrowth, as disclosed above, comprising administering a composition of the invention.

MPT iodide or crystalline form 1 of MPT iodide may be used to prevent and/or treat sexual health disorders including, but not limited to, hypoactive sexual desire disorder, hyperactive sexual desire disorder, orgasmic disorder, arousal disorder, vaginismus, and dyspareunia. In some embodiments, the disorder is a male sexual dysfunction disorder. In some embodiments, the disorder is a female sexual dysfunction disorder.

MPT iodide or crystalline form 1 of MPT iodide may be used to prevent and/or treat women's health disorders including, but not limited to, menstrual cramping, dysmenorrhea, post hysterectomy pain, vaginal or vulvar vestibule mucosa disorder, menopausal-related disorders, vaginal atrophy, or vulvar vestibulitis.

EPT fumarate or crystalline form 1 of EPT fumarate according to the disclosure, and the methods and the compositions (e.g., pharmaceutical compositions) are used to regulate the activity of a neurotransmitter receptor by administering a therapeutically effective dose of EPT fumarate or crystalline form 1 of EPT fumarate of the disclosure. In one embodiment, EPT fumarate or crystalline form 1 of EPT fumarate according to the disclosure, and the methods and the compositions (e.g., pharmaceutical compositions) are used to treat inflammation and/or pain by administering a therapeutically effective dose of EPT fumarate or crystalline form 1 of EPT fumarate of the disclosure.

Methods of the disclosure also relate to the administration of a therapeutically effective amount of EPT fumarate or crystalline form 1 of EPT fumarate to prevent or treat a disease or condition, such as those discussed below for a subject in need of treatment. EPT fumarate or crystalline form 1 of EPT fumarate may be administered neat or as a composition comprising EPT fumarate or crystalline form 1 of EPT fumarate as discussed below.

EPT fumarate or crystalline form 1 of EPT fumarate may be used to prevent and/or treat a psychological disorder. The disclosure provides a method for preventing and/or treating a psychological disorder by administering to a subject in need thereof a therapeutically effective amount of EPT fumarate or crystalline form 1 of EPT fumarate, including the exemplary embodiments discussed herein. The psychological disorder may be chosen from depression; psychotic disorder; schizophrenia; schizophreniform disorder (acute schizophrenic episode); schizoaffective disorder; bipolar I disorder (mania, manic disorder, manic-depressive psychosis); bipolar II disorder; major depressive disorder; major depressive disorder with psychotic feature (psychotic depression); delusional disorders (paranoia); Shared Psychotic Disorder (Shared paranoia disorder); Brief Psychotic disorder (Other and Unspecified Reactive Psychosis); Psychotic disorder not otherwise specified (Unspecified Psychosis); paranoid personality disorder; schizoid personality disorder; schizotypal personality disorder; anxiety disorder; social anxiety disorder; substance-induced anxiety disorder; selective mutism; panic disorder; panic attacks; agoraphobia; attention deficit syndrome; post-traumatic stress disorder (PTSD); premenstrual dysphoric disorder (PMDD); and premenstrual syndrome (PMS).

EPT fumarate or crystalline form 1 of EPT fumarate may be used to prevent and/or treat a brain disorder. The disclosure provides a method for preventing and/or treating a brain disorder (e.g., Huntington's disease, Alzheimer's disease, dementia, and Parkinson's disease) by administering to a subject in need thereof a therapeutically effective amount of EPT fumarate or crystalline form 1 of EPT fumarate.

EPT fumarate or crystalline form 1 of EPT fumarate may be used to prevent and/or treat developmental disorders, delirium, dementia, amnestic disorders and other cognitive disorders, psychiatric disorders due to a somatic condition, drug-related disorders, schizophrenia and other psychotic disorders, mood disorders, anxiety disorders, somatoform disorders, factitious disorders, dissociative disorders, eating disorders, sleep disorders, impulse control disorders, adjustment disorders, or personality disorders. The disclosure provides a method for preventing and/or treating these disorders by administering to a subject in need thereof a therapeutically effective amount of EPT fumarate or crystalline form 1 of EPT fumarate, including the exemplary embodiments discussed above.

EPT fumarate or crystalline form 1 of EPT fumarate may be used to prevent and/or treat inflammation and/or pain, such as for example inflammation and/or pain associated with inflammatory skeletal or muscular diseases or conditions, as disclosed above. The disclosure provides a method for preventing and/or treating an inflammation and/or pain by administering to a subject in need thereof a therapeutically effective amount of EPT fumarate or crystalline form 1 of EPT fumarate, including the exemplary embodiments discussed herein.

EPT fumarate or crystalline form 1 of EPT fumarate may be used to modulate activity of a mitogen activated protein kinase (MAPK), as disclosed above, comprising administering a composition of the invention. MAPKs provide a wide-ranging signaling cascade that allow cells to quickly respond to biotic and abiotic stimuli. Exemplary MAPKs include, but are not limited to, Tropomyosin Receptor Kinase A (TrkA), P38-alpha, and c-Jun N-Terminal Kinase 3 (JNK3). TrkA is a high affinity catalytic receptor of nerve growth factor (NGF) protein. TrkA regulates NGF response, influencing neuronal differentiation and outgrowth as well as programmed cell death. p38-alpha is involved with the regulation of pro-inflammatory cytokines, including TNF-a. In the central nervous system, p38-alpha regulates neuronal death and neurite degeneration, and it is a common target of Alzheimer's disease therapies. JNK3 is neuronal specific protein isoform of the JNKs. It is involved with the regulation of apoptosis. JNK3 also plays a role in modulating the response of cytokines, growth factors, and oxidative stress.

EPT fumarate or crystalline form 1 of EPT fumarate may be used to modulate neurogenesis, as disclosed above, comprising administering a composition of the invention.

EPT fumarate or crystalline form 1 of EPT fumarate may be used to modulate neurite outgrowth, as disclosed above, comprising administering a composition of the invention.

EPT fumarate or crystalline form 1 of EPT fumarate may be used to prevent and/or treat sexual health disorders including, but not limited to, hypoactive sexual desire disorder, hyperactive sexual desire disorder, orgasmic disorder, arousal disorder, vaginismus, and dyspareunia. In some embodiments, the disorder is a male sexual dysfunction disorder. In some embodiments, the disorder is a female sexual dysfunction disorder.

EPT fumarate or crystalline form 1 of EPT fumarate may be used to prevent and/or treat women's health disorders including, but not limited to, menstrual cramping, dysmenorrhea, post hysterectomy pain, vaginal or vulvar vestibule mucosa disorder, menopausal-related disorders, vaginal atrophy, or vulvar vestibulitis.

Compositions

The disclosure also relates to compositions comprising an effective amount of 5-HT hydrochloride hydrate or crystalline form 1 of 5-HT hydrochloride hydrate, and an excipient (e.g., a pharmaceutically-acceptable excipient). In another embodiment, the disclosure also relates to pharmaceutical compositions comprising a therapeutically effective amount of 5-HT hydrochloride hydrate or crystalline form 1 of 5-HT hydrochloride hydrate and a pharmaceutically acceptable excipient (also known as a pharmaceutically acceptable carrier). As discussed above, 5-HT hydrochloride hydrate or crystalline form 1 of 5-HT hydrochloride hydrate of the disclosure may be, for example, therapeutically useful to prevent and/or treat the psychological disorders, brain disorders, pain, and inflammation as well as the other disorders described herein.

A composition or a pharmaceutical composition of the disclosure may be in any form which contains 5-HT hydrochloride hydrate or crystalline form 1 of 5-HT hydrochloride hydrate. The composition may be, for example, a tablet, capsule, liquid suspension, injectable, topical, or transdermal. The compositions generally contain, for example, about 1% to about 99% by weight of 5-HT hydrochloride hydrate or crystalline form 1 of 5-HT hydrochloride hydrate and, for example, 99% to 1% by weight of at least one suitable pharmaceutically acceptable excipient. In one embodiment, the composition may be between about 5% and about 75% by weight of 5-HT hydrochloride hydrate or crystalline form 1 of 5-HT hydrochloride hydrate, with the rest being at least one suitable pharmaceutically acceptable excipient or at least one other adjuvant, as discussed below.

Published US applications US 2018/0221396 A1 and US 2019/0142851 A1 disclose compositions comprising a combination of a first purified psilocybin derivative with a second purified psilocybin derivative, with one or two purified cannabinoids or with a purified terpene. Various ratios of these components in the composition are also disclosed. The disclosures of US 2018/0221396 A1 and US 2019/0142851 A1 are incorporated herein by reference. According to this disclosure, 5-HT hydrochloride hydrate or crystalline form 1 of 5-HT hydrochloride hydrate of the disclosure may be used as the "first purified psilocybin derivative" in the compositions described in US 2018/0221396 A1 and US 2019/0142851 A1. Accordingly, this disclosure provides a composition comprising: a first component comprising 5-HT hydrochloride hydrate or crystalline form 1 of 5-HT hydrochloride hydrate of the disclosure; at least one second component selected from at least one of (a) a serotonergic drug, (b) a purified psilocybin derivative, (c) a purified cannabinoid or (d) a purified terpene; and at least one pharmaceutically-acceptable excipient or at least one other adjuvant. Such a composition may be a pharmaceutical composition wherein the components are present individually in therapeutically effective amounts or by combination in a therapeutically effective amount to treat a disease, disorder, or condition as described herein.

When used in such compositions as a first component comprising 5-HT hydrochloride hydrate or crystalline form 1 of 5-HT hydrochloride hydrate of the disclosure with a second component selected from at least one of (a) a serotonergic drug, (b) a purified psilocybin derivative, (c) a purified cannabinoid, or (d) a purified terpene, the compositions represent particular embodiments of the invention. Compositions having as a first component 5-HT hydrochloride hydrate or crystalline form 1 of 5-HT hydrochloride hydrate of the disclosure with a second component selected from at least one of (e) an adrenergic drug, (f) a dopaminergic drug, (g) a monoamine oxidase inhibitor, (h) a purified erinacine, (i) a purified hericenone represent additional particular embodiments of the invention represented by the compositions having 5-HT hydrochloride hydrate or crystalline form 1 of 5-HT hydrochloride hydrate according to the disclosure. In some embodiments, the first and second components can be administered at the same time (e.g., together in the same composition), or at separate times over the course of treating a patient in need thereof. Such a composition may be a pharmaceutical composition wherein the components are present individually in therapeutically effective amounts or by combination in a therapeutically effective amount to treat a disease, disorder, or condition as described herein.

Within the context of this disclosure, the term "purified" means separated from other materials, such as plant or fungal material, e.g., protein, chitin, cellulose, or water. In one embodiment, the term "purified" refers to a compound substantially free of other materials. In one embodiment, the term "purified" refers to a compound that is substantially free from a second tryptamine compound. In one embodiment, the term "purified" refers to a compound substantially free from histidine. In one embodiment, the term "purified" refers to a compound substantially free from a biological material, such as mold, fungus, plant matter, or bacteria. In one embodiment, the term "purified" refers to a compound substantially free from a paralytic.

In one embodiment, the term "purified" refers to a compound which has been separated from other compounds that are typically co-extracted when the purified compound is extracted from a naturally occurring organism. In one embodiment, a "purified" psilocybin derivative is partially or completely isolated from other psilocybin derivatives present in a source material, such as a psilocybin-containing mushroom. In one example, "purified" baeocystin is substantially free from psilocybin and/or psilocin. By contrast, traditional psilocybin mushroom extracts (aka crude extracts or fruit body extracts) would be expected to contain an unpredictable and varying amount of psilocybin, psilocin, baeocystin, norbaeocystin, salts thereof, or combinations thereof. Other examples of unpurified psilocybin derivatives would include mycelium containing psilocybin derivatives and/or naturally occurring fungal material such as biological material and/or structural material such as chitin. Similarly, the term "cannabis extracts" or "cannabinoid extracts" traditionally refers to whole plants (aka crude or full spectrum extracts) which have not been subjected to further purification to eliminate unwanted molecules that naturally occur in the cannabis plant. For example, a "cannabis extract comprising cannabidiol" could be expected to include cannabidiol (aka "CBD") and also varying amounts of other compounds, including cannabinoids, terpenes, and other biological material.

In one embodiment, the term "purified" refers to a compound or composition that has been crystallized.

In one embodiment, the term "purified" refers to a compound or composition that has been chromatographed, for example by gas chromatography, liquid chromatography (e.g., LC, HPLC, etc.), etc.

In one embodiment, the term "purified" refers to a compound or composition that has been distilled.

In one embodiment, the term "purified" refers to a compound or composition that has been sublimed.

In one embodiment, the term "purified" refers to a compound or composition that has been subject to two or more steps chosen from crystallization, chromatography, distillation, or sublimation.

In one embodiment, the term "purified" refers to a compound that is between 80-100% pure.

In one embodiment, the term "purified" refers to a compound that is between 90-100% pure.

In one embodiment, the term "purified" refers to a compound that is between 95-100% pure.

In one embodiment, the term "purified" refers to a compound that is between 99-100% pure.

In one embodiment, the term "purified" refers to a compound that is between 99.9-100% pure.

A serotonergic drug refers to a compound that binds to, blocks, or otherwise influences (e.g., via an allosteric reaction) activity at a serotonin receptor as described in paragraphs [0245]-[0253] of US 2018/0221396 A1 and [0305]-[0311] US 2019/0142851 A1 as well as the disclosed exemplary embodiments, incorporated here by reference. Exemplary psilocybin derivatives include but are not limited to psilocybin itself and the psilocybin derivates described in paragraphs [0081]-[0109] of US 2018/0221396 A1 and [0082]-[0110] US 2019/0142851 A1 as well as the disclosed exemplary embodiments. Exemplary cannabinoids include but are not limited to the cannabinoids described in paragraphs [0111]-[0145] of US 2018/0221396 A1 and [0112]-[0146] US 2019/0142851 A1 as well as the disclosed exemplary embodiments. Exemplary terpenes include but are not limited to the terpenes described in paragraphs [0160]-[0238] of US 2018/0221396 A1 and [0161]-[0300] US 2019/0142851 A1 as well as the disclosed exemplary embodiments.

A pharmaceutical formulation of the disclosure may comprise, consist essentially of, or consist of (a) 5-HT hydrochloride hydrate or crystalline form 1 of 5-HT hydrochloride hydrate of the disclosure and (b) at least one second active compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone and (c) a pharmaceutically acceptable excipient. In some embodiments, 5-HT hydrochloride hydrate or crystalline form 1 of 5-HT hydrochloride hydrate and the second active compound(s) are each present in a therapeutically effective amount using a purposefully engineered and unnaturally occurring molar ratios. Exemplary molar ratios of 5-HT hydrochloride hydrate or crystalline form 1 of 5-HT hydrochloride hydrate of the disclosure to the second active compound in a composition of the disclosure include but are not limited to from about 0.1:100 to about 100:0.1, from about 1:100 to about 100:1, from about 1:50 to about 50:1, from about 1:25 to about 25:1, from about 1:20 to about 20:1, from about 1:10 to about 10:1, from about 1:5 to about 5:1, from about 1:2 to about 2:1 or may be about 1:1.

A pharmaceutical formulation of the disclosure may comprise a composition containing 5-HT hydrochloride hydrate or crystalline form 1 of 5-HT hydrochloride hydrate of the disclosure and a serotonergic drug, a purified psilocybin derivative, a purified cannabinoid, or a purified terpene, each present in a therapeutically effective amount using a purposefully engineered and unnaturally occurring molar ratios. Published US applications US 2018/0221396 A1 and US 2019/0142851 A1 disclose compositions comprising a combination of a purified psilocybin derivative with a second purified psilocybin derivative, with one or two purified cannabinoids or with a purified terpene. According to this disclosure composition containing 5-HT hydrochloride hydrate or crystalline form 1 of 5-HT hydrochloride hydrate of the disclosure may be used in place of a "purified psilocybin derivative" in the compositions described in US 2018/0221396 A1 and US 2019/0142851 A1. Accordingly, the disclosure provides a pharmaceutical formulation comprising as (a) 5-HT hydrochloride hydrate or crystalline form 1 of 5-HT hydrochloride hydrate of the disclosure and at least one second component selected from (a) a purified psilocybin derivative, (b) a purified cannabinoid or (c) a purified terpene; and at least one pharmaceutically-acceptable excipient or at least one other adjuvant, as described herein. Such a composition may be a pharmaceutical composition wherein the components are present individually in therapeutically effective amounts or by combination in a therapeutically effective amount to treat a disease, disorder, or condition as described herein.

A serotonergic drug refers to a compound that binds to, blocks, or otherwise influences (e.g., via an allosteric reaction) activity at a serotonin receptor as described in paragraphs [0245]-[0253] of US 2018/0221396 A1 and [0305]-[0311] US 2019/0142851 A1 as well as the disclosed exemplary embodiments. Some exemplary serotonergic drugs include SSRIs and SNRIs. Some examples of specific serotonergic drugs include the following molecules, including any salts, solvates, or polymorphs thereof: 6-allyl-N,N-diethyl-NL; N,N-dibutyl-T; N,N-diethyl-T; N,N-diisopropyl-T; 5-methyoxy-alpha-methyl-T; N,N-dimethyl-T; 2,alpha-dimethyl-T; alpha, N-dimethyl-T; N,N-dipropyl-T; N-ethyl-N-isopropyl-T; alpha-ethyl-T; 6-N,N-triethyl-NL; 3,4-dihydro-7-methoxy-1-methyl-C; 7-methyoxy-1-methyl-C; N, N-dibutyl-4-hydroxy-T; N,N-diethyl-4-hydroxy-T; N,N-diisopropyl-4-hydroxy-T; N, N-dimethyl-4-hydroxy-T; N,N-dimethyl-5-hydroxy-T; N,N-dipropyl-4-hydroxy-T; N-ethyl-4-hydroxy-N-methyl-T; 4-hydroxy-N-isopropyl-N-methyl-T; 4-hydroxy-N-methyl-N-propyl-T; 4-hydroxy-N,N-tetramethylene-T; ibogaine; N,N-diethyl-L; N-butyl-N-methyl-T; N,N-diisopropyl-4,5-methylenedioxy-T; N,N-diisopropyl-5,6-methylenedioxy-T; N,N-dimethyl-4,5-methylenedioxy-T; N,N-dimethyl-5,6-methylenedioxy-T; N-isopropyl-N-methyl-5,6-methylenedioxy-T; N,N-diethyl-2-methyl-T; 2-N, N-trimethyl-T; N-acetyl-5-methoxy-T; N, N-diethyl-5-methoxy-T; N,N-diisopropyl-5-methoxy-T; 5-methoxy-N,N-dimethyl-T; N-isopropyl-4-methoxy-N-methyl-T; N-isopropyl-5-methoxy-N-methyl-T; 5,6-dimethoxy-N-isopropyl-N-methyl-T; 5-methoxy-N-methyl-T; 5-methoxy-N,N-tetramethylene-T; 6-methoxy-1-methyl-1,2,3,4-tetrahydro-C; 5-methoxy-2-N,N-trimethyl-T; N,N-dimethyl-5-methylthio-T; N-isopropyl-N-methyl-T; alpha-methyl-T; N-ethyl-T; N-methyl-T; 6-propyl-NL; N,N-tetramethylene-T; tryptamine; 7-methoxy-1-methyl-1,2,3,4-tetrahydro-C; and alpha, N-dimethyl-5-methoxy-T. For additional information regarding these compounds see Shulgin, A. T., & Shulgin, A. (2016). Tihkal: The Continuation. Berkeley, Calif.: Transform Press. In one embodiment, a serotonergic drug is chosen from alprazolam, amphetamine, aripiprazole, azapirone, a barbiturate, bromazepam, bupropion, buspirone, a cannabinoid, chlordiazepoxide, citalopram, clonazepam, clorazepate, dextromethorphan, diazepam, duloxetine, escitalopram, fluoxetine, flurazepam, fluvoxamine, lorazepam, lysergic acid diethylamide, lysergamide, 3,4-methylenedioxymethamphetamine, milnacipran, mirtazapine, naratriptan, paroxetine, pethidine, phenethylamine, psicaine, oxazepam, reboxetine, serenic, serotonin, sertraline, temazepam, tramadol, triazolam, a tryptamine, venlafaxine, vortioxetine, and/or derivatives thereof. In an exemplary embodiment, the serotonergic drug is 3,4-methylenedioxymethamphetamine.

Exemplary psilocybin derivatives include but are not limited to psilocybin itself and the psilocybin derivates described in paragraphs [0081]-[0109] of US 2018/0221396 A1 and [0082]-[0110] US 2019/0142851 A1 as well as the disclosed exemplary embodiments. In one embodiment, the compositions disclosed herein comprise one or more purified psilocybin derivatives chosen from: [3-(2-dimethylaminoethyl)-1H-indol-4-yl]dihydrogen phosphate; 4-hydroxytryptamine; 4-hydroxy-N,N-dimethyltryptamine; [3-(2-methylaminoethyl)-1H-indol-4-yl]dihydrogen phosphate; 4-hydroxy-N-methyltryptamine; [3-(aminoethyl)-1H-indol-4-yl]dihydrogen phosphate; [3-(2-trimethylaminoethyl)-1H-indol-4-yl] dihydrogen phosphate; and 4-hydroxy-N,N,N-trimethyltryptamine.

Exemplary cannabinoids include but are not limited to the cannabinoids described in paragraphs [0111]-[0145] of US 2018/0221396 A1 and [0112]-[0146] US 2019/0142851 A1 as well as the disclosed exemplary embodiments. Examples of cannabinoids within the context of this disclosure include the following molecules: cannabichromene (CBC); cannabichromenic acid (CBCA); cannabichromevarin (CBCV); cannabichromevarinic acid (CBCVA); cannabicyclol (CBL); cannabicyclolic acid (CBLA); cannabicyclovarin (CBLV); cannabidiol (CBD); cannabidiol monomethylether (CBDM); cannabidiolic acid (CBDA); cannabidiorcol (CBD-C1); cannabidivarin (CBDV); cannabidivarinic acid (CBDVA); cannabielsoic acid B (CBEA-B); cannabielsoin (CBE); cannabielsoin acid A (CBEA-A); cannabigerol (CBG); cannabigerol monomethylether (CBGM); cannabigerolic acid (CBGA); cannabigerolic acid monomethylether (CBGAM); cannabigerovarin (CBGV); cannabigerovarinic acid (CBGVA); cannabinodiol (CBND); cannabinodivarin (CBDV); cannabinol (CBN); cannabinol methylether (CBNM); cannabinol-C2 (CBN-C2); cannabinol-C4 (CBN-C4); cannabinolic acid (CBNA); cannabiorcool (CBN-C1); cannabivarin (CBV); cannabitriol (CBT); cannabitriolvarin (CBTV); 10-ethoxy-9-hydroxy-delta-6a-tetrahydrocannabinol; cannbicitran (CBTC); cannabiripsol (CBR); 8,9-dihydroxy-delta-6a-tetrahydrocannabinol; delta-8-tetrahydrocannabinol (Δ8-THC); delta-8-tetrahydrocannabinolic acid (A8-THCA); delta-9-tetrahydrocannabinol (THC); delta-9-tetrahydrocannabinol-C4 (THC-C4); delta-9-tetrahydrocannabinolic acid A (THCA-A); delta-9-tetrahydrocannabinolic acid B (THCA-B); delta-9-tetrahydrocannabinolic acid-C4 (THCA-C4); delta-9-tetrahydrocannabiorcol (THC-C1); delta-9-tetrahydrocannabiorcolic acid (THCA-C1); delta-9-tetrahydrocannabivarin (THCV); delta-9-tetrahydrocannabivarinic acid (THCVA); 10-oxo-delta-6a-tetrahydrocannabinol (OTHC); cannabichromanon (CBCF); cannabifuran (CBF); cannabiglendol; delta-9-cis-tetrahydrocannabinol (cis-THC); tryhydroxy-delta-9-tetrahydrocannabinol (triOH-THC); dehydrocannabifuran (DCBF); and 3,4,5,6-tetrahydro-7-hydroxy-alpha-alpha-2-trimethyl-9-n-propyl-2,6-metha-no-2H-1-benzoxocin-5-methanol. In one embodiment, the purified cannabinoid is chosen from THC, THCA, THCV, THCVA, CBC, CBCA, CBCV, CBCVA, CBD, CBDA, CBDV, CBDVA, CBG, CBGA, or CBGVA.

Exemplary terpenes include but are not limited to the terpenes described in paragraphs [0160]-[0238] of US 2018/0221396 A1 and [0161]-[0300] US 2019/0142851 A1 as well as the disclosed exemplary embodiments. In one embodiment, a purified terpene is chosen from acetanisole, acetyl cedrene, anethole, anisole, benzaldehyde, bornyl acetate, borneol, cadinene, cafestol, caffeic acid, camphene, camphor, capsaicin, carene, carotene, carvacrol, carvone, caryophyllene, caryophyllene, caryophyllene oxide, cedrene, cedrene epoxide, cecanal, cedrol, cembrene, cinnamaldehyde, cinnamic acid, citronellal, citronellol, cymene, eicosane, elemene, estragole, ethyl acetate, ethyl cinnamate, ethyl maltol, eucalyptol/1,8-cineole, eudesmol, eugenol, euphol, farnesene, farnesol, fenchone, geraniol, geranyl acetate, guaia-1(10),11-diene, guaiacol, guaiol, guaiene, gurjunene, herniarin, hexanaldehyde, hexanoic acid, humulene, ionone, ipsdienol, isoamyl acetate, isoamyl alcohol, isoamyl formate, isoborneol, isomyrcenol, isoprene, isopulegol, isovaleric acid, lavandulol, limonene, gamma-linolenic acid, linalool, longifolene, lycopene, menthol, methyl butyrate, 3-mercapto-2-methylpentanal, beta-mercaptoethanol, mercaptoacetic acid, methyl salicylate, methylbutenol, methyl-2-methylvalerate, methyl thiobutyrate, myrcene, gamma-muurolene, nepetalactone, nerol, nerolidol, neryl acetate, nonanaldehyde, nonanoic acid, ocimene, octanal, octanoic acid, pentyl butyrate, phellandrene, phenylacetaldehyde, phenylacetic acid, phenylethanethiol, phytol, pinene, propanethiol, pristimerin, pulegone, retinol, rutin, sabinene, squalene, taxadiene, terpineol, terpine-4-ol, terpinolene, thujone, thymol, umbelliferone, undecanal, verdoxan, or vanillin. In one embodiment, a purified terpene is chosen from bornyl acetate, alpha-bisabolol, borneol, camphene, camphor, carene, caryophyllene, cedrene, cymene, elemene, eucalyptol, eudesmol, farnesene, fenchol, geraniol, guaiacol, humulene, isoborneol, limonene, linalool, menthol, myrcene, nerolidol, ocimene, phellandrene, phytol, pinene, pulegone, sabinene, terpineol, terpinolene, or valencene.

As used herein, the term "adrenergic drug" refers to a compound that binds, blocks, or otherwise influences (e.g., via an allosteric reaction) activity at an adrenergic receptor. In one embodiment, an adrenergic drug binds to an adrenergic receptor. In one embodiment, an adrenergic drug indirectly affects an adrenergic receptor, e.g., via interactions affecting the reactivity of other molecules at the adrenergic receptor. In one embodiment, an adrenergic drug is an agonist, e.g., a compound activating an adrenergic receptor. In one embodiment, an adrenergic drug is an antagonist, e.g., a compound binding but not activating an adrenergic receptor, e.g., blocking a receptor. In one embodiment, an adrenergic drug is an effector molecule, e.g., a compound binding to an enzyme for allosteric regulation. In one embodiment, an adrenergic drug acts (either directly or indirectly) at more than one type of receptor (e.g., 5HT, dopamine, adrenergic, acetylcholine, etc.).

In one embodiment, an adrenergic drug is an antidepressant. In one embodiment, an adrenergic drug is a norepinephrine transporter inhibitor. In one embodiment, an adrenergic drug is a vesicular monoamine transporter inhibitor. In one embodiment, an adrenergic drug is chosen from adrenaline, agmatine, amoxapine, aptazapine, atomoxetine, bupropion, clonidine, doxepin, duloxetine, esmirtazpine, mianserin, ketanserin, mirabegron, mirtazapine, norepinephrine, phentolamine, phenylephrine, piperoxan, reserpine, ritodrine, setiptiline, tesofensine, timolol, trazodone, trimipramine, or xylazine.

As used herein, the term "dopaminergic drug" refers to a compound that binds, blocks, or otherwise influences (e.g., via an allosteric reaction) activity at a dopamine receptor. In one embodiment, a dopaminergic drug binds to a dopamine receptor. In one embodiment, a dopaminergic drug indirectly affects a dopamine receptor, e.g., via interactions affecting the reactivity of other molecules at the dopamine receptor. In one embodiment, a dopaminergic drug is an agonist, e.g., a compound activating a dopamine receptor. In one embodiment, a dopaminergic drug is an antagonist, e.g., a compound binding but not activating a dopamine receptor, e.g., blocking a receptor. In one embodiment, a dopaminergic drug is an effector molecule, e.g., a compound binding to an enzyme for allosteric regulation. In one embodiment, a dopaminergic drug acts (either directly or indirectly) at more than one type of receptor (e.g., 5HT, dopamine, adrenergic, acetylcholine, etc.).

In one embodiment, a dopaminergic drug is a dopamine transporter inhibitor. In one embodiment, a dopaminergic drug is a vesicular monoamine transporter inhibitor. In one embodiment, a dopaminergic drug is chosen from amineptine, apomorphine, benzylpiperazine, bromocriptine, cabergoline, chlorpromazine, clozapine, dihydrexidine, domperidone, dopamine, fluphenazine, haloperidol, ketamine, loxapine, methamphetamine, olanzapine, pemoline, perphenazine, pergolide, phencyclidine, phenethylamine, phenmetrazine, pimozide, piribedil, a psychostimulant, reserpine, risperidone, ropinirole, tetrabenazine, or thioridazine.

As used herein, the term "monoamine oxidase inhibitor" (MAOI) refers to a compound that blocks the actions of monoamine oxidase enzymes. In on embodiment, a MAOI inhibits the activity of one or both monoamine oxidase A and monoamine oxidase B. In one embodiment a MAOI is a reversible inhibitors of monoamine oxidase A. In one embodiment a MAOI is a drug chosen from isocarboxazid, phenelzine, or tranylcypromine. In one embodiment, a MAOI is β-carboline, pinoline, harmane, harmine, harmaline, harmalol, tetrahydroharmine, 9-methyl-β-carboline, or 3-carboxy-tetrahydrononharman.

In one embodiment, the compositions and methods disclosed herein include one or more purified erinacine molecules. In one embodiment, the compositions and methods disclosed herein comprise purified erinacine A. In one embodiment, the compositions and methods disclosed herein comprise erinacine B. In one embodiment, the compositions and methods disclosed herein comprise erinacine C. In one embodiment, the compositions and methods disclosed herein comprise erinacine D. In one embodiment, the compositions and methods disclosed herein comprise erinacine E. In one embodiment, the compositions and methods disclosed herein comprise erinacine F. In one embodiment, the compositions and methods disclosed herein comprise erinacine G. In one embodiment, the compositions and methods disclosed herein comprise erinacine H. In one embodiment, the compositions and methods disclosed herein comprise erinacine I. In one embodiment, the compositions and methods disclosed herein comprise erinacine J. In one embodiment, the compositions and methods disclosed herein comprise erinacine K In one embodiment, the compositions and methods disclosed herein comprise erinacine P. In one embodiment, the compositions and methods disclosed herein comprise erinacine Q. In one embodiment, the compositions and methods disclosed herein comprise erinacine R. In one embodiment, the compositions and methods disclosed herein comprise erinacine S.

In one embodiment, the compositions and methods disclosed herein include one or more purified hericenone molecules. In one embodiment, the compositions and methods disclosed herein comprise purified hericenone A. In one embodiment, the compositions and methods disclosed herein comprise purified hericenone B. In one embodiment, the compositions and methods disclosed herein comprise purified hericenone C. In one embodiment, the compositions and methods disclosed herein comprise purified hericenone D. In one embodiment, the compositions and methods disclosed herein comprise purified hericenone E. In one embodiment, the compositions and methods disclosed herein comprise purified hericenone F. In one embodiment, the compositions and methods disclosed herein comprise purified hericenone G. In one embodiment, the compositions and methods disclosed herein comprise purified hericenone H.

Exemplary compositions of 5-HT hydrochloride hydrate or crystalline form 1 of 5-HT hydrochloride hydrate of the disclosure and a second compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone in exemplary molar ratios are shown in Table 1. 5-HT hydrochloride hydrate or crystalline form 1 of 5-HT hydrochloride hydrate of the disclosure may be any one of the exemplary embodiments described above including the crystalline form as disclosed herein.

TABLE 1

| Second Compound | Molar ratio of 5-HT hydrochloride hydrate or crystalline form 1 of 5-HT hydrochloride hydrate:second compound | Molar ratio of 5-HT hydrochloride hydrate or crystalline form 1 of 5-HT hydrochloride hydrate:second compound | Molar ratio of a 5-HT hydrochloride hydrate or crystalline form 1 of 5-HT hydrochloride hydrate:second compound |
|---|---|---|---|
| 3,4-methylenedioxymethamphetamine | About 1:100 to about 100:1 | About 1:25 to about 25:1 | About 1:5 to about 5:1 |
| Citalopram | About 1:100 to about 100:1 | About 1:25 to about 25:1 | About 1:5 to about 5:1 |
| Escitalopram | About 1:100 to about 100:1 | About 1:25 to about 25:1 | About 1:5 to about 5:1 |
| Fluoxetine | About 1:100 to about 100:1 | About 1:25 to about 25:1 | About 1:5 to about 5:1 |
| Paroxetine | About 1:100 to about 100:1 | About 1:25 to about 25:1 | About 1:5 to about 5:1 |

TABLE 1-continued

| Second Compound | Molar ratio of 5-HT hydrochloride hydrate or crystalline form 1 of 5-HT hydrochloride hydrate:second compound | Molar ratio of 5-HT hydrochloride hydrate or crystalline form 1 of 5-HT hydrochloride hydrate:second compound | Molar ratio of a 5-HT hydrochloride hydrate or crystalline form 1 of 5-HT hydrochloride hydrate:second compound |
|---|---|---|---|
| Sertraline | About 1:100 to about 100:1 | About 1:25 to about 25:1 | About 1:5 to about 5:1 |
| Duloxetine | About 1:100 to about 100:1 | About 1:25 to about 25:1 | About 1:5 to about 5:1 |
| [3-(2-dimethylaminoethyl)-1H-indol-4-yl] dihydrogen phosphate | About 1:100 to about 100:1 | About 1:25 to about 25:1 | About 1:5 to about 5:1 |
| 4-hydroxytryptamine | About 1:100 to about 100:1 | About 1:25 to about 25:1 | About 1:5 to about 5:1 |
| 4-hydroxy-N,N-dimethyltryptamine | About 1:100 to about 100:1 | About 1:25 to about 25:1 | About 1:5 to about 5:1 |
| [3-(2-methylaminoethyl)-1H-indol-4-yl] dihydrogen phosphate | About 1:100 to about 100:1 | About 1:25 to about 25:1 | About 1:5 to about 5:1 |
| 4-hydroxy-N-methyltryptamine | About 1:100 to about 100:1 | About 1:25 to about 25:1 | About 1:5 to about 5:1 |
| [3-(aminoethyl)-1H-indol-4-yl] dihydrogen phosphate | About 1:100 to about 100:1 | About 1:25 to about 25:1 | About 1:5 to about 5:1 |
| [3-(2-trimethylaminoethyl)-1H-indol-4-yl] dihydrogen phosphate | About 1:100 to about 100:1 | About 1:25 to about 25:1 | About 1:5 to about 5:1 |
| 4-hydroxy-N,N,N-trimethyltryptamine | About 1:100 to about 100:1 | About 1:25 to about 25:1 | About 1:5 to about 5:1 |
| THC | About 1:100 to about 100:1 | About 1:25 to about 25:1 | About 1:5 to about 5:1 |
| CBC | About 1:100 to about 100:1 | About 1:25 to about 25:1 | About 1:5 to about 5:1 |
| CBD | About 1:100 to about 100:1 | About 1:25 to about 25:1 | About 1:5 to about 5:1 |
| CBG | About 1:100 to about 100:1 | About 1:25 to about 25:1 | About 1:5 to about 5:1 |
| Myrcene | About 1:100 to about 100:1 | About 1:25 to about 25:1 | About 1:5 to about 5:1 |
| Pinene | About 1:100 to about 100:1 | About 1:25 to about 25:1 | About 1:5 to about 5:1 |
| Caryophyllene | About 1:100 to about 100:1 | About 1:25 to about 25:1 | About 1:5 to about 5:1 |
| Limonene | About 1:100 to about 100:1 | About 1:25 to about 25:1 | About 1:5 to about 5:1 |
| Humulene | About 1:100 to about 100:1 | About 1:25 to about 25:1 | About 1:5 to about 5:1 |
| Linalool | About 1:100 to about 100:1 | About 1:25 to about 25:1 | About 1:5 to about 5:1 |
| Adrenaline | About 1:100 to about 100:1 | About 1:25 to about 25:1 | About 1:5 to about 5:1 |
| Amineptine | About 1:100 to about 100:1 | About 1:25 to about 25:1 | About 1:5 to about 5:1 |
| Erinacine A | About 1:100 to about 100:1 | About 1:25 to about 25:1 | About 1:5 to about 5:1 |
| Hericenone A | About 1:100 to about 100:1 | About 1:25 to about 25:1 | About 1:5 to about 5:1 |
| Phenelzine | About 1:100 to about 100:1 | About 1:25 to about 25:1 | About 1:5 to about 5:1 |

Exemplary pharmaceutical compositions of 5-HT hydrochloride hydrate or crystalline form 1 of 5-HT hydrochloride hydrate of the disclosure and a second compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone and an excipient with exemplary molar ratios of 5-HT hydrochloride hydrate or crystalline form 1 of 5-HT hydrochloride hydrate to the second compound are shown in Table 2. 5-HT hydrochloride hydrate or crystalline form 1 of 5-HT hydrochloride hydrate of the disclosure may be any one of the exemplary embodiments described above including the crystalline form as disclosed herein.

TABLE 2

| Second Compound | Molar ratio of 5-HT hydrochloride hydrate or crystalline form 1 of 5-HT hydrochloride hydrate:second compound | Molar ratio of 5-HT hydrochloride hydrate or crystalline form 1 of 5-HT hydrochloride hydrate:second compound | Molar ratio of 5-HT hydrochloride hydrate or crystalline form 1 of 5-HT hydrochloride hydrate:second compound |
|---|---|---|---|
| 3,4-methylenedioxymethamphetamine | About 1:100 to about 100:1 | About 1:25 to about 25:1 | About 1:5 to about 5:1 |
| Citalopram | About 1:100 to about 100:1 | About 1:25 to about 25:1 | About 1:5 to about 5:1 |
| Escitalopram | About 1:100 to about 100:1 | About 1:25 to about 25:1 | About 1:5 to about 5:1 |
| Fluoxetine | About 1:100 to about 100:1 | About 1:25 to about 25:1 | About 1:5 to about 5:1 |
| Paroxetine | About 1:100 to about 100:1 | About 1:25 to about 25:1 | About 1:5 to about 5:1 |
| Sertraline | About 1:100 to about 100:1 | About 1:25 to about 25:1 | About 1:5 to about 5:1 |
| Duloxetine | About 1:100 to about 100:1 | About 1:25 to about 25:1 | About 1:5 to about 5:1 |
| [3-(2-dimethylaminoethyl)-1H-indol-4-yl] dihydrogen phosphate | About 1:100 to about 100:1 | About 1:25 to about 25:1 | About 1:5 to about 5:1 |
| 4-hydroxytryptamine | About 1:100 to about 100:1 | About 1:25 to about 25:1 | About 1:5 to about 5:1 |
| 4-hydroxy-N,N-dimethyltryptamine | About 1:100 to about 100:1 | About 1:25 to about 25:1 | About 1:5 to about 5:1 |
| [3-(2-methylaminoethyl)-1H-indol-4-yl] dihydrogen phosphate | About 1:100 to about 100:1 | About 1:25 to about 25:1 | About 1:5 to about 5:1 |
| 4-hydroxy-N-methyltryptamine | About 1:100 to about 100:1 | About 1:25 to about 25:1 | About 1:5 to about 5:1 |
| [3-(aminoethyl)-1H-indol-4-yl] dihydrogen phosphate | About 1:100 to about 100:1 | About 1:25 to about 25:1 | About 1:5 to about 5:1 |
| [3-(2-trimethylaminoethyl)-1H-indol-4-yl] dihydrogen phosphate | About 1:100 to about 100:1 | About 1:25 to about 25:1 | About 1:5 to about 5:1 |
| 4-hydroxy-N,N,N-trimethyltryptamine | About 1:100 to about 100:1 | About 1:25 to about 25:1 | About 1:5 to about 5:1 |
| THC | About 1:100 to about 100:1 | About 1:25 to about 25:1 | About 1:5 to about 5:1 |
| CBC | About 1:100 to about 100:1 | About 1:25 to about 25:1 | About 1:5 to about 5:1 |
| CBD | About 1:100 to about 100:1 | About 1:25 to about 25:1 | About 1:5 to about 5:1 |
| CBG | About 1:100 to about 100:1 | About 1:25 to about 25:1 | About 1:5 to about 5:1 |
| Myrcene | About 1:100 to about 100:1 | About 1:25 to about 25:1 | About 1:5 to about 5:1 |
| Pinene | About 1:100 to about 100:1 | About 1:25 to about 25:1 | About 1:5 to about 5:1 |
| Caryophyllene | About 1:100 to about 100:1 | About 1:25 to about 25:1 | About 1:5 to about 5:1 |
| Limonene | About 1:100 to about 100:1 | About 1:25 to about 25:1 | About 1:5 to about 5:1 |
| Humulene | About 1:100 to about 100:1 | About 1:25 to about 25:1 | About 1:5 to about 5:1 |
| Linalool | About 1:100 to about 100:1 | About 1:25 to about 25:1 | About 1:5 to about 5:1 |
| Adrenaline | About 1:100 to about 100:1 | About 1:25 to about 25:1 | About 1:5 to about 5:1 |
| Amineptine | About 1:100 to about 100:1 | About 1:25 to about 25:1 | About 1:5 to about 5:1 |
| Erinacine A | About 1:100 to about 100:1 | About 1:25 to about 25:1 | About 1:5 to about 5:1 |
| Hericenone A | About 1:100 to about 100:1 | About 1:25 to about 25:1 | About 1:5 to about 5:1 |
| Phenelzine | About 1:100 to about 100:1 | About 1:25 to about 25:1 | About 1:5 to about 5:1 |

An "effective amount" or a "therapeutically effective amount" of 5-HT hydrochloride hydrate or crystalline form 1 of 5-HT hydrochloride hydrate of the disclosure is generally in the range of about 0.1 to about 100 mg daily (oral dose), of about 0.1 to about 50 mg daily (oral dose) of about 0.25 to about 25 mg daily (oral dose), of about 0.1 to about 5 mg daily (oral dose) or of about 0.5 to about 2.5 mg daily (oral dose). The actual amount required for treatment of any particular patient may depend upon a variety of factors including, for example, the disease being treated and its severity; the specific pharmaceutical composition employed; the age, body weight, general health, sex, and diet of the patient; the mode of administration; the time of administration; the route of administration; and the rate of excretion; the duration of the treatment; any drugs used in combination or coincidental with the specific compound employed; and other such factors well known in the medical arts. These factors are discussed in Goodman and Gilman's "The Pharmacological Basis of Therapeutics," Tenth Edition, A. Gilman, J. Hardman and L. Limbird, eds., McGraw-Hill Press, 155-173 (2001), which is incorporated herein by reference. 5-HT hydrochloride hydrate or crystalline form 1 of 5-HT hydrochloride hydrate of the disclosure and pharmaceutical compositions containing it may be used in combination with other agents that are generally administered to a patient being treated for psychological and other disorders discussed above. They may also be co-formulated with one or more of such agents in a single pharmaceutical composition.

Depending on the type of pharmaceutical composition, the pharmaceutically acceptable carrier may be chosen from any one or a combination of carriers known in the art. The choice of the pharmaceutically acceptable carrier depends upon the pharmaceutical form and the desired method of administration to be used. Exemplary carriers include those that do not substantially alter the structure or activity of 5-HT hydrochloride hydrate or crystalline form 1 of 5-HT hydrochloride hydrate of the disclosure, or produce undesirable biological effects or otherwise interact in a deleterious manner with any other component(s) of the pharmaceutical composition.

The pharmaceutical compositions of the disclosure may be prepared by methods know in the pharmaceutical formulation art, for example, see Remington's Pharmaceutical Sciences, 18th Ed., (Mack Publishing Company, Easton, Pa., 1990), which is incorporated herein by reference. In a solid dosage form, 5-HT hydrochloride hydrate or crystalline form 1 of 5-HT hydrochloride hydrate of the disclosure may be admixed with at least one pharmaceutically acceptable excipient such as, for example, sodium citrate or dicalcium phosphate or (a) fillers or extenders, such as, for example, starches, lactose, sucrose, glucose, mannitol, and silicic acid, (b) binders, such as, for example, cellulose derivatives, starch, alginates, gelatin, polyvinylpyrrolidone, sucrose, and gum acacia, (c) humectants, such as, for example, glycerol, (d) disintegrating agents, such as, for example, agar-agar, calcium carbonate, potato or tapioca starch, alginic acid, croscarmellose sodium, complex silicates, and sodium carbonate, (e) solution retarders, such as, for example, paraffin, (f) absorption accelerators, such as, for example, quaternary ammonium compounds, (g) wetting agents, such as, for example, cetyl alcohol, and glycerol monostearate, magnesium stearate and the like, (h) adsorbents, such as, for example, kaolin and bentonite, and (i) lubricants, such as, for example, talc, calcium stearate, magnesium stearate, solid polyethylene glycols, sodium lauryl sulfate, or mixtures thereof. In the case of capsules, tablets, and pills, the dosage forms may also comprise buffering agents. In some embodiments, the excipient is not water. In some embodiments, the excipient is not a solvent (e.g., EtOH, diethyl ether, ethyl acetate, or hydrocarbon-based solvents (e.g., hexanes). In some embodiments, the dosage form is substantially free of water and/or solvents, for example less than about 5% water by mass, less than 2% water by mass, less than 1% water by mass, less than 0.5% water by mass, or less than 0.1% water by mass.

Excipients or pharmaceutically acceptable adjuvants known in the pharmaceutical formulation art may also be used in the pharmaceutical compositions of the disclosure. These include, but are not limited to, preserving, wetting, suspending, sweetening, flavoring, perfuming, emulsifying, and dispensing agents. Prevention of the action of microorganisms may be ensured by inclusion of various antibacterial and antifungal agents, for example, parabens, chlorobutanol, phenol, sorbic acid, and the like. It may also be desirable to include isotonic agents, for example, sugars, sodium chloride, and the like. If desired, a pharmaceutical composition of the disclosure may also contain minor amounts of auxiliary substances such as wetting or emulsifying agents, pH buffering agents, antioxidants, and the like, such as, for example, citric acid, sorbitan monolaurate, triethanolamine oleate, butylated hydroxytoluene, etc.

Solid dosage forms of the disclosure may be prepared with coatings and shells, such as enteric coatings and others well known in the art. They may contain pacifying agents and can also be of such composition that they release the active compound or compounds in a certain part of the intestinal tract in a delayed manner. Non-limiting examples of embedded compositions that may be used are polymeric substances and waxes. The active compounds may also be in microencapsulated form, if appropriate, with one or more of the above-mentioned excipients.

Suspensions of the disclosure, in addition to the active compounds, may contain suspending agents, such as, for example, ethoxylated isostearyl alcohols, polyoxyethylene sorbitol and sorbitan esters, microcrystalline cellulose, aluminum metahydroxide, bentonite, agar-agar and tragacanth, or mixtures of these substances, and the like.

Solid dosage forms for oral administration of the disclosure, which includes capsules, tablets, pills, powders, and granules, may be used. In such solid dosage forms, the active compound may be mixed with at least one inert, pharmaceutically acceptable excipient (also known as a pharmaceutically acceptable carrier).

Administration of 5-HT hydrochloride hydrate or crystalline form 1 of 5-HT hydrochloride hydrate of the disclosure in pure form or in an appropriate pharmaceutical composition may be carried out via any of the accepted modes of administration or agents for serving similar utilities. Thus, administration may be, for example, orally, buccally, nasally, parenterally (intravenous, intramuscular, or subcutaneous), topically, transdermally, intravaginally, intravesically, or intrasystemically, in the form of solid, semi-solid, lyophilized powder, or liquid dosage forms, such as, for example, tablets, suppositories, pills, soft elastic and hard gelatin capsules, powders, solutions, suspensions, or aerosols, or the like, such as, for example, in unit dosage forms suitable for simple administration of precise dosages. One route of administration may be oral administration, using a convenient daily dosage regimen that can be adjusted according to the degree of severity of the disease-state to be treated.

The disclosure also relates to compositions comprising an effective amount of crystalline form 1 of 4-AcO-EPT fumarate fumaric acid, including its exemplary embodiments discussed above, and an excipient (e.g., a pharmaceutically-acceptable excipient). In another embodiment, the disclosure also relates to pharmaceutical compositions comprising a therapeutically effective amount of crystalline form 1 of 4-AcO-EPT fumarate fumaric acid, including its exemplary embodiments discussed above, and a pharmaceutically acceptable excipient (also known as a pharmaceutically acceptable carrier). As discussed above, a crystalline form 1 of 4-AcO-EPT fumarate fumaric acid of the disclosure may be, for example, therapeutically useful to prevent and/or treat the psychological disorders, brain disorders, pain, and inflammation as well as the other disorders described herein.

A composition or a pharmaceutical composition of the disclosure may be in any form which contains crystalline form 1 of 4-AcO-EPT fumarate fumaric acid. The composition may be, for example, a tablet, capsule, liquid suspension, injectable, topical, or transdermal. The compositions generally contain, for example, about 1% to about 99% by weight of crystalline form 1 of 4-AcO-EPT fumarate fumaric acid and, for example, 99% to 1% by weight of at least one suitable pharmaceutically acceptable excipient. In one embodiment, the composition may be between about 5% and about 75% by weight of crystalline form 1 of 4-AcO-EPT fumarate fumaric acid, with the rest being at least one suitable pharmaceutically acceptable excipient or at least one other adjuvant, as discussed below.

According to this disclosure, a crystalline form 1 of 4-AcO-EPT fumarate fumaric acid compound of the disclosure may be used as the "first purified psilocybin derivative" in the compositions described in US 2018/0221396 A1 and US 2019/0142851 A1. Accordingly, this disclosure provides a composition comprising: a first component comprising crystalline form 1 of 4-AcO-EPT fumarate fumaric acid according to the disclosure; at least one second component selected from at least one of (a) a serotonergic drug, (b) a purified psilocybin derivative, (c) a purified cannabinoid or (d) a purified terpene; and at least one pharmaceutically-acceptable excipient or at least one other adjuvant. Such a composition may be a pharmaceutical composition wherein the components are present individually in therapeutically effective amounts or by combination in a therapeutically effective amount to treat a disease, disorder, or condition as described herein.

When used in such compositions as a first component comprising crystalline form 1 of 4-AcO-EPT fumarate fumaric acid of the disclosure with a second component selected from at least one of (a) a serotonergic drug, (b) a purified psilocybin derivative, (c) a purified cannabinoid, or (d) a purified terpene, the compositions represent particular embodiments of the invention. Compositions having as a first component at least crystalline form 1 of 4-AcO-EPT fumarate fumaric acid of the disclosure with a second component selected from at least one of (e) an adrenergic drug, (f) a dopaminergic drug, (g) a monoamine oxidase inhibitor, (h) a purified erinacine, (i) a purified hericenone represent additional particular embodiments of the invention represented by the compositions having crystalline form 1 of 4-AcO-EPT fumarate fumaric acid according to the disclosure. In some embodiments, the first and second components can be administered at the same time (e.g., together in the same composition), or at separate times over the course of treating a patient in need thereof. Such a composition may be a pharmaceutical composition wherein the components are present individually in therapeutically effective amounts or by combination in a therapeutically effective amount to treat a disease, disorder, or condition as described herein.

A pharmaceutical formulation of the disclosure may comprise, consist essentially of, or consist of (a) crystalline form 1 of 4-AcO-EPT fumarate fumaric acid according to the disclosure and (b) at least one second active compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone and (c) a pharmaceutically acceptable excipient. In some embodiments, crystalline form 1 of 4-AcO-EPT fumarate fumaric acid and the second active compound(s) are each present in a therapeutically effective amount using a purposefully engineered and unnaturally occurring molar ratios. Exemplary molar ratios of crystalline form 1 of 4-AcO-EPT fumarate fumaric acid according to the disclosure to the second active compound in a composition of the disclosure include but are not limited to from about 0.1:100 to about 100:0.1, from about 1:100 to about 100:1, from about 1:50 to about 50:1, from about 1:25 to about 25:1, from about 1:20 to about 20:1, from about 1:10 to about 10:1, from about 1:5 to about 5:1, from about 1:2 to about 2:1 or may be about 1:1.

A pharmaceutical formulation of the disclosure may comprise a composition containing crystalline form 1 of 4-AcO-EPT fumarate fumaric acid according to the disclosure and a serotonergic drug, a purified psilocybin derivative, a purified cannabinoid, or a purified terpene, each present in a therapeutically effective amount using a purposefully engineered and unnaturally occurring molar ratios. Published US applications US 2018/0221396 A1 and US 2019/0142851 A1 disclose compositions comprising a combination of a purified psilocybin derivative with a second purified psilocybin derivative, with one or two purified cannabinoids or with a purified terpene. According to this disclosure composition containing crystalline form 1 of 4-AcO-EPT fumarate fumaric acid according to the disclosure may be used in place of a "purified psilocybin derivative" in the compositions described in US 2018/0221396 A1 and US 2019/0142851 A1. Accordingly, the disclosure provides a pharmaceutical formulation comprising as (a) at least crystalline form 1 of 4-AcO-EPT fumarate fumaric acid according to the disclosure and at least one second component selected from (a) a purified psilocybin derivative, (b) a purified cannabinoid or (c) a purified terpene; and at least one pharmaceutically-acceptable excipient or at least one other adjuvant, as described herein. Such a composition may be a pharmaceutical composition wherein the components are present individually in therapeutically effective amounts or by combination in a therapeutically effective amount to treat a disease, disorder, or condition as described herein.

For the purposes of this disclosure, exemplary serotonergic drugs, psilocybin derivatives, cannabinoids, terpenes, adrenergic drugs, dopaminergic drugs, monoamine oxidase inhibitors, erinacines, and hericenones are disclosed above.

Exemplary compositions of crystalline form 1 of 4-AcO-EPT fumarate fumaric acid according to the disclosure and a second compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone in exemplary molar ratios are shown in Table 3. Crystalline form 1 of 4-AcO-EPT fumarate fumaric acid according to the disclosure may be any one of the exemplary embodiments described above including the crystalline form as disclosed herein.

TABLE 3

| Second Compound | Molar ratio of crystalline form 1 of 4-AcO-EPT fumarate fumaric acid:second compound | Molar ratio of crystalline form 1 of 4-AcO-EPT fumarate fumaric acid:second compound | Molar ratio of crystalline form 1 of 4-AcO-EPT fumarate fumaric acid:second compound |
|---|---|---|---|
| 3,4-methylenedioxymethamphetamine | About 1:100 to about 100:1 | About 1:25 to about 25:1 | About 1:5 to about 5:1 |
| Citalopram | About 1:100 to about 100:1 | About 1:25 to about 25:1 | About 1:5 to about 5:1 |
| Escitalopram | About 1:100 to about 100:1 | About 1:25 to about 25:1 | About 1:5 to about 5:1 |
| Fluoxetine | About 1:100 to about 100:1 | About 1:25 to about 25:1 | About 1:5 to about 5:1 |
| Paroxetine | About 1:100 to about 100:1 | About 1:25 to about 25:1 | About 1:5 to about 5:1 |
| Sertraline | About 1:100 to about 100:1 | About 1:25 to about 25:1 | About 1:5 to about 5:1 |
| Duloxetine | About 1:100 to about 100:1 | About 1:25 to about 25:1 | About 1:5 to about 5:1 |
| [3-(2-dimethylaminoethyl)-1H-indol-4-yl] dihydrogen phosphate | About 1:100 to about 100:1 | About 1:25 to about 25:1 | About 1:5 to about 5:1 |
| 4-hydroxytryptamine | About 1:100 to about 100:1 | About 1:25 to about 25:1 | About 1:5 to about 5:1 |
| 4-hydroxy-N,N-dimethyltryptamine | About 1:100 to about 100:1 | About 1:25 to about 25:1 | About 1:5 to about 5:1 |
| [3-(2-methylaminoethyl)-1H-indol-4-yl] dihydrogen phosphate | About 1:100 to about 100:1 | About 1:25 to about 25:1 | About 1:5 to about 5:1 |
| 4-hydroxy-N-methyltryptamine | About 1:100 to about 100:1 | About 1:25 to about 25:1 | About 1:5 to about 5:1 |
| [3-(aminoethyl)-1H-indol-4-yl] dihydrogen phosphate | About 1:100 to about 100:1 | About 1:25 to about 25:1 | About 1:5 to about 5:1 |
| [3-(2-trimethylaminoethyl)-1H-indol-4-yl] dihydrogen phosphate | About 1:100 to about 100:1 | About 1:25 to about 25:1 | About 1:5 to about 5:1 |
| 4-hydroxy-N,N,N-trimethyltryptamine | About 1:100 to about 100:1 | About 1:25 to about 25:1 | About 1:5 to about 5:1 |
| THC | About 1:100 to about 100:1 | About 1:25 to about 25:1 | About 1:5 to about 5:1 |
| CBC | About 1:100 to about 100:1 | About 1:25 to about 25:1 | About 1:5 to about 5:1 |
| CBD | About 1:100 to about 100:1 | About 1:25 to about 25:1 | About 1:5 to about 5:1 |
| CBG | About 1:100 to about 100:1 | About 1:25 to about 25:1 | About 1:5 to about 5:1 |
| Myrcene | About 1:100 to about 100:1 | About 1:25 to about 25:1 | About 1:5 to about 5:1 |
| Pinene | About 1:100 to about 100:1 | About 1:25 to about 25:1 | About 1:5 to about 5:1 |
| Caryophyllene | About 1:100 to about 100:1 | About 1:25 to about 25:1 | About 1:5 to about 5:1 |
| Limonene | About 1:100 to about 100:1 | About 1:25 to about 25:1 | About 1:5 to about 5:1 |
| Humulene | About 1:100 to about 100:1 | About 1:25 to about 25:1 | About 1:5 to about 5:1 |
| Linalool | About 1:100 to about 100:1 | About 1:25 to about 25:1 | About 1:5 to about 5:1 |
| Adrenaline | About 1:100 to about 100:1 | About 1:25 to about 25:1 | About 1:5 to about 5:1 |
| Amineptine | About 1:100 to about 100:1 | About 1:25 to about 25:1 | About 1:5 to about 5:1 |
| Erinacine A | About 1:100 to about 100:1 | About 1:25 to about 25:1 | About 1:5 to about 5:1 |

TABLE 3-continued

| Second Compound | Molar ratio of crystalline form 1 of 4-AcO-EPT fumarate fumaric acid:second compound | Molar ratio of crystalline form 1 of 4-AcO-EPT fumarate fumaric acid:second compound | Molar ratio of crystalline form 1 of 4-AcO-EPT fumarate fumaric acid:second compound |
|---|---|---|---|
| Hericenone A | About 1:100 to about 100:1 | About 1:25 to about 25:1 | About 1:5 to about 5:1 |
| Phenelzine | About 1:100 to about 100:1 | About 1:25 to about 25:1 | About 1:5 to about 5:1 |

Exemplary pharmaceutical compositions of crystalline form 1 of 4-AcO-EPT fumarate fumaric acid according to the disclosure and a second compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone and an excipient with exemplary molar ratios of crystalline form 1 of 4-AcO-EPT fumarate fumaric acid according to the second compound are shown in Table 4. Crystalline form 1 of 4-AcO-EPT fumarate fumaric acid according to the disclosure may be any one of the exemplary embodiments described above including the crystalline form as disclosed herein.

TABLE 4

| Second Compound | Molar ratio of crystalline form 1 of 4-AcO-EPT fumarate fumaric acid:second compound | Molar ratio of crystalline form 1 of 4-AcO-EPT fumarate fumaric acid:second compound | Molar ratio of crystalline form 1 of 4-AcO-EPTfumarate fumaric acid:second compound |
|---|---|---|---|
| 3,4-methylenedioxymethamphetamine | About 1:100 to about 100:1 | About 1:25 to about 25:1 | About 1:5 to about 5:1 |
| Citalopram | About 1:100 to about 100:1 | About 1:25 to about 25:1 | About 1:5 to about 5:1 |
| Escitalopram | About 1:100 to about 100:1 | About 1:25 to about 25:1 | About 1:5 to about 5:1 |
| Fluoxetine | About 1:100 to about 100:1 | About 1:25 to about 25:1 | About 1:5 to about 5:1 |
| Paroxetine | About 1:100 to about 100:1 | About 1:25 to about 25:1 | About 1:5 to about 5:1 |
| Sertraline | About 1:100 to about 100:1 | About 1:25 to about 25:1 | About 1:5 to about 5:1 |
| Duloxetine | About 1:100 to about 100:1 | About 1:25 to about 25:1 | About 1:5 to about 5:1 |
| [3-(2-dimethylaminoethyl)-1H-indol-4-yl] dihydrogen phosphate 4-hydroxytryptamine | About 1:100 to about 100:1 | About 1:25 to about 25:1 | About 1:5 to about 5:1 |
| 4-hydroxy-N,N-dimethyltryptamine | About 1:100 to about 100:1 | About 1:25 to about 25:1 | About 1:5 to about 5:1 |
| [3-(2-methylaminoethyl)-1H-indol-4-yl] dihydrogen phosphate 4-hydroxy-N-methyltryptamine | About 1:100 to about 100:1 | About 1:25 to about 25:1 | About 1:5 to about 5:1 |
| [3-(aminoethyl)-1H-indol-4-yl] dihydrogen phosphate | About 1:100 to about 100:1 | About 1:25 to about 25:1 | About 1:5 to about 5:1 |
| [3-(2-trimethylaminoethyl)-1H-indol-4-yl] dihydrogen phosphate 4-hydroxy-N,N,N-trimethyltryptamine | About 1:100 to about 100:1 | About 1:25 to about 25:1 | About 1:5 to about 5:1 |
| THC | About 1:100 to about 100:1 | About 1:25 to about 25:1 | About 1:5 to about 5:1 |
| CBC | About 1:100 to about 100:1 | About 1:25 to about 25:1 | About 1:5 to about 5:1 |
| CBD | About 1:100 to about 100:1 | About 1:25 to about 25:1 | About 1:5 to about 5:1 |
| CBG | About 1:100 to about 100:1 | About 1:25 to about 25:1 | About 1:5 to about 5:1 |
| Myrcene | About 1:100 to about 100:1 | About 1:25 to about 25:1 | About 1:5 to about 5:1 |
| Pinene | About 1:100 to about 100:1 | About 1:25 to about 25:1 | About 1:5 to about 5:1 |

TABLE 4-continued

| Second Compound | Molar ratio of crystalline form 1 of 4-AcO-EPT fumarate fumaric acid:second compound | Molar ratio of crystalline form 1 of 4-AcO-EPT fumarate fumaric acid:second compound | Molar ratio of crystalline form 1 of 4-AcO-EPTfumarate fumaric acid:second compound |
|---|---|---|---|
| Caryophyllene | About 1:100 to about 100:1 | About 1:25 to about 25:1 | About 1:5 to about 5:1 |
| Limonene | About 1:100 to about 100:1 | About 1:25 to about 25:1 | About 1:5 to about 5:1 |
| Humulene | About 1:100 to about 100:1 | About 1:25 to about 25:1 | About 1:5 to about 5:1 |
| Linalool | About 1:100 to about 100:1 | About 1:25 to about 25:1 | About 1:5 to about 5:1 |
| Adrenaline | About 1:100 to about 100:1 | About 1:25 to about 25:1 | About 1:5 to about 5:1 |
| Amineptine | About 1:100 to about 100:1 | About 1:25 to about 25:1 | About 1:5 to about 5:1 |
| Erinacine A | About 1:100 to about 100:1 | About 1:25 to about 25:1 | About 1:5 to about 5:1 |
| Hericenone A | About 1:100 to about 100:1 | About 1:25 to about 25:1 | About 1:5 to about 5:1 |
| Phenelzine | About 1:100 to about 100:1 | About 1:25 to about 25:1 | About 1:5 to about 5:1 |

An "effective amount" or a "therapeutically effective amount" of crystalline form 1 of 4-AcO-EPT fumarate fumaric acid according to the disclosure is generally in the range of about 0.1 to about 100 mg daily (oral dose), of about 0.1 to about 50 mg daily (oral dose) of about 0.25 to about 25 mg daily (oral dose), of about 0.1 to about 5 mg daily (oral dose) or of about 0.5 to about 2.5 mg daily (oral dose). The actual amount required for treatment of any particular patient may depend upon a variety of factors including, for example, the disease being treated and its severity; the specific pharmaceutical composition employed; the age, body weight, general health, sex, and diet of the patient; the mode of administration; the time of administration; the route of administration; and the rate of excretion; the duration of the treatment; any drugs used in combination or coincidental with the specific compound employed; and other such factors well known in the medical arts. These factors are discussed in Goodman and Gilman's "The Pharmacological Basis of Therapeutics," Tenth Edition, A. Gilman, J. Hardman and L. Limbird, eds., McGraw-Hill Press, 155-173 (2001), which is incorporated herein by reference. Crystalline form 1 of 4-AcO-EPT fumarate fumaric acid of the disclosure and pharmaceutical compositions containing it may be used in combination with other agents that are generally administered to a patient being treated for psychological and other disorders discussed above. They may also be co-formulated with one or more of such agents in a single pharmaceutical composition.

Depending on the type of pharmaceutical composition, the pharmaceutically acceptable carrier may be chosen from any one or a combination of carriers known in the art. The choice of the pharmaceutically acceptable carrier depends upon the pharmaceutical form and the desired method of administration to be used. Exemplary carriers include those that do not substantially alter the structure or activity of crystalline form 1 of 4-AcO-EPT fumarate fumaric acid according to the disclosure, or produce undesirable biological effects or otherwise interact in a deleterious manner with any other component(s) of the pharmaceutical composition.

The pharmaceutical compositions of the disclosure may be prepared by methods know in the pharmaceutical formulation art, for example, see Remington's Pharmaceutical Sciences, 18th Ed., (Mack Publishing Company, Easton, Pa., 1990), which is incorporated herein by reference. In a solid dosage form, crystalline form 1 of 4-AcO-EPT fumarate fumaric acid of the disclosure may be admixed with at least one pharmaceutically acceptable excipient such as, for example, sodium citrate or dicalcium phosphate or (a) fillers or extenders, such as, for example, starches, lactose, sucrose, glucose, mannitol, and silicic acid, (b) binders, such as, for example, cellulose derivatives, starch, alginates, gelatin, polyvinylpyrrolidone, sucrose, and gum acacia, (c) humectants, such as, for example, glycerol, (d) disintegrating agents, such as, for example, agar-agar, calcium carbonate, potato or tapioca starch, alginic acid, croscarmellose sodium, complex silicates, and sodium carbonate, (e) solution retarders, such as, for example, paraffin, (f) absorption accelerators, such as, for example, quaternary ammonium compounds, (g) wetting agents, such as, for example, cetyl alcohol, and glycerol monostearate, magnesium stearate and the like, (h) adsorbents, such as, for example, kaolin and bentonite, and (i) lubricants, such as, for example, talc, calcium stearate, magnesium stearate, solid polyethylene glycols, sodium lauryl sulfate, or mixtures thereof. In the case of capsules, tablets, and pills, the dosage forms may also comprise buffering agents. In some embodiments, the excipient is not water. In some embodiments, the excipient is not a solvent (e.g., EtOH, diethyl ether, ethyl acetate, or hydrocarbon-based solvents (e.g., hexanes). In some embodiments, the dosage form is substantially free of water and/or solvents, for example less than about 5% water by mass, less than 2% water by mass, less than 1% water by mass, less than 0.5% water by mass, or less than 0.1% water by mass.

For purposes of this disclosure, excipients or pharmaceutically acceptable adjuvants, solid dosage forms, suspensions, and solid dosage forms for oral administration are disclosed above.

Administration of crystalline form 1 of 4-AcO-EPT fumarate fumaric acid according to the disclosure in pure form or in an appropriate pharmaceutical composition may be carried out via any of the accepted modes of administration or agents for serving similar utilities. Thus, administration may be, for example, orally, buccally, nasally, parenterally (intravenous, intramuscular, or subcutaneous), topically, transdermally, intravaginally, intravesically, or intrasystemically, in the form of solid, semi-solid, lyophilized powder, or liquid dosage forms, such as, for example, tablets, suppositories, pills, soft elastic and hard gelatin capsules, powders, solutions, suspensions, or aerosols, or the like, such as, for example, in unit dosage forms suitable for simple administration of precise dosages. One route of administration may be oral administration, using a convenient daily dosage regimen that can be adjusted according to the degree of severity of the disease-state to be treated.

The disclosure also relates to compositions comprising an effective amount of MPT iodide or crystalline form 1 of MPT iodide, including its exemplary embodiments discussed above, and an excipient (e.g., a pharmaceutically-acceptable excipient). In another embodiment, the disclosure also relates to pharmaceutical compositions comprising a therapeutically effective amount of MPT iodide or crystalline form 1 of MPT iodide, including its exemplary embodiments discussed above, and a pharmaceutically acceptable excipient (also known as a pharmaceutically acceptable carrier). As discussed above, MPT iodide or crystalline form 1 of MPT iodide of the disclosure may be, for example, therapeutically useful to prevent and/or treat the psychological disorders, brain disorders, pain, and inflammation as well as the other disorders described herein.

A composition or a pharmaceutical composition of the disclosure may be in any form which contains MPT iodide or crystalline form 1 of MPT iodide. The composition may be, for example, a tablet, capsule, liquid suspension, injectable, topical, or transdermal. The compositions generally contain, for example, about 1% to about 99% by weight of MPT iodide or crystalline form 1 of MPT iodide and, for example, 99% to 1% by weight of at least one suitable pharmaceutically acceptable excipient. In one embodiment, the composition may be between about 5% and about 75% by weight of MPT iodide or crystalline form 1 of MPT iodide, with the rest being at least one suitable pharmaceutically acceptable excipient or at least one other adjuvant, as discussed below.

According to this disclosure, MPT iodide or crystalline form 1 of MPT iodide of the disclosure may be used as the "first purified psilocybin derivative" in the compositions described in US 2018/0221396 A1 and US 2019/0142851 A1. Accordingly, this disclosure provides a composition comprising: a first component comprising MPT iodide or crystalline form 1 of MPT iodide according to the disclosure; at least one second component selected from at least one of (a) a serotonergic drug, (b) a purified psilocybin derivative, (c) a purified cannabinoid or (d) a purified terpene; and at least one pharmaceutically-acceptable excipient or at least one other adjuvant. Such a composition may be a pharmaceutical composition wherein the components are present individually in therapeutically effective amounts or by combination in a therapeutically effective amount to treat a disease, disorder, or condition as described herein.

When used in such compositions as a first component comprising MPT iodide or crystalline form 1 of MPT iodide of the disclosure with a second component selected from at least one of (a) a serotonergic drug, (b) a purified psilocybin derivative, (c) a purified cannabinoid, or (d) a purified terpene, the compositions represent particular embodiments of the invention. Compositions having as a first component MPT iodide or crystalline form 1 of MPT iodide of the disclosure with a second component selected from at least one of (e) an adrenergic drug, (f) a dopaminergic drug, (g) a monoamine oxidase inhibitor, (h) a purified erinacine, (i) a purified hericenone represent additional particular embodiments of the invention represented by the compositions having MPT iodide or crystalline form 1 of MPT iodide according to the disclosure. In some embodiments, the first and second components can be administered at the same time (e.g., together in the same composition), or at separate times over the course of treating a patient in need thereof. Such a composition may be a pharmaceutical composition wherein the components are present individually in therapeutically effective amounts or by combination in a therapeutically effective amount to treat a disease, disorder, or condition as described herein.

A pharmaceutical formulation of the disclosure may comprise, consist essentially of, or consist of (a) MPT iodide or crystalline form 1 of MPT iodide according to the disclosure and (b) at least one second active compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone and (c) a pharmaceutically acceptable excipient. In some embodiments, MPT iodide or crystalline form 1 of MPT iodide and the second active compound(s) are each present in a therapeutically effective amount using a purposefully engineered and unnaturally occurring molar ratios. Exemplary molar ratios of MPT iodide or crystalline form 1 of MPT iodide according to the disclosure to the second active compound in a composition of the disclosure include but are not limited to from about 0.1:100 to about 100:0.1, from about 1:100 to about 100:1, from about 1:50 to about 50:1, from about 1:25 to about 25:1, from about 1:20 to about 20:1, from about 1:10 to about 10:1, from about 1:5 to about 5:1, from about 1:2 to about 2:1 or may be about 1:1.

A pharmaceutical formulation of the disclosure may comprise a composition containing MPT iodide or crystalline form 1 of MPT iodide according to the disclosure and a serotonergic drug, a purified psilocybin derivative, a purified cannabinoid, or a purified terpene, each present in a therapeutically effective amount using a purposefully engineered and unnaturally occurring molar ratios. Published US applications US 2018/0221396 A1 and US 2019/0142851 A1 disclose compositions comprising a combination of a purified psilocybin derivative with a second purified psilocybin derivative, with one or two purified cannabinoids or with a purified terpene. According to this disclosure composition containing MPT iodide or crystalline form 1 of MPT iodide according to the disclosure may be used in place of a "purified psilocybin derivative" in the compositions described in US 2018/0221396 A1 and US 2019/0142851 A1. Accordingly, the disclosure provides a pharmaceutical formulation comprising as (a) at least MPT iodide or crystalline form 1 of MPT iodide according to the disclosure and at least one second component selected from (a) a purified psilocybin derivative, (b) a purified cannabinoid or (c) a purified terpene; and at least one pharmaceutically-acceptable excipient or at least one other adjuvant, as described herein. Such a composition may be a pharmaceutical composition wherein the components are present individually in therapeutically effective amounts or by combination in a therapeutically effective amount to treat a disease, disorder, or condition as described herein.

For the purposes of this disclosure, exemplary serotonergic drugs, psilocybin derivatives, cannabinoids, terpenes, adrenergic drugs, dopaminergic drugs, monoamine oxidase inhibitors, erinacines, and hericenones are disclosed above.

Exemplary compositions of MPT iodide or crystalline form 1 of MPT iodide according to the disclosure and a second compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone in exemplary molar ratios are shown in Table 5. MPT iodide or crystalline form 1 of MPT iodide according to the disclosure may be any one of the exemplary embodiments described above including the crystalline form as disclosed herein.

TABLE 5

| Second Compound | Molar ratio of MPT iodide or crystalline form 1 of MPT iodide:second compound | Molar ratio of MPT iodide or crystalline form 1 of MPT iodide:second compound | Molar ratio of MPT iodide or crystalline form 1 of MPT iodide:second compound |
|---|---|---|---|
| 3,4-methylenedioxymethamphetamine | About 1:100 to about 100:1 | About 1:25 to about 25:1 | About 1:5 to about 5:1 |
| Citalopram | About 1:100 to about 100:1 | About 1:25 to about 25:1 | About 1:5 to about 5:1 |
| Escitalopram | About 1:100 to about 100:1 | About 1:25 to about 25:1 | About 1:5 to about 5:1 |
| Fluoxetine | About 1:100 to about 100:1 | About 1:25 to about 25:1 | About 1:5 to about 5:1 |
| Paroxetine | About 1:100 to about 100:1 | About 1:25 to about 25:1 | About 1:5 to about 5:1 |
| Sertraline | About 1:100 to about 100:1 | About 1:25 to about 25:1 | About 1:5 to about 5:1 |
| Duloxetine | About 1:100 to about 100:1 | About 1:25 to about 25:1 | About 1:5 to about 5:1 |
| [3-(2-dimethylaminoethyl)-1H-indol-4-yl] dihydrogen phosphate | About 1:100 to about 100:1 | About 1:25 to about 25:1 | About 1:5 to about 5:1 |
| 4-hydroxytryptamine | About 1:100 to about 100:1 | About 1:25 to about 25:1 | About 1:5 to about 5:1 |
| 4-hydroxy-N,N-dimethyltryptamine | About 1:100 to about 100:1 | About 1:25 to about 25:1 | About 1:5 to about 5:1 |
| [3-(2-methylaminoethyl)-1H-indol-4-yl] dihydrogen phosphate | About 1:100 to about 100:1 | About 1:25 to about 25:1 | About 1:5 to about 5:1 |
| 4-hydroxy-N-methyltryptamine | About 1:100 to about 100:1 | About 1:25 to about 25:1 | About 1:5 to about 5:1 |
| [3-(aminoethyl)-1H-indol-4-yl] dihydrogen phosphate | About 1:100 to about 100:1 | About 1:25 to about 25:1 | About 1:5 to about 5:1 |
| [3-(2-trimethylaminoethyl)-1H-indol-4-yl] dihydrogen phosphate | About 1:100 to about 100:1 | About 1:25 to about 25:1 | About 1:5 to about 5:1 |
| 4-hydroxy-N,N,N-trimethyltryptamine | About 1:100 to about 100:1 | About 1:25 to about 25:1 | About 1:5 to about 5:1 |
| THC | About 1:100 to about 100:1 | About 1:25 to about 25:1 | About 1:5 to about 5:1 |
| CBC | About 1:100 to about 100:1 | About 1:25 to about 25:1 | About 1:5 to about 5:1 |
| CBD | About 1:100 to about 100:1 | About 1:25 to about 25:1 | About 1:5 to about 5:1 |
| CBG | About 1:100 to about 100:1 | About 1:25 to about 25:1 | About 1:5 to about 5:1 |
| Myrcene | About 1:100 to about 100:1 | About 1:25 to about 25:1 | About 1:5 to about 5:1 |
| Pinene | About 1:100 to about 100:1 | About 1:25 to about 25:1 | About 1:5 to about 5:1 |
| Caryophyllene | About 1:100 to about 100:1 | About 1:25 to about 25:1 | About 1:5 to about 5:1 |
| Limonene | About 1:100 to about 100:1 | About 1:25 to about 25:1 | About 1:5 to about 5:1 |
| Humulene | About 1:100 to about 100:1 | About 1:25 to about 25:1 | About 1:5 to about 5:1 |
| Linalool | About 1:100 to about 100:1 | About 1:25 to about 25:1 | About 1:5 to about 5:1 |
| Adrenaline | About 1:100 to about 100:1 | About 1:25 to about 25:1 | About 1:5 to about 5:1 |
| Amineptine | About 1:100 to about 100:1 | About 1:25 to about 25:1 | About 1:5 to about 5:1 |
| Erinacine A | About 1:100 to about 100:1 | About 1:25 to about 25:1 | About 1:5 to about 5:1 |
| Hericenone A | About 1:100 to about 100:1 | About 1:25 to about 25:1 | About 1:5 to about 5:1 |
| Phenelzine | About 1:100 to about 100:1 | About 1:25 to about 25:1 | About 1:5 to about 5:1 |

Exemplary pharmaceutical compositions of MPT iodide or crystalline form 1 of MPT iodide according to the disclosure and a second compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone and an excipient with exemplary molar ratios of MPT iodide or crystalline form 1 of MPT iodide according to the second compound are shown in Table 6. MPT iodide or crystalline form 1 of MPT iodide according to the disclosure may be any one of the exemplary embodiments described above including the crystalline form as disclosed herein.

TABLE 6

| Second Compound | Molar ratio of MPT iodide or crystalline form 1 of MPT iodide:second compound | Molar ratio of MPT iodide or crystalline form 1 of MPT iodide:second compound | Molar ratio of MPT iodide or crystalline form 1 of MPT iodide:second compound |
|---|---|---|---|
| 3,4-methylenedioxymethamphetamine | About 1:100 to about 100:1 | About 1:25 to about 25:1 | About 1:5 to about 5:1 |
| Citalopram | About 1:100 to about 100:1 | About 1:25 to about 25:1 | About 1:5 to about 5:1 |
| Escitalopram | About 1:100 to about 100:1 | About 1:25 to about 25:1 | About 1:5 to about 5:1 |
| Fluoxetine | About 1:100 to about 100:1 | About 1:25 to about 25:1 | About 1:5 to about 5:1 |
| Paroxetine | About 1:100 to about 100:1 | About 1:25 to about 25:1 | About 1:5 to about 5:1 |
| Sertraline | About 1:100 to about 100:1 | About 1:25 to about 25:1 | About 1:5 to about 5:1 |
| Duloxetine | About 1:100 to about 100:1 | About 1:25 to about 25:1 | About 1:5 to about 5:1 |
| [3-(2-dimethylaminoethyl)-1H-indol-4-yl] dihydrogen phosphate | About 1:100 to about 100:1 | About 1:25 to about 25:1 | About 1:5 to about 5:1 |
| 4-hydroxytryptamine | About 1:100 to about 100:1 | About 1:25 to about 25:1 | About 1:5 to about 5:1 |
| 4-hydroxy-N,N-dimethyltryptamine | About 1:100 to about 100:1 | About 1:25 to about 25:1 | About 1:5 to about 5:1 |
| [3-(2-methylaminoethyl)-1H-indol-4-yl] dihydrogen phosphate | About 1:100 to about 100:1 | About 1:25 to about 25:1 | About 1:5 to about 5:1 |
| 4-hydroxy-N-methyltryptamine | About 1:100 to about 100:1 | About 1:25 to about 25:1 | About 1:5 to about 5:1 |
| [3-(aminoethyl)-1H-indol-4-yl] dihydrogen phosphate | About 1:100 to about 100:1 | About 1:25 to about 25:1 | About 1:5 to about 5:1 |
| [3-(2-trimethylaminoethyl)-1H-indol-4-yl] dihydrogen phosphate | About 1:100 to about 100:1 | About 1:25 to about 25:1 | About 1:5 to about 5:1 |
| 4-hydroxy-N,N,N-trimethyltryptamine | About 1:100 to about 100:1 | About 1:25 to about 25:1 | About 1:5 to about 5:1 |
| THC | About 1:100 to about 100:1 | About 1:25 to about 25:1 | About 1:5 to about 5:1 |
| CBC | About 1:100 to about 100:1 | About 1:25 to about 25:1 | About 1:5 to about 5:1 |
| CBD | About 1:100 to about 100:1 | About 1:25 to about 25:1 | About 1:5 to about 5:1 |
| CBG | About 1:100 to about 100:1 | About 1:25 to about 25:1 | About 1:5 to about 5:1 |
| Myrcene | About 1:100 to about 100:1 | About 1:25 to about 25:1 | About 1:5 to about 5:1 |
| Pinene | About 1:100 to about 100:1 | About 1:25 to about 25:1 | About 1:5 to about 5:1 |
| Caryophyllene | About 1:100 to about 100:1 | About 1:25 to about 25:1 | About 1:5 to about 5:1 |
| Limonene | About 1:100 to about 100:1 | About 1:25 to about 25:1 | About 1:5 to about 5:1 |
| Humulene | About 1:100 to about 100:1 | About 1:25 to about 25:1 | About 1:5 to about 5:1 |
| Linalool | About 1:100 to about 100:1 | About 1:25 to about 25:1 | About 1:5 to about 5:1 |
| Adrenaline | About 1:100 to about 100:1 | About 1:25 to about 25:1 | About 1:5 to about 5:1 |
| Amineptine | About 1:100 to about 100:1 | About 1:25 to about 25:1 | About 1:5 to about 5:1 |
| Erinacine A | About 1:100 to about 100:1 | About 1:25 to about 25:1 | About 1:5 to about 5:1 |
| Hericenone A | About 1:100 to about 100:1 | About 1:25 to about 25:1 | About 1:5 to about 5:1 |
| Phenelzine | About 1:100 to about 100:1 | About 1:25 to about 25:1 | About 1:5 to about 5:1 |

An "effective amount" or a "therapeutically effective amount" of MPT iodide or crystalline form 1 of MPT iodide according to the disclosure is generally in the range of about 0.1 to about 100 mg daily (oral dose), of about 0.1 to about 50 mg daily (oral dose) of about 0.25 to about 25 mg daily (oral dose), of about 0.1 to about 5 mg daily (oral dose) or of about 0.5 to about 2.5 mg daily (oral dose). The actual amount required for treatment of any particular patient may depend upon a variety of factors including, for example, the disease being treated and its severity; the specific pharmaceutical composition employed; the age, body weight, general health, sex, and diet of the patient; the mode of administration; the time of administration; the route of administration; and the rate of excretion; the duration of the treatment; any drugs used in combination or coincidental with the specific compound employed; and other such factors well known in the medical arts. These factors are discussed in Goodman and Gilman's "The Pharmacological Basis of Therapeutics," Tenth Edition, A. Gilman, J. Hardman and L. Limbird, eds., McGraw-Hill Press, 155-173 (2001), which is incorporated herein by reference. MPT iodide or crystalline form 1 of MPT iodide of the disclosure and pharmaceutical compositions containing it may be used in combination with other agents that are generally administered to a patient being treated for psychological and other disorders discussed above. They may also be co-formulated with one or more of such agents in a single pharmaceutical composition.

Depending on the type of pharmaceutical composition, the pharmaceutically acceptable carrier may be chosen from any one or a combination of carriers known in the art. The choice of the pharmaceutically acceptable carrier depends upon the pharmaceutical form and the desired method of administration to be used. Exemplary carriers include those that do not substantially alter the structure or activity of MPT iodide or crystalline form 1 of MPT iodide according to the disclosure, or produce undesirable biological effects or otherwise interact in a deleterious manner with any other component(s) of the pharmaceutical composition.

The pharmaceutical compositions of the disclosure may be prepared by methods know in the pharmaceutical formulation art, for example, see Remington's Pharmaceutical Sciences, 18th Ed., (Mack Publishing Company, Easton, Pa., 1990), which is incorporated herein by reference. In a solid dosage form, MPT iodide or crystalline form 1 of MPT iodide of the disclosure may be admixed with at least one pharmaceutically acceptable excipient such as, for example, sodium citrate or dicalcium phosphate or (a) fillers or extenders, such as, for example, starches, lactose, sucrose, glucose, mannitol, and silicic acid, (b) binders, such as, for example, cellulose derivatives, starch, alginates, gelatin, polyvinylpyrrolidone, sucrose, and gum acacia, (c) humectants, such as, for example, glycerol, (d) disintegrating agents, such as, for example, agar-agar, calcium carbonate, potato or tapioca starch, alginic acid, croscarmellose sodium, complex silicates, and sodium carbonate, (e) solution retarders, such as, for example, paraffin, (f) absorption accelerators, such as, for example, quaternary ammonium compounds, (g) wetting agents, such as, for example, cetyl alcohol, and glycerol monostearate, magnesium stearate and the like, (h) adsorbents, such as, for example, kaolin and bentonite, and (i) lubricants, such as, for example, talc, calcium stearate, magnesium stearate, solid polyethylene glycols, sodium lauryl sulfate, or mixtures thereof. In the case of capsules, tablets, and pills, the dosage forms may also comprise buffering agents. In some embodiments, the excipient is not water. In some embodiments, the excipient is not a solvent (e.g., EtOH, diethyl ether, ethyl acetate, or hydrocarbon-based solvents (e.g., hexanes). In some embodiments, the dosage form is substantially free of water and/or solvents, for example less than about 5% water by mass, less than 2% water by mass, less than 1% water by mass, less than 0.5% water by mass, or less than 0.1% water by mass.

For purposes of this disclosure, excipients or pharmaceutically acceptable adjuvants, solid dosage forms, suspensions, and solid dosage forms for oral administration are disclosed above.

Administration of MPT iodide or crystalline form 1 of MPT iodide according to the disclosure in pure form or in an appropriate pharmaceutical composition may be carried out via any of the accepted modes of administration or agents for serving similar utilities. Thus, administration may be, for example, orally, buccally, nasally, parenterally (intravenous, intramuscular, or subcutaneous), topically, transdermally, intravaginally, intravesically, or intrasystemically, in the form of solid, semi-solid, lyophilized powder, or liquid dosage forms, such as, for example, tablets, suppositories, pills, soft elastic and hard gelatin capsules, powders, solutions, suspensions, or aerosols, or the like, such as, for example, in unit dosage forms suitable for simple administration of precise dosages. One route of administration may be oral administration, using a convenient daily dosage regimen that can be adjusted according to the degree of severity of the disease-state to be treated.

The disclosure also relates to compositions comprising an effective amount of EPT fumarate or crystalline form 1 of EPT fumarate, and an excipient (e.g., a pharmaceutically-acceptable excipient). In another embodiment, the disclosure also relates to pharmaceutical compositions comprising a therapeutically effective amount of EPT fumarate or crystalline form 1 of EPT fumarate and a pharmaceutically acceptable excipient (also known as a pharmaceutically acceptable carrier). As discussed above, EPT fumarate or crystalline form 1 of EPT fumarate of the disclosure may be, for example, therapeutically useful to prevent and/or treat the psychological disorders, brain disorders, pain, and inflammation as well as the other disorders described herein.

A composition or a pharmaceutical composition of the disclosure may be in any form which contains EPT fumarate or crystalline form 1 of EPT fumarate. The composition may be, for example, a tablet, capsule, liquid suspension, injectable, topical, or transdermal. The compositions generally contain, for example, about 1% to about 99% by weight of EPT fumarate or crystalline form 1 of EPT fumarate and, for example, 99% to 1% by weight of at least one suitable pharmaceutically acceptable excipient. In one embodiment, the composition may be between about 5% and about 75% by weight of EPT fumarate or crystalline form 1 of EPT fumarate, with the rest being at least one suitable pharmaceutically acceptable excipient or at least one other adjuvant, as discussed below.

According to this disclosure, EPT fumarate or crystalline form 1 of EPT fumarate of the disclosure may be used as the "first purified psilocybin derivative" in the compositions described in US 2018/0221396 A1 and US 2019/0142851 A1. Accordingly, this disclosure provides a composition comprising: a first component comprising EPT fumarate or crystalline form 1 of EPT fumarate of the disclosure; at least one second component selected from at least one of (a) a serotonergic drug, (b) a purified psilocybin derivative, (c) a purified cannabinoid or (d) a purified terpene; and at least one pharmaceutically-acceptable excipient or at least one other adjuvant. Such a composition may be a pharmaceutical composition wherein the components are present individually in therapeutically effective amounts or by combination in a therapeutically effective amount to treat a disease, disorder, or condition as described herein.

When used in such compositions as a first component comprising EPT fumarate or crystalline form 1 of EPT fumarate of the disclosure with a second component selected from at least one of (a) a serotonergic drug, (b) a purified psilocybin derivative, (c) a purified cannabinoid, or (d) a purified terpene, the compositions represent particular embodiments of the invention. Compositions having as a first component EPT fumarate or crystalline form 1 of EPT fumarate of the disclosure with a second component selected from at least one of (e) an adrenergic drug, (f) a dopaminergic drug, (g) a monoamine oxidase inhibitor, (h) a purified erinacine, (i) a purified hericenone represent additional particular embodiments of the invention represented by the compositions having EPT fumarate or crystalline form 1 of EPT fumarate according to the disclosure. In some embodiments, the first and second components can be administered at the same time (e.g., together in the same composition), or at separate times over the course of treating a patient in need thereof. Such a composition may be a pharmaceutical composition wherein the components are present individually in therapeutically effective amounts or by combination in a therapeutically effective amount to treat a disease, disorder, or condition as described herein.

A pharmaceutical formulation of the disclosure may comprise, consist essentially of, or consist of (a) EPT fumarate or crystalline form 1 of EPT fumarate of the disclosure and (b) at least one second active compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone and (c) a pharmaceutically acceptable excipient. In some embodiments, EPT fumarate or crystalline form 1 of EPT fumarate and the second active compound(s) are each present in a therapeutically effective amount using a purposefully engineered and unnaturally occurring molar ratios. Exemplary molar ratios of EPT fumarate or crystalline form 1 of EPT fumarate of the disclosure to the second active compound in a composition of the disclosure include but are not limited to from about 0.1:100 to about 100:0.1, from about 1:100 to about 100:1, from about 1:50 to about 50:1, from about 1:25 to about 25:1, from about 1:20 to about 20:1, from about 1:10 to about 10:1, from about 1:5 to about 5:1, from about 1:2 to about 2:1 or may be about 1:1.

A pharmaceutical formulation of the disclosure may comprise a composition containing EPT fumarate or crystalline form 1 of EPT fumarate of the disclosure and a serotonergic drug, a purified psilocybin derivative, a purified cannabinoid, or a purified terpene, each present in a therapeutically effective amount using a purposefully engineered and unnaturally occurring molar ratios. Published US applications US 2018/0221396 A1 and US 2019/0142851 A1 disclose compositions comprising a combination of a purified psilocybin derivative with a second purified psilocybin derivative, with one or two purified cannabinoids or with a purified terpene. According to this disclosure composition containing EPT fumarate or crystalline form 1 of EPT fumarate of the disclosure may be used in place of a "purified psilocybin derivative" in the compositions described in US 2018/0221396 A1 and US 2019/0142851 A1. Accordingly, the disclosure provides a pharmaceutical formulation comprising as (a) EPT fumarate or crystalline form 1 of EPT fumarate of the disclosure and at least one second component selected from (a) a purified psilocybin derivative, (b) a purified cannabinoid or (c) a purified terpene; and at least one pharmaceutically-acceptable excipient or at least one other adjuvant, as described herein. Such a composition may be a pharmaceutical composition wherein the components are present individually in therapeutically effective amounts or by combination in a therapeutically effective amount to treat a disease, disorder, or condition as described herein.

For the purposes of this disclosure, exemplary serotonergic drugs, psilocybin derivatives, cannabinoids, terpenes, adrenergic drugs, dopaminergic drugs, monoamine oxidase inhibitors, erinacines, and hericenones are disclosed above.

Exemplary compositions of EPT fumarate or crystalline form 1 of EPT fumarate of the disclosure and a second compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone in exemplary molar ratios are shown in Table 7. EPT fumarate or crystalline form 1 of EPT fumarate of the disclosure may be any one of the exemplary embodiments described above including the crystalline form as disclosed herein.

TABLE 7

| Second Compound | Molar ratio of EPT fumarate or crystalline form 1 of EPT fumarate:second compound | Molar ratio of EPT fumarate or crystalline form 1 of EPT fumarate:second compound | Molar ratio of EPT fumarate or crystalline form 1 of EPT fumarate:second compound |
|---|---|---|---|
| 3,4-methylenedioxymethamphetamine | About 1:100 to about 100:1 | About 1:25 to about 25:1 | About 1:5 to about 5:1 |
| Citalopram | About 1:100 to about 100:1 | About 1:25 to about 25:1 | About 1:5 to about 5:1 |
| Escitalopram | About 1:100 to about 100:1 | About 1:25 to about 25:1 | About 1:5 to about 5:1 |
| Fluoxetine | About 1:100 to about 100:1 | About 1:25 to about 25:1 | About 1:5 to about 5:1 |
| Paroxetine | About 1:100 to about 100:1 | About 1:25 to about 25:1 | About 1:5 to about 5:1 |
| Sertraline | About 1:100 to about 100:1 | About 1:25 to about 25:1 | About 1:5 to about 5:1 |
| Duloxetine | About 1:100 to about 100:1 | About 1:25 to about 25:1 | About 1:5 to about 5:1 |

TABLE 7-continued

| Second Compound | Molar ratio of EPT fumarate or crystalline form 1 of EPT fumarate:second compound | Molar ratio of EPT fumarate or crystalline form 1 of EPT fumarate:second compound | Molar ratio of EPT fumarate or crystalline form 1 of EPT fumarate:second compound |
|---|---|---|---|
| [3-(2-dimethylaminoethyl)-1H-indol-4-yl] dihydrogen phosphate | About 1:100 to about 100:1 | About 1:25 to about 25:1 | About 1:5 to about 5:1 |
| 4-hydroxytryptamine | About 1:100 to about 100:1 | About 1:25 to about 25:1 | About 1:5 to about 5:1 |
| 4-hydroxy-N,N-dimethyltryptamine | About 1:100 to about 100:1 | About 1:25 to about 25:1 | About 1:5 to about 5:1 |
| [3-(2-methylaminoethyl)-1H-indol-4-yl] dihydrogen phosphate | About 1:100 to about 100:1 | About 1:25 to about 25:1 | About 1:5 to about 5:1 |
| 4-hydroxy-N-methyltryptamine | About 1:100 to about 100:1 | About 1:25 to about 25:1 | About 1:5 to about 5:1 |
| [3-(aminoethyl)-1H-indol-4-yl] dihydrogen phosphate | About 1:100 to about 100:1 | About 1:25 to about 25:1 | About 1:5 to about 5:1 |
| [3-(2-trimethylaminoethyl)-1H-indol-4-yl] dihydrogen phosphate | About 1:100 to about 100:1 | About 1:25 to about 25:1 | About 1:5 to about 5:1 |
| 4-hydroxy-N,N,N-trimethyltryptamine | About 1:100 to about 100:1 | About 1:25 to about 25:1 | About 1:5 to about 5:1 |
| THC | About 1:100 to about 100:1 | About 1:25 to about 25:1 | About 1:5 to about 5:1 |
| CBC | About 1:100 to about 100:1 | About 1:25 to about 25:1 | About 1:5 to about 5:1 |
| CBD | About 1:100 to about 100:1 | About 1:25 to about 25:1 | About 1:5 to about 5:1 |
| CBG | About 1:100 to about 100:1 | About 1:25 to about 25:1 | About 1:5 to about 5:1 |
| Myrcene | About 1:100 to about 100:1 | About 1:25 to about 25:1 | About 1:5 to about 5:1 |
| Pinene | About 1:100 to about 100:1 | About 1:25 to about 25:1 | About 1:5 to about 5:1 |
| Caryophyllene | About 1:100 to about 100:1 | About 1:25 to about 25:1 | About 1:5 to about 5:1 |
| Limonene | About 1:100 to about 100:1 | About 1:25 to about 25:1 | About 1:5 to about 5:1 |
| Humulene | About 1:100 to about 100:1 | About 1:25 to about 25:1 | About 1:5 to about 5:1 |
| Linalool | About 1:100 to about 100:1 | About 1:25 to about 25:1 | About 1:5 to about 5:1 |
| Adrenaline | About 1:100 to about 100:1 | About 1:25 to about 25:1 | About 1:5 to about 5:1 |
| Amineptine | About 1:100 to about 100:1 | About 1:25 to about 25:1 | About 1:5 to about 5:1 |
| Erinacine A | About 1:100 to about 100:1 | About 1:25 to about 25:1 | About 1:5 to about 5:1 |
| Hericenone A | About 1:100 to about 100:1 | About 1:25 to about 25:1 | About 1:5 to about 5:1 |
| Phenelzine | About 1:100 to about 100:1 | About 1:25 to about 25:1 | About 1:5 to about 5:1 |

Exemplary pharmaceutical compositions of EPT fumarate or crystalline form 1 of EPT fumarate of the disclosure and a second compound selected from a serotonergic drug, a purified psilocybin derivative, a purified cannabinoid, a purified terpene, an adrenergic drug, a dopaminergic drug, a monoamine oxidase inhibitor, a purified erinacine, or a purified hericenone and an excipient with exemplary molar ratios of EPT fumarate or crystalline form 1 of EPT fumarate to the second compound are shown in Table 8. EPT fumarate or crystalline form 1 of EPT fumarate of the disclosure may be any one of the exemplary embodiments described above including the crystalline form as disclosed herein.

TABLE 8

| Second Compound | Molar ratio of EPT fumarate or crystalline form 1 of EPT fumarate:second compound | Molar ratio of EPT fumarate or crystalline form 1 of EPT fumarate:second compound | Molar ratio of EPT fumarate or crystalline form 1 of EPT fumarate:second compound |
|---|---|---|---|
| 3,4-methylenedioxymethamphetamine | About 1:100 to about 100:1 | About 1:25 to about 25:1 | About 1:5 to about 5:1 |
| Citalopram | About 1:100 to about 100:1 | About 1:25 to about 25:1 | About 1:5 to about 5:1 |
| Escitalopram | About 1:100 to about 100:1 | About 1:25 to about 25:1 | About 1:5 to about 5:1 |

TABLE 8-continued

| Second Compound | Molar ratio of EPT fumarate or crystalline form 1 of EPT fumarate:second compound | Molar ratio of EPT fumarate or crystalline form 1 of EPT fumarate:second compound | Molar ratio of EPT fumarate or crystalline form 1 of EPT fumarate:second compound |
|---|---|---|---|
| Fluoxetine | About 1:100 to about 100:1 | About 1:25 to about 25:1 | About 1:5 to about 5:1 |
| Paroxetine | About 1:100 to about 100:1 | About 1:25 to about 25:1 | About 1:5 to about 5:1 |
| Sertraline | About 1:100 to about 100:1 | About 1:25 to about 25:1 | About 1:5 to about 5:1 |
| Duloxetine | About 1:100 to about 100:1 | About 1:25 to about 25:1 | About 1:5 to about 5:1 |
| [3-(2-dimethylaminoethyl)-1H-indol-4-yl] dihydrogen phosphate | About 1:100 to about 100:1 | About 1:25 to about 25:1 | About 1:5 to about 5:1 |
| 4-hydroxytryptamine | About 1:100 to about 100:1 | About 1:25 to about 25:1 | About 1:5 to about 5:1 |
| 4-hydroxy-N,N-dimethyltryptamine | About 1:100 to about 100:1 | About 1:25 to about 25:1 | About 1:5 to about 5:1 |
| [3-(2-methylaminoethyl)-1H-indol-4-yl] dihydrogen phosphate | About 1:100 to about 100:1 | About 1:25 to about 25:1 | About 1:5 to about 5:1 |
| 4-hydroxy-N-methyltryptamine | About 1:100 to about 100:1 | About 1:25 to about 25:1 | About 1:5 to about 5:1 |
| [3-(aminoethyl)-1H-indol-4-yl] dihydrogen phosphate | About 1:100 to about 100:1 | About 1:25 to about 25:1 | About 1:5 to about 5:1 |
| [3-(2-trimethylaminoethyl)-1H-indol-4-yl] dihydrogen phosphate | About 1:100 to about 100:1 | About 1:25 to about 25:1 | About 1:5 to about 5:1 |
| 4-hydroxy-N,N,N-trimethyltryptamine | About 1:100 to about 100:1 | About 1:25 to about 25:1 | About 1:5 to about 5:1 |
| THC | About 1:100 to about 100:1 | About 1:25 to about 25:1 | About 1:5 to about 5:1 |
| CBC | About 1:100 to about 100:1 | About 1:25 to about 25:1 | About 1:5 to about 5:1 |
| CBD | About 1:100 to about 100:1 | About 1:25 to about 25:1 | About 1:5 to about 5:1 |
| CBG | About 1:100 to about 100:1 | About 1:25 to about 25:1 | About 1:5 to about 5:1 |
| Myrcene | About 1:100 to about 100:1 | About 1:25 to about 25:1 | About 1:5 to about 5:1 |
| Pinene | About 1:100 to about 100:1 | About 1:25 to about 25:1 | About 1:5 to about 5:1 |
| Caryophyllene | About 1:100 to about 100:1 | About 1:25 to about 25:1 | About 1:5 to about 5:1 |
| Limonene | About 1:100 to about 100:1 | About 1:25 to about 25:1 | About 1:5 to about 5:1 |
| Humulene | About 1:100 to about 100:1 | About 1:25 to about 25:1 | About 1:5 to about 5:1 |
| Linalool | About 1:100 to about 100:1 | About 1:25 to about 25:1 | About 1:5 to about 5:1 |
| Adrenaline | About 1:100 to about 100:1 | About 1:25 to about 25:1 | About 1:5 to about 5:1 |
| Amineptine | About 1:100 to about 100:1 | About 1:25 to about 25:1 | About 1:5 to about 5:1 |
| Erinacine A | About 1:100 to about 100:1 | About 1:25 to about 25:1 | About 1:5 to about 5:1 |
| Hericenone A | About 1:100 to about 100:1 | About 1:25 to about 25:1 | About 1:5 to about 5:1 |
| Phenelzine | About 1:100 to about 100:1 | About 1:25 to about 25:1 | About 1:5 to about 5:1 |

An "effective amount" or a "therapeutically effective amount" of EPT fumarate or crystalline form 1 of EPT fumarate of the disclosure is generally in the range of about 0.1 to about 100 mg daily (oral dose), of about 0.1 to about 50 mg daily (oral dose) of about 0.25 to about 25 mg daily (oral dose), of about 0.1 to about 5 mg daily (oral dose) or of about 0.5 to about 2.5 mg daily (oral dose). The actual amount required for treatment of any particular patient may depend upon a variety of factors including, for example, the disease being treated and its severity; the specific pharmaceutical composition employed; the age, body weight, general health, sex, and diet of the patient; the mode of administration; the time of administration; the route of administration; and the rate of excretion; the duration of the treatment; any drugs used in combination or coincidental with the specific compound employed; and other such factors well known in the medical arts. These factors are discussed in Goodman and Gilman's "The Pharmacological Basis of Therapeutics," Tenth Edition, A. Gilman, J. Hardman and L. Limbird, eds., McGraw-Hill Press, 155-173 (2001), which is incorporated herein by reference. EPT fumarate or crystalline form 1 of EPT fumarate of the disclosure and pharmaceutical compositions containing it may be used in combination with other agents that are generally administered to a patient being treated for psychological and other disorders discussed above. They may also be co-formulated with one or more of such agents in a single pharmaceutical composition.

Depending on the type of pharmaceutical composition, the pharmaceutically acceptable carrier may be chosen from any one or a combination of carriers known in the art. The choice of the pharmaceutically acceptable carrier depends upon the pharmaceutical form and the desired method of administration to be used. Exemplary carriers include those that do not substantially alter the structure or activity of EPT fumarate or crystalline form 1 of EPT fumarate of the disclosure, or produce undesirable biological effects or otherwise interact in a deleterious manner with any other component(s) of the pharmaceutical composition.

The pharmaceutical compositions of the disclosure may be prepared by methods know in the pharmaceutical formulation art, for example, see Remington's Pharmaceutical Sciences, 18th Ed., (Mack Publishing Company, Easton, Pa., 1990), which is incorporated herein by reference. In a solid dosage form, EPT fumarate or crystalline form 1 of EPT fumarate of the disclosure may be admixed with at least one pharmaceutically acceptable excipient such as, for example, sodium citrate or dicalcium phosphate or (a) fillers or extenders, such as, for example, starches, lactose, sucrose, glucose, mannitol, and silicic acid, (b) binders, such as, for example, cellulose derivatives, starch, alginates, gelatin, polyvinylpyrrolidone, sucrose, and gum acacia, (c) humectants, such as, for example, glycerol, (d) disintegrating agents, such as, for example, agar-agar, calcium carbonate, potato or tapioca starch, alginic acid, croscarmellose sodium, complex silicates, and sodium carbonate, (e) solution retarders, such as, for example, paraffin, (f) absorption accelerators, such as, for example, quaternary ammonium compounds, (g) wetting agents, such as, for example, cetyl alcohol, and glycerol monostearate, magnesium stearate and the like, (h) adsorbents, such as, for example, kaolin and bentonite, and (i) lubricants, such as, for example, talc, calcium stearate, magnesium stearate, solid polyethylene glycols, sodium lauryl sulfate, or mixtures thereof. In the case of capsules, tablets, and pills, the dosage forms may also comprise buffering agents. In some embodiments, the excipient is not water. In some embodiments, the excipient is not a solvent (e.g., EtOH, diethyl ether, ethyl acetate, or hydrocarbon-based solvents (e.g., hexanes). In some embodiments, the dosage form is substantially free of water and/or solvents, for example less than about 5% water by mass, less than 2% water by mass, less than 1% water by mass, less than 0.5% water by mass, or less than 0.1% water by mass.

For purposes of this disclosure, excipients or pharmaceutically acceptable adjuvants, solid dosage forms, suspensions, and solid dosage forms for oral administration are disclosed above.

Administration of EPT fumarate or crystalline form 1 of EPT fumarate of the disclosure in pure form or in an appropriate pharmaceutical composition may be carried out via any of the accepted modes of administration or agents for serving similar utilities. Thus, administration may be, for example, orally, buccally, nasally, parenterally (intravenous, intramuscular, or subcutaneous), topically, transdermally, intravaginally, intravesically, or intrasystemically, in the form of solid, semi-solid, lyophilized powder, or liquid dosage forms, such as, for example, tablets, suppositories, pills, soft elastic and hard gelatin capsules, powders, solutions, suspensions, or aerosols, or the like, such as, for example, in unit dosage forms suitable for simple administration of precise dosages. One route of administration may be oral administration, using a convenient daily dosage regimen that can be adjusted according to the degree of severity of the disease-state to be treated.

EXAMPLES

Single Crystal X-Ray Diffraction (SCXRD) Characterization for the Examples of this Disclosure: Data were collected on a Bruker D8 Venture CMOS Diffractometer equipped with an Oxford Cryosystems Cryostream cooling device and using Mo Kα radiation. Structures were solved using the Bruker SHELXTL program and refined with the SHELXTL program as part of the Bruker SHELXTL suite, or OLEX2 software. Unless otherwise stated, hydrogen atoms attached to carbon were placed geometrically and allowed to refine with a riding isotropic displacement parameter. Hydrogen atoms attached to a heteroatom were located in a difference Fourier synthesis and were allowed to refine freely with an isotropic displacement parameter.

Example 1

The preparation and characterization of crystalline form 1 of 2-(5-hydroxy-1H-indol-3-yl)ethan-1-aminium hydrate chloride (serotonin hydrochloride hydrate or 5-HT hydrochloride hydrate) is described below.

Preparation and Characterization of Crystalline Form 1 of 2-(5-hydroxy-1H-indol-3-yl)ethan-1-aminium Hydrate Chloride (Serotonin Hydrochloride Hydrate or 5-HT Hydrochloride Hydrate)

Preparation

A commercial sample of serotonin hydrochloride (Beantown Chemical) was dissolved in water and slow evaporation of the solution led to crystals suitable for X-ray diffraction.

Single Crystal Characterization

The single crystal data and structure refinement parameters for the crystalline form 1 structure of 5-HT hydrochloride hydrate are reported in Table 9, below.

TABLE 9

| Crystal data | |
|---|---|
| Chemical formula | Cl•$C_{10}H_{13}N_2O$•$H_2O$ |
| $M_r$ | 230.69 |
| Crystal system, space group | Monoclinic, $P2_1/c$ |
| Temperature (K) | 297 |
| a, b, c (Å) | 9.3078 (4), 15.2990 (6), 8.0488 (3) |
| β (°) | 92.285 (2) |
| V (Å$^3$) | 1145.25 (8) |
| Z | 4 |
| F(000) | 488 |
| $D_x$ (Mg m$^{-3}$) | 1.338 |

TABLE 9-continued

| | |
|---|---|
| Radiation type | Mo Kα |
| λ (Å) | 0.71073 |
| θ (°) | 2.7-26.4 |
| μ (mm$^{-1}$) | 0.32 |
| Crystal size (mm) | 0.22 × 0.2 × 0.13 |
| BLOCK | Brown |
| | Data collection |
| Diffractometer | Bruker APEX-II CCD |
| Absorption correction | Multi-scan SADABS (Bruker, 2016) was used. wR2(int) was 0.0514 before and 0.0452 after correction. The Ratio of minimum to maximum transmission is 0.9649. The λ/2 correction factor is not present. |
| $T_{min}$, $T_{max}$ | 0.719, 0.745 |
| No. of measured, independent, and observed [I > 2σ(I)] reflections | 31351, 2319, 2087 |
| $R_{int}$ | 0.027 |
| $\theta_{max}$, $\theta_{min}$ (°) | 26.4, 2.7 |
| h, k, l | −11 → 11, −19 → 19, −10 → 10 |
| | Refinement |
| R[F$^2$ > 2σ(F$^2$)], wR(F$^2$), S | 0.032, 0.087, 1.03 |
| No. of reflections | 2319 |
| No. of parameters | 162 |
| No. of restraints | 8 |
| H-atom treatment | H atoms treated by a mixture of independent and constrained refinement |
| w | $1/[\sigma^2(F_o^2) + (0.0404P)^2 + 0.4083P]$ where $P = (F_o^2 + 2F_c^2)/3$ |
| $(\Delta/\sigma)_{max}$ | 0.001 |
| $\Delta\rho_{max}$, $\Delta\rho_{min}$ (e Å$^{-3}$) | 0.23, −0.21 |

Data collection: Bruker APEX32; cell refinement: Bruker SAINT; data reduction: Bruker SAINT; program(s) used to solve structure: SHELXS97 (Sheldrick 2008); program(s) used to refine structure: SHELXL 2018/3 (Sheldrick, 2015); molecular graphics: Olex2 1.3 (Dolomanov et al., 2009); software used to prepare material for publication: Olex2 1.3 (Dolomanov et al., 2009).

FIG. 1 shows the molecular structure of crystalline form 1 of 5-HT hydrochloride hydrate, showing the atomic labeling.

Figure 2:
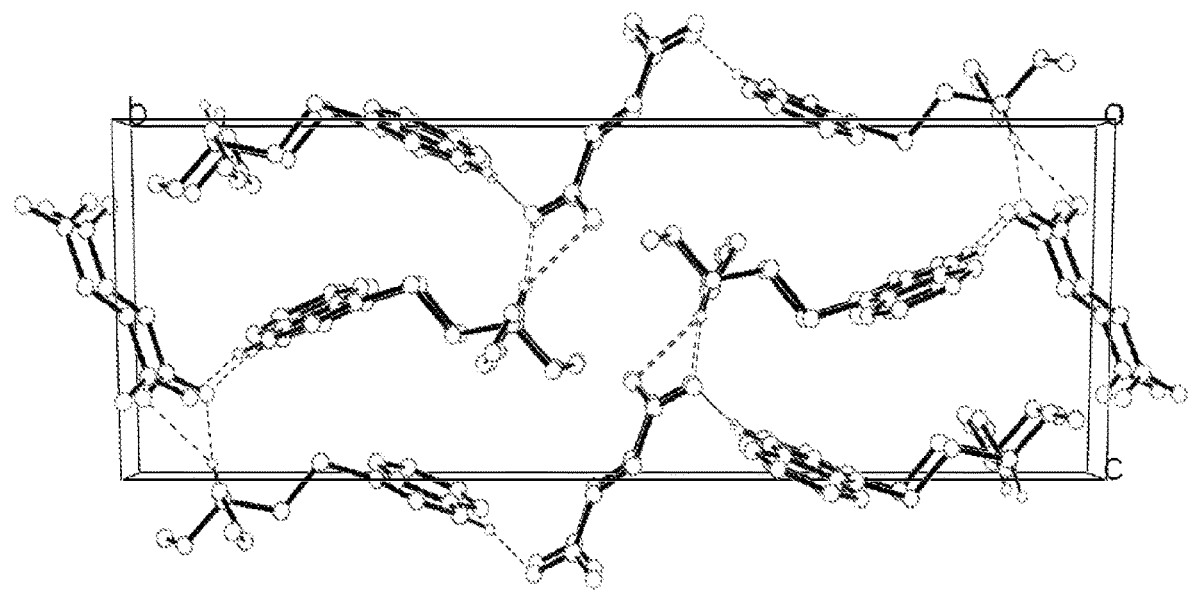
FIG. 2 shows the unit cell of crystalline form 1 of 5-HT hydrochloride hydrate along the a-axis.

FIG. 2 shows the unit cell of crystalline form 1 of 5-HT hydrochloride hydrate along the a-axis.

Simulated X-Ray Powder Diffraction (XRPD) Pattern

Figure 3:
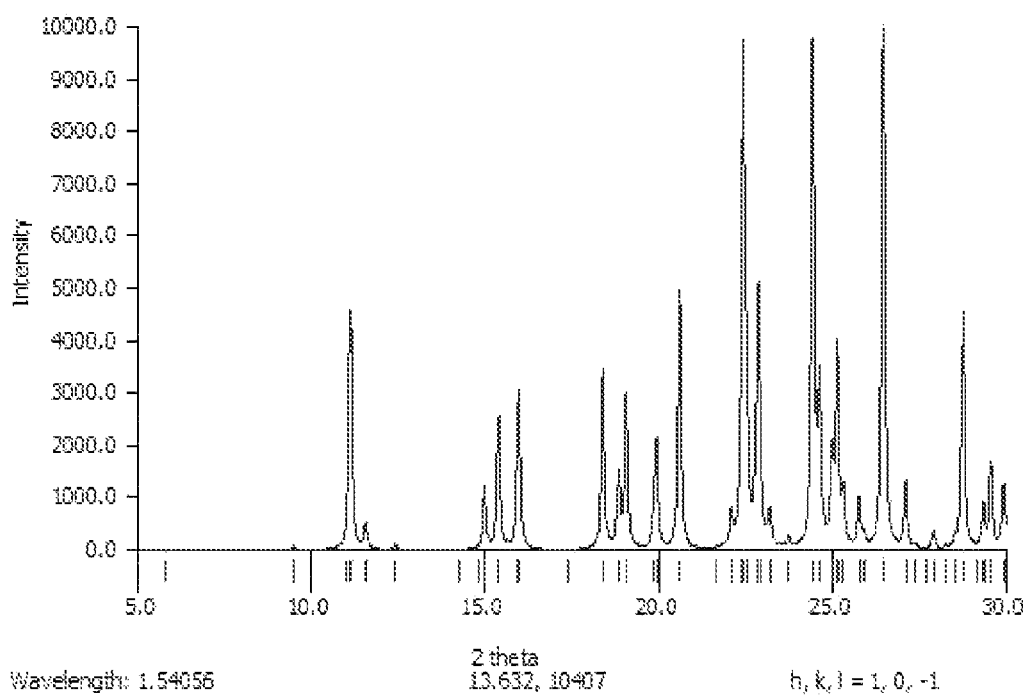
FIG. 3 shows the simulated X-ray powder diffraction pattern (XRPD) for crystalline form 1 of 5-HT hydrochloride hydrate.

FIG. 3 shows a simulated X-ray powder diffraction pattern (XRPD) for crystalline form 1 of 5-HT hydrochloride hydrate generated from its single crystal data. Table 10 lists the angles, °2θ+0.2°2θ, and d-spacing of the peaks identified in the experimental XRPD pattern of FIG. 3. The entire list of peaks, or a subset thereof, may be sufficient to characterize the cocrystal. For example, the cocrystal may be characterized by at least two peaks selected from the peaks at 11.1, 20.6, and 26.5°2θ±0.2°2θ or their corresponding d-spacing as well as by a XRPD pattern substantially similar to FIG. 3.

TABLE 10

| d-spacing (Å) | 2(Theta deg) | Intensity |
|---|---|---|
| 9.30 | 9.5 | 48.5 |
| 7.95 | 11.1 | 4826.5 |
| 7.65 | 11.6 | 540.7 |
| 7.12 | 12.4 | 135.4 |
| 5.91 | 15.0 | 2280.8 |
| 5.75 | 15.4 | 5231.8 |
| 5.56 | 15.9 | 564.8 |
| 5.54 | 16.0 | 6390.4 |
| 4.82 | 18.4 | 10194 |
| 4.70 | 18.8 | 4345.4 |
| 4.65 | 19.1 | 9452.8 |
| 4.47 | 19.8 | 1135.7 |

TABLE 10-continued

| d-spacing (Å) | 2(Theta deg) | Intensity |
|---|---|---|
| 4.45 | 19.9 | 7053.7 |
| 4.31 | 20.6 | 18457.6 |
| 4.02 | 22.1 | 2749.6 |
| 3.97 | 22.4 | 2636.7 |
| 3.96 | 22.4 | 41126.8 |
| 3.94 | 22.5 | 8881.7 |
| 3.89 | 22.8 | 20746.3 |
| 3.88 | 22.9 | 7786.5 |
| 3.83 | 23.2 | 2635.8 |
| 3.82 | 23.2 | 630.0 |
| 3.75 | 23.7 | 923.5 |
| 3.64 | 24.4 | 11.6 |
| 3.64 | 24.4 | 51182.4 |
| 3.61 | 24.6 | 15833.9 |
| 3.56 | 25.0 | 8944.5 |
| 3.54 | 25.1 | 15010.6 |
| 3.54 | 25.2 | 6436 |
| 3.52 | 25.3 | 5516.6 |
| 3.45 | 25.8 | 5533.2 |
| 3.44 | 25.9 | 1144.0 |
| 3.36 | 26.5 | 63310.8 |
| 3.29 | 27.1 | 8473.7 |
| 3.26 | 27.4 | 410.1 |
| 3.22 | 27.7 | 30.9 |
| 3.19 | 27.9 | 2548.8 |
| 3.16 | 28.2 | 349.4 |
| 3.13 | 28.5 | 1107.4 |
| 3.10 | 28.7 | 11886.7 |
| 3.10 | 28.8 | 24708.4 |
| 3.04 | 29.3 | 5604.1 |
| 3.04 | 29.4 | 1240.8 |
| 3.02 | 29.6 | 13005.8 |
| 2.98 | 29.9 | 9598.2 |

Example 2

The preparation and characterization of crystalline form 1 of (2E)-but-2-enedioic acid bis({2-[4-(acetyloxy)-1H-indol- 3-yl]ethyl}(ethyl)propylazanium) (2E)-but-2-enedioate (4-AcO-EPT fumarate fumaric acid) are described below.

Preparation and Characterization of Crystalline Form 1 of (2E)-but-2-enedioic Acid bis({2-[4-(acetyloxy)-1H-indol-3-yl]ethyl}(ethyl)propylazanium) (2E)-but-2-enedioate (4-AcO-EPT fumarate fumaric acid)

Preparation

Crystals suitable for X-ray diffraction were grown from the slow evaporation of an aqueous solution of a commercial sample (ChemLogix).

Single Crystal Characterization

The single crystal data and structure refinement parameters for the crystalline form 1 structure of 4-AcO-EPT fumarate fumaric acid measured at 297 K are reported in Table 11, below.

Figure 5:
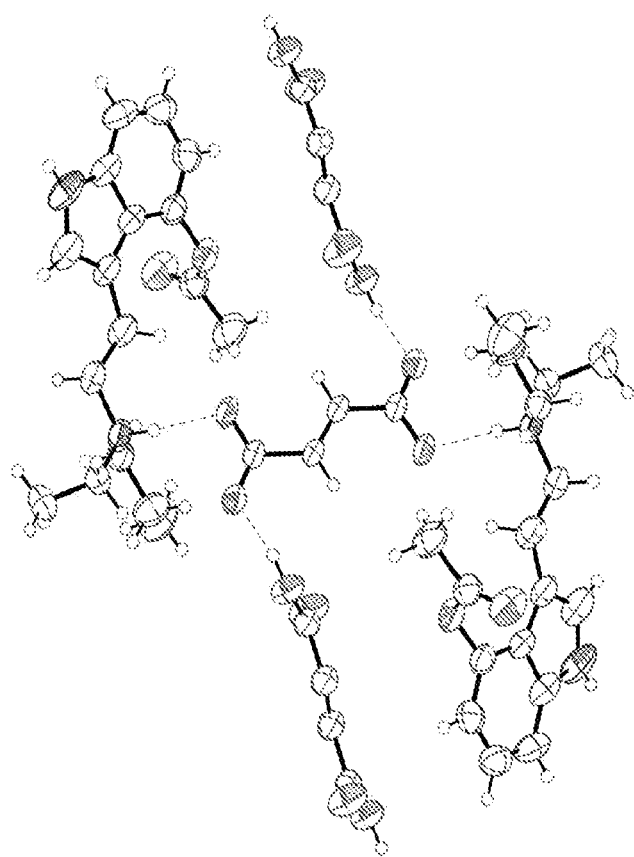
FIG. 5 shows the molecular structure of crystalline form 1 of 4-AcO-EPT fumarate fumaric acid in a 2:1 ratio of 4-AcO-EPT:fumarate ion with hydrogen bonds shown as dashed lines.

FIG. 5 shows the molecular structure of crystalline form 1 of 4-AcO-EPT fumarate fumaric acid in a 2:1 ratio of 4-AcO-EPT: fumarate ion with hydrogen bonds shown as dashed lines.

Figure 6:
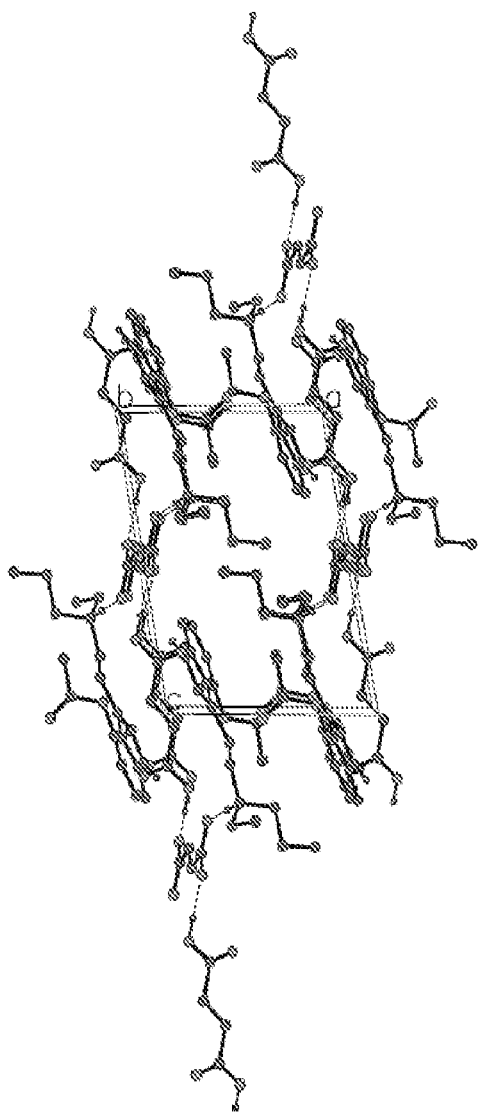
FIG. 6 shows the crystal packing of crystalline form 1 of 4-AcO-EPT fumarate fumaric acid, viewed along the b-axis.

FIG. 6 shows the crystal packing of crystalline form 1 of 4-AcO-EPT fumarate fumaric acid, viewed along the b-axis. The N—H···O and O—H···O hydrogen bonds are shown as dashed lines. Displacement ellipsoids are drawn at the 50% probability level.

Simulated X-Ray Powder Diffraction (XRPD) Pattern

Figure 7:
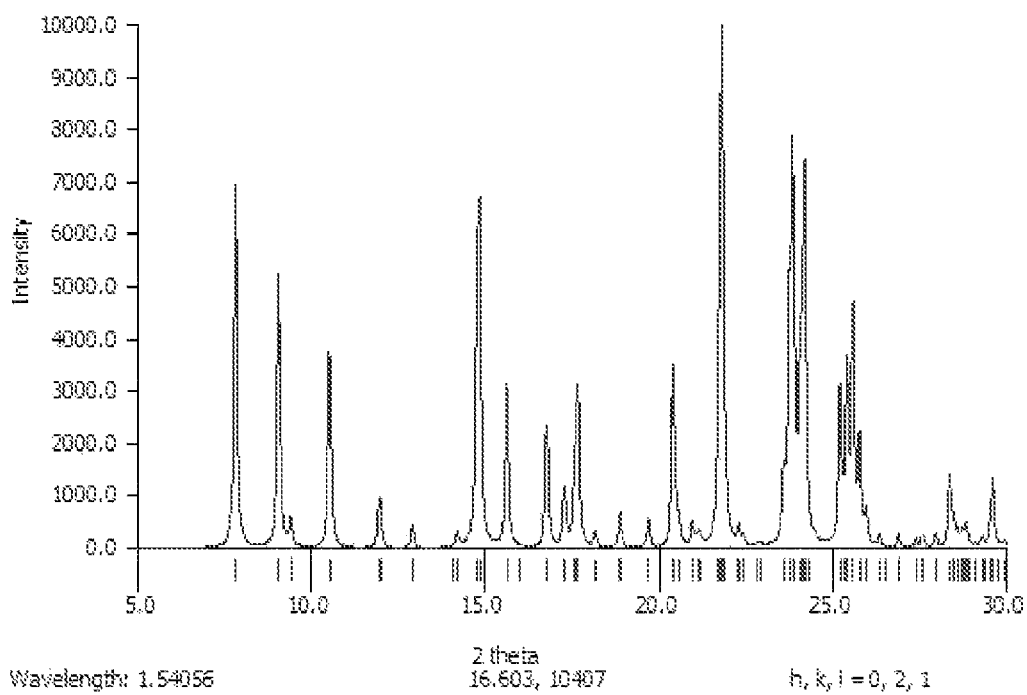
FIG. 7 shows a simulated X-ray powder diffraction pattern (XRPD) for crystalline form 1 of 4-AcO-EPT fumarate fumaric acid generated from its single crystal data.

FIG. 7 shows a simulated X-ray powder diffraction pattern (XRPD) for crystalline form 1 of 4-AcO-EPT fumarate fumaric acid generated from its single crystal data. Table 12 lists the angles, °2θ+0.2°2θ, and d-spacing of the peaks identified in the experimental XRPD pattern of FIG. 7. The entire list of peaks, or a subset thereof, may be sufficient to characterize the cocrystal. For example, the cocrystal may

TABLE 11

| Crystal data | |
|---|---|
| Chemical formula | $C_{17}H_{25}N_2O_2 \cdot C_2H_2O_2 \cdot C_2HO_2$ |
| $M_r$ | 404.45 |
| Crystal system, space group | Triclinic, P$\bar{1}$ |
| Temperature (K) | 297 |
| a, b, c (Å) | 8.7642 (8), 10.8653 (9), 12.6564 (11) |
| α, β, γ (°) | 65.094 (3), 75.354 (3), 76.718 (3) |
| V (Å$^3$) | 1047.12 (16) |
| Z | 2 |
| F(000) | 432 |
| $D_x$ (Mg m$^{-3}$) | 1.283 |
| Radiation type | Mo Kα |
| λ (Å) | 0.71073 |
| θ (°) | 2.8-26.3 |
| μ (mm$^{-1}$) | 0.09 |
| Crystal size (mm) | 0.22 × 0.2 × 0.12 |
| BLOCK | Colourless |
| Data collection | |
| Diffractometer | Bruker APEX-II CCD |
| Absorption correction | Multi-scan SADABS2016/2 (Bruker, 2016/2) was used. wR2(int) was 0.0547 before and 0.0481 after correction. The Ratio of minimum to maximum transmission is 0.9669. The λ/2 correction factor is not present. |
| $T_{min}$, $T_{max}$ | 0.721, 0.745 |
| No. of measured, independent and observed [I > 2σ(I)] reflections | 28846, 4252, 3228 |
| $R_{int}$ | 0.041 |
| $\theta_{max}$, $\theta_{min}$ (°) | 26.4, 2.8 |
| h, k, l | −10 → 10, −13 → 13, −15 → 15 |
| Refinement | |
| R[F$^2$ > 2σ(F$^2$)], wR(F$^2$), S | 0.060, 0.152, 1.03 |
| No. of reflections | 4252 |
| No. of parameters | 322 |
| No. of restraints | 84 |
| H-atom treatment | H atoms treated by a mixture of independent and constrained refinement |
| w | $1/[\sigma^2(F_o^2) + (0.0575P)^2 + 0.5664P]$ where $P = (F_o^2 + 2F_c^2)/3$ |
| $(\Delta/\sigma)_{max}$ | <0.001 |
| $\Delta\rho_{max}$, $\Delta\rho_{min}$ (e Å$^{-3}$) | 0.48, −0.21 |

Computer programs: Bruker APEX3; cell refinement: Bruker SAINT; data reduction: Bruker SAINT; program(s) used to solve structure: SHELXS97 (Sheldrick 2008); program(s) used to refine structure: SHELXL 2018/3 (Sheldrick, 2015); molecular graphics: Olex2 1.3 (Dolomanov et al., 2009).

Figure 4:
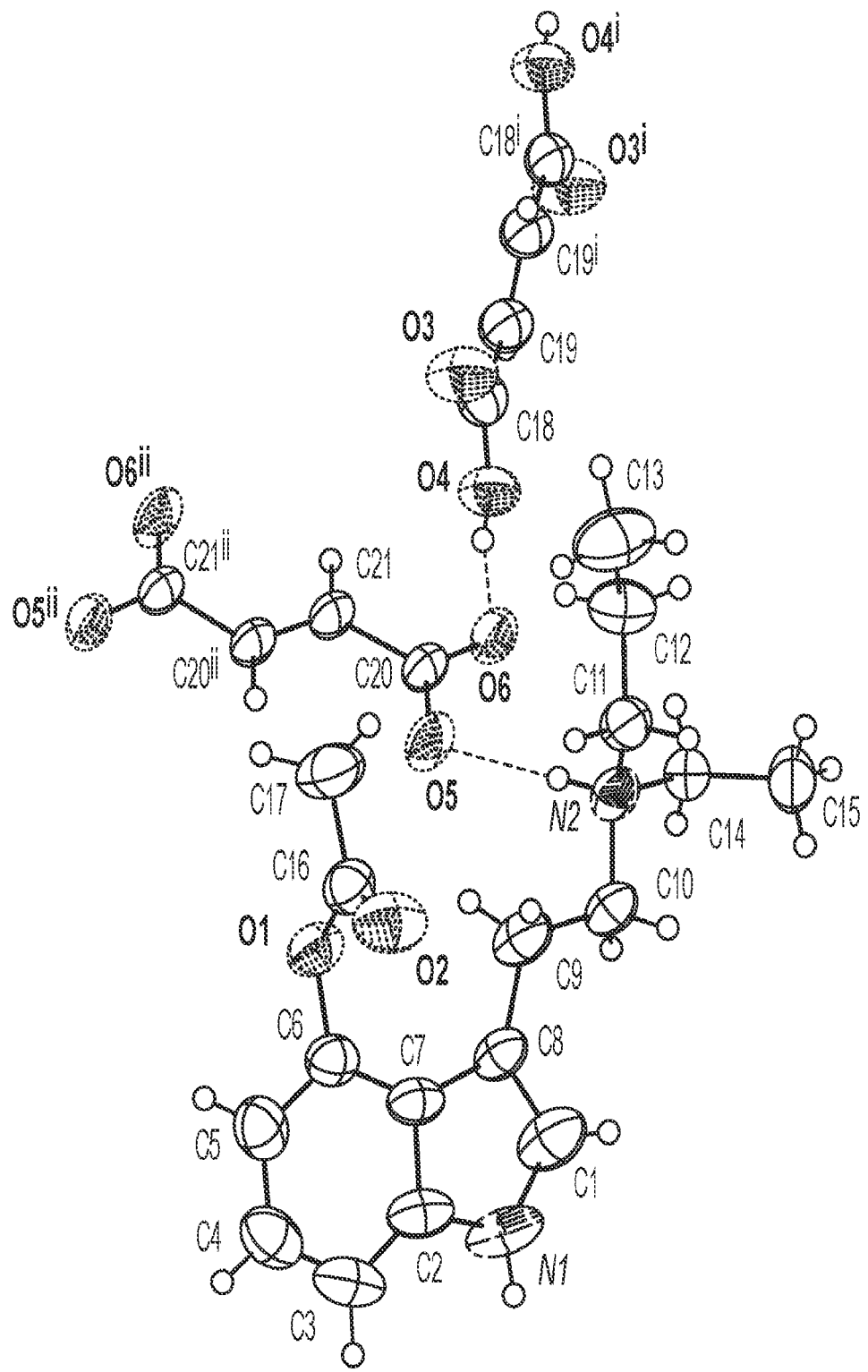
FIG. 4 shows the molecular structure of crystalline form 1 of 4-AcO-EPT fumarate fumaric acid, showing the atomic labeling and hydrogen bonds shown as dashed lines.

FIG. 4 shows the molecular structure of crystalline form 1 of 4-AcO-EPT fumarate fumaric acid, showing the atomic labeling. Displacement ellipsoids are drawn at 50% probability level. Hydrogen bonds are shown as dashed lines.

be characterized by at least two peaks selected from the peaks at 7.8, 9.1, 10.5, and 15.6°2θ±0.2°2θ or their corresponding d-spacing as well as by a XRPD pattern substantially similar to FIG. 7.

TABLE 12

| d-spacing (Å) | 2(Theta deg) | Intensity |
|---|---|---|
| 11.30 | 7.82 | 2765 |
| 9.76 | 9.06 | 2811 |
| 9.39 | 9.41 | 302 |
| 8.40 | 10.53 | 2771 |
| 7.39 | 11.96 | 665 |
| 7.38 | 11.99 | 299 |
| 6.86 | 12.90 | 506 |
| 6.28 | 14.08 | 7 |
| 6.23 | 14.20 | 333 |
| 5.99 | 14.77 | 5844 |
| 5.96 | 14.84 | 7836 |
| 5.67 | 15.63 | 5037 |
| 5.65 | 15.67 | 178 |
| 5.53 | 16.01 | 21 |
| 5.28 | 16.77 | 4365 |
| 5.13 | 17.29 | 2176 |
| 5.05 | 17.55 | 1003 |
| 5.03 | 17.60 | 2180 |
| 5.01 | 17.68 | 5752 |
| 4.88 | 18.17 | 628 |
| 4.70 | 18.86 | 136 |
| 4.69 | 18.89 | 1579 |
| 4.50 | 19.70 | 1477 |
| 4.35 | 20.41 | 1951 |
| 4.34 | 20.42 | 7730 |
| 4.31 | 20.58 | 1144 |
| 4.23 | 20.97 | 1338 |
| 4.20 | 21.15 | 704 |
| 4.18 | 21.22 | 350 |
| 4.10 | 21.68 | 550 |
| 4.08 | 21.76 | 8296 |
| 4.07 | 21.82 | 26189 |
| 4.06 | 21.87 | 5662 |
| 3.99 | 22.26 | 157 |
| 3.98 | 22.31 | 1095 |
| 3.96 | 22.45 | 586 |
| 3.89 | 22.83 | 172 |
| 3.87 | 22.95 | 167 |
| 3.77 | 23.60 | 99 |
| 3.76 | 23.61 | 3806 |
| 3.74 | 23.76 | 15280 |
| 3.73 | 23.86 | 26572 |
| 3.70 | 24.05 | 8030 |
| 3.69 | 24.11 | 369 |
| 3.69 | 24.11 | 6558 |
| 3.68 | 24.17 | 6408 |
| 3.68 | 24.20 | 466 |
| 3.67 | 24.21 | 22260 |
| 3.65 | 24.34 | 146 |
| 3.53 | 25.22 | 12428 |
| 3.51 | 25.35 | 49 |
| 3.51 | 25.39 | 8 |
| 3.50 | 25.40 | 3036 |
| 3.50 | 25.42 | 11525 |
| 3.48 | 25.55 | 154 |
| 3.48 | 25.59 | 19828 |
| 3.45 | 25.78 | 8639 |
| 3.43 | 25.96 | 2678 |
| 3.38 | 26.35 | 1065 |
| 3.36 | 26.54 | 9 |
| 3.31 | 26.90 | 1298 |
| 3.25 | 27.40 | 969 |
| 3.25 | 27.44 | 14 |
| 3.23 | 27.60 | 1171 |
| 3.19 | 27.97 | 1530 |
| 3.14 | 28.39 | 7606 |
| 3.13 | 28.48 | 698 |
| 3.13 | 28.50 | 1122 |
| 3.12 | 28.59 | 1110 |
| 3.12 | 28.63 | 246 |
| 3.11 | 28.73 | 883 |
| 3.10 | 28.74 | 772 |
| 3.09 | 28.84 | 1754 |
| 3.09 | 28.89 | 1299 |
| 3.08 | 28.93 | 31 |
| 3.07 | 29.10 | 328 |
| 3.04 | 29.31 | 1285 |
| 3.04 | 29.39 | 40 |
| 3.02 | 29.55 | 1134 |
| 3.01 | 29.62 | 7660 |
| 3.00 | 29.79 | 215 |
| 2.98 | 29.94 | 787 |

Example 3

The preparation and characterization of crystalline form 1 of [2-(1H-indol-3-yl)ethyl](methyl)propylazanium iodide (MPT iodide) is described below.

Preparation and Characterization of Crystalline Form 1 of [2-(1H-indol-3-yl)ethyl](methyl)propylazanium Iodide (MPT Iodide)

Preparation 104 mg of a commercial sample of N-methyl-N-n-propyltryptamine (The Indole Shop), was dissolved in 5 mL of methanol and 2 mL of isopropyliodide was added. The solution was refluxed for 48 hours. The solvent was removed in vacuo. Crystals suitable for diffraction studies were grown from the evaporation of an acetone/water mixture.

Single Crystal Characterization

The single crystal data and structure refinement parameters for the crystalline form 1 structure of MPT iodide measured at 297 K are reported in Table 13, below.

TABLE 13

| Crystal data | |
|---|---|
| Chemical formula | I·$C_{14}H_{21}N_2$ |
| $M_r$ | 344.23 |
| Crystal system, space group | Orthorhombic, $P2_12_12_1$ |
| Temperature (K) | 297 |
| a, b, c (Å) | 8.1126 (3), 8.7837 (4), 21.1953 (8) |
| α, β, γ (°) | 90, 90, 90 |
| V (Å$^3$) | 1510.35 (11) |
| Z | 4 |
| F(000) | 688 |
| $D_x$ (Mg m$^{-3}$) | 1.514 |
| Radiation type | Mo Kα |
| λ (Å) | 0.71073 |
| θ (°) | 2.7-25.6 |
| μ (mm$^{-1}$) | 2.10 |

TABLE 13-continued

| | |
|---|---|
| Crystal size (mm) | 0.15 x 0.13 x 0.1 |
| BLOCK | colourless |
| | Data collection |
| Diffractometer | Bruker APEX-II CCD |
| Absorption correction | Multi-scan (SADABS2016/2; Bruker, 2016/2) was used. wR2(int) was 0.0583 before and 0.0502 after correction. The Ratio of minimum to maximum transmission is 0.9207. The λ/2 correction factor is not present. |
| $T_{min}$, $T_{max}$ | 0.686, 0.745 |
| No. of measured, independent and observed [I > 2σ(I)] reflections | 27009, 2865, 2748 |
| $R_{int}$ | 0.029 |
| $\theta_{max}$, $\theta_{min}$ (°) | 25.7, 3.6 |
| h, k, l | −9 → 9, −10 → 10, −25 → 25 |
| | Refinement |
| $R[F^2 > 2\sigma(F^2)]$, $wR(F^2)$, S | 0.033, 0.069, 1.21 |
| No. of reflections | 2865 |
| No. of parameters | 231 |
| No. of restraints | 262 |
| H-atom treatment | H atoms treated by a mixture of independent and constrained refinement |
| w | $1/[\sigma^2(F_o^2) + (0.0111P)^2 + 2.3719P]$ where $P = (F_o^2 + 2F_c^2)/3$ |
| $(\Delta/\sigma)_{max}$ | 0.001 |
| $\Delta\rho_{max}$, $\Delta\rho_{min}$ (e Å$^{-3}$) | 0.96, −0.53 |
| Absolute Structure | Refined as an inversion twin |
| Absolute Structure Parameter | 0.24 (6) |

Computer programs: Bruker SAINT; data reduction: Bruker SAINT; program(s) used to solve structure: SHELXS97 (Sheldrick 2008); program(s) used to refine structure: SHELXL 2018/3 (Sheldrick, 2015); molecular graphics: Olex2 1.3 (Dolomanov et al., 2009); software used to prepare material for publication: Olex2 1.3 (Dolomanov et al., 2009)

Figure 8:
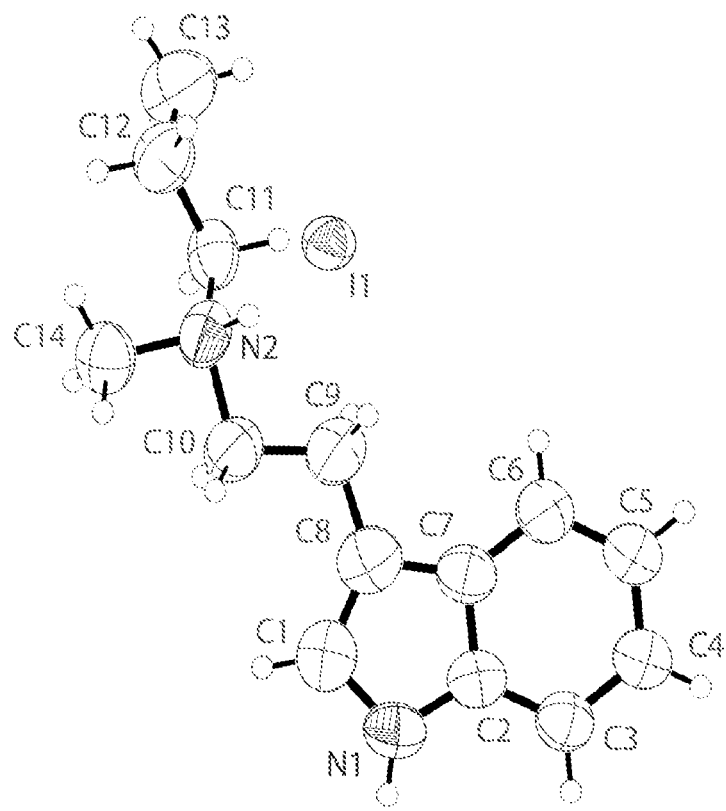
FIG. 8 shows the molecular structure of crystalline form 1 of MPT iodide, showing the atomic labeling.

FIG. 8 shows the molecular structure of crystalline form 1 of MPT iodide, showing the atomic labeling. Displacement ellipsoids are drawn at 50% probability level. Hydrogen bonds are shown as dashed lines.

Figure 9:
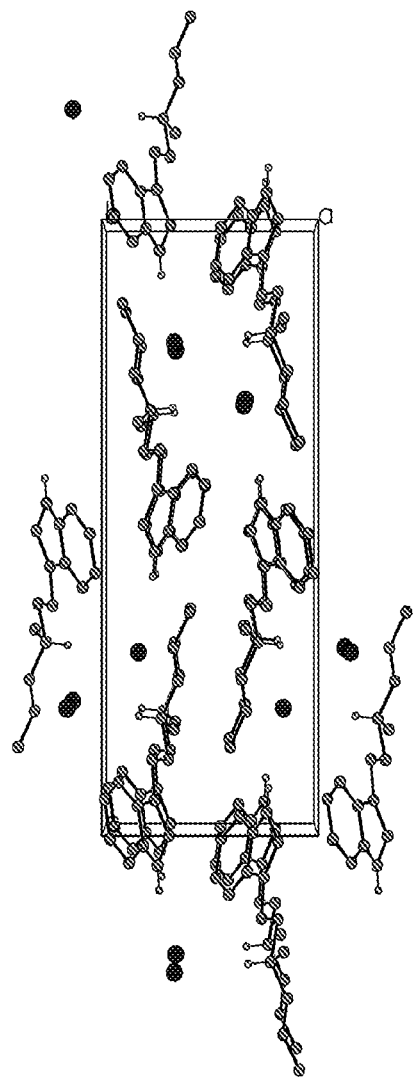
FIG. 9 shows the crystal packing of the crystalline form 1 of MPT iodide, viewed along the b-axis.

FIG. 9 shows the crystal packing of crystalline form 1 of MPT iodide, viewed along the b-axis. The N—H⋯O and O—H⋯O hydrogen bonds are shown as dashed lines. Displacement ellipsoids are drawn at the 50% probability level.

Simulated X-Ray Powder Diffraction (XRPD) Pattern

Figure 10:
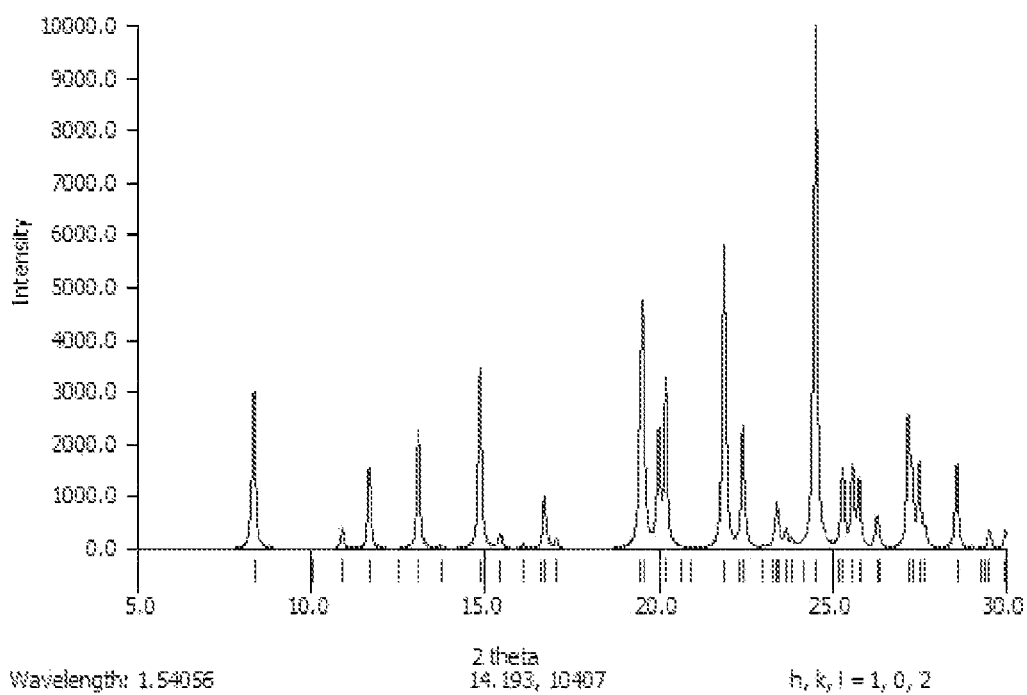
FIG. 10 shows a simulated X-ray powder diffraction pattern (XRPD) for crystalline form 1 of MPT iodide generated from its single crystal data.

FIG. 10 shows a simulated X-ray powder diffraction pattern (XRPD) for crystalline form 1 of MPT iodide generated from its single crystal data. Table 14 lists the angles, °2θ±0.2°2θ, and d-spacing of the peaks identified in the experimental XRPD pattern of FIG. 10. The entire list of peaks, or a subset thereof, may be sufficient to characterize the cocrystal. For example, the cocrystal may be characterized by at least two peaks selected from the peaks at 8.3, 11.7, 13.1, and 14.9°2θ±0.2°2θ or their corresponding d-spacing as well as by a XRPD pattern substantially similar to FIG. 10.

TABLE 14

| d-spacing (Å) | 2(Theta deg) | Intensity |
|---|---|---|
| 10.60 | 8.34 | 16673 |
| 8.11 | 10.89 | 3700 |
| 7.58 | 11.67 | 17335 |
| 6.76 | 13.08 | 31282 |
| 6.44 | 13.74 | 984 |
| 5.96 | 14.85 | 61952 |
| 5.74 | 15.43 | 5382 |
| 5.51 | 16.09 | 2054 |
| 5.33 | 16.63 | 42 |
| 5.30 | 16.72 | 22983 |
| 5.19 | 17.06 | 4289 |
| 4.56 | 19.47 | 69581 |
| 4.54 | 19.55 | 127905 |
| 4.44 | 20.00 | 68398 |
| 4.39 | 20.20 | 105427 |
| 4.30 | 20.64 | 89 |
| 4.06 | 21.89 | 168900 |
| 4.06 | 21.89 | 67938 |
| 3.98 | 22.30 | 1399 |
| 3.96 | 22.43 | 96326 |
| 3.86 | 23.01 | 1334 |
| 3.82 | 23.28 | 975 |
| 3.80 | 23.39 | 34931 |
| 3.79 | 23.46 | 11686 |
| 3.76 | 23.66 | 15695 |
| 3.73 | 23.84 | 7689 |
| 3.68 | 24.15 | 835 |
| 3.63 | 24.51 | 62678 |
| 3.63 | 24.51 | 440374 |
| 3.53 | 25.19 | 3260 |
| 3.52 | 25.30 | 76798 |
| 3.48 | 25.59 | 82234 |
| 3.45 | 25.77 | 68853 |
| 3.39 | 26.28 | 30929 |
| 3.38 | 26.34 | 13159 |
| 3.28 | 27.19 | 145124 |
| 3.27 | 27.29 | 77406 |
| 3.24 | 27.52 | 99152 |
| 3.22 | 27.67 | 18689 |
| 3.12 | 28.58 | 111429 |
| 3.05 | 29.26 | 756 |
| 3.04 | 29.37 | 47 |
| 3.02 | 29.51 | 27818 |
| 2.98 | 29.96 | 27796 |

Example 4

The preparation and characterization of crystalline form 1 of bis(ethyl[2-(1H-indol-3-yl)ethyl]propylazanium) (2E)-but-2-enedioate (EPT fumarate) is described below.

Preparation and Characterization of Crystalline Form 1 of bis(ethyl[2-(1H-indol-3-yl)ethyl]propylazanium) (2E)-but-2-enedioate (EPT fumarate)

Preparation

A commercial sample of N-ethyl-N-n-propyltryptamine hydrofumarate (ChemLogix, 150 mg, 0.43 mmol) was dissolved in 15 ml of water and treated with one equivalent of lead (II) acetate (164 mg, 0.43 mmol). Lead (II) fumarate precipitated and was filtered. Water was removed in vacuo and the resulting residue was triturated with acetone and filtered. The filtrate was allowed to evaporate slowly, resulting in transparent single crystals suitable for X-ray analysis.

Single Crystal Characterization

The single crystal data and structure refinement parameters for the crystalline form 1 structure of EPT fumarate are reported in Table 15, below. The data for crystalline form 1 of EPT fumarate in Table 15 relates to the asymmetric unit.

Figure 11:
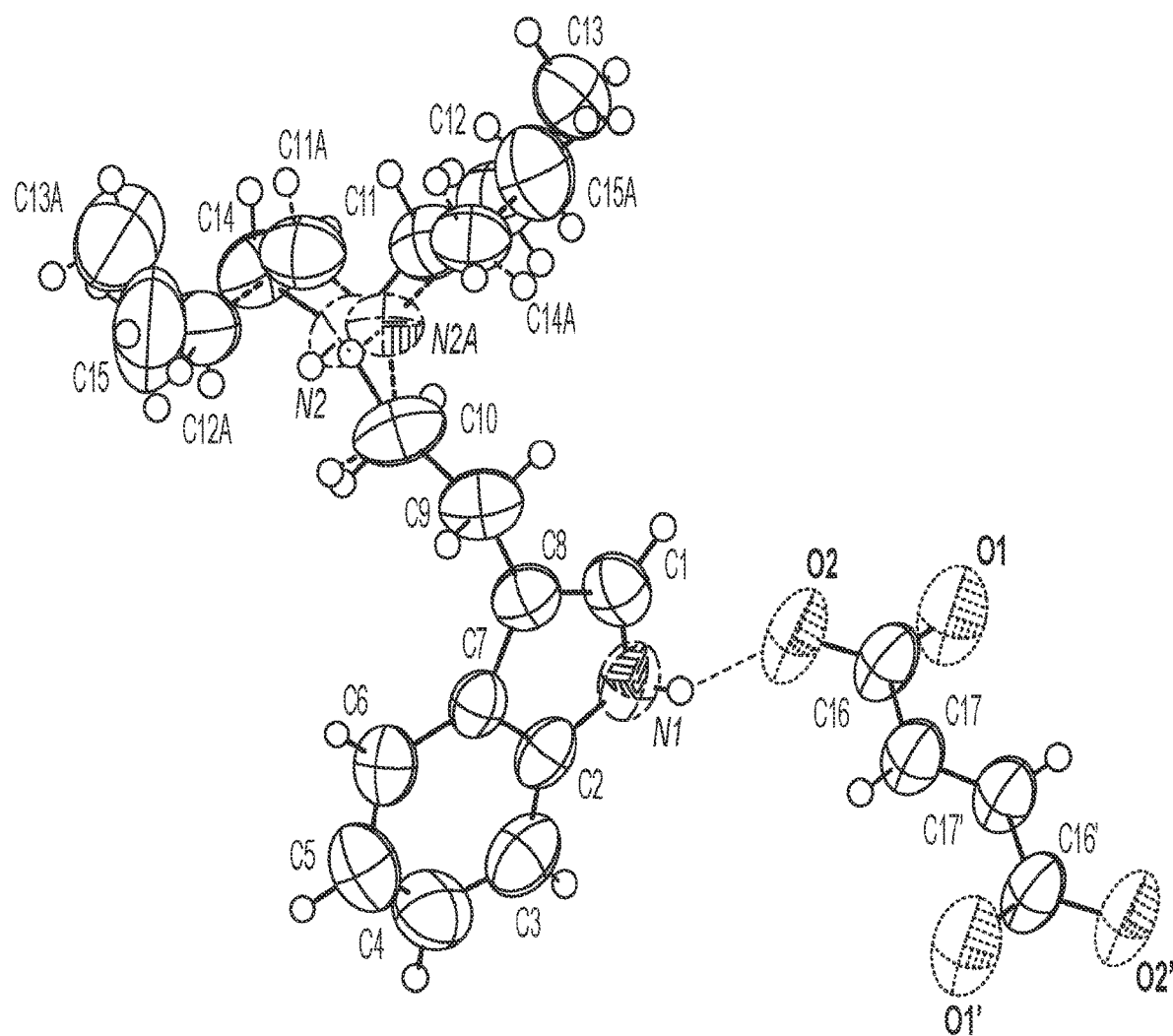
FIG. 11 shows the molecular structure of crystalline form 1 of EPT fumarate.

FIG. 11 shows the molecular structure of crystalline form 1 of EPT fumarate, showing the atomic labeling.

Figure 12:
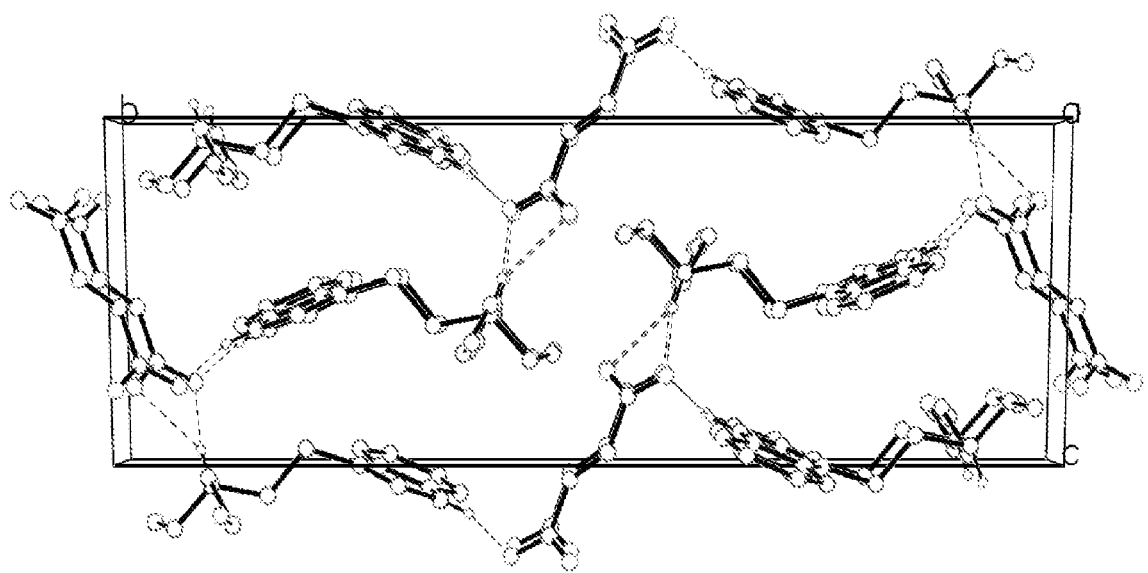
FIG. 12 shows the unit cell of crystalline form 1 of EPT fumarate along the a-axis.

FIG. 12 shows the unit cell of crystalline form 1 of EPT fumarate along the a-axis.

Figure 13:
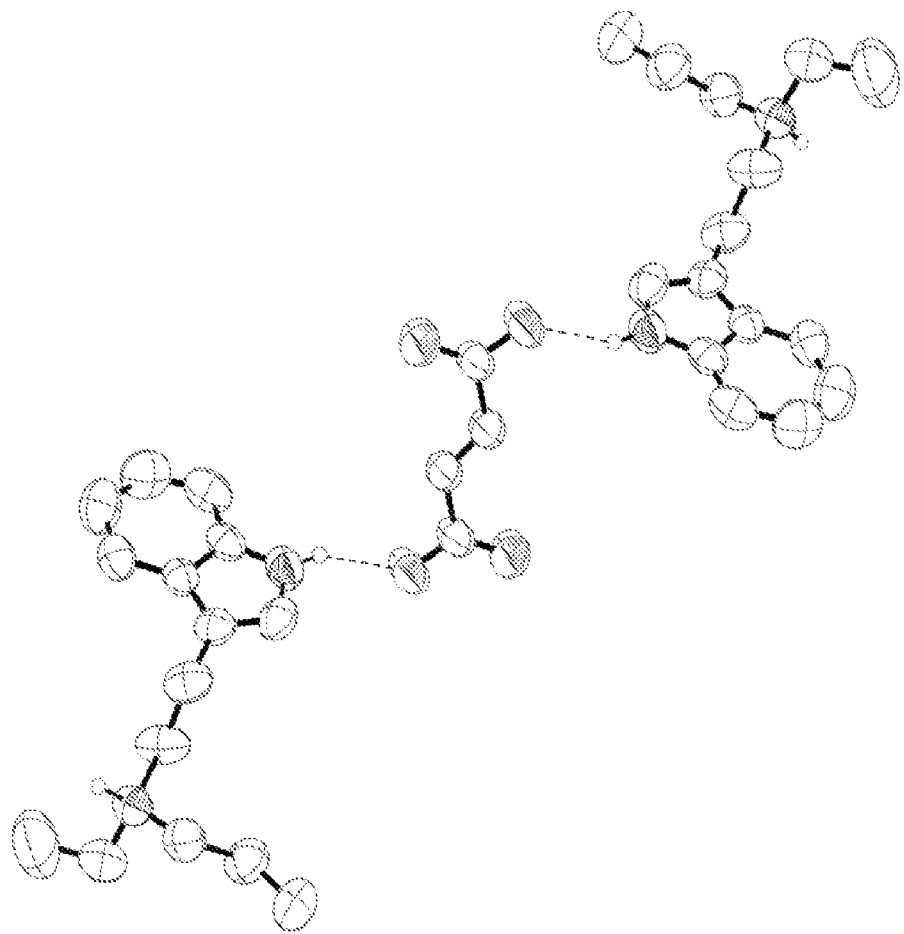
FIG. 13 shows the two to one ratio of crystalline form 1 of EPT fumarate as a dimer.

FIG. 13 shows the two to one ratio of crystalline form 1 of EPT fumarate as a dimer.

Simulated X-Ray Powder Diffraction (XRPD) Pattern

Figure 14:
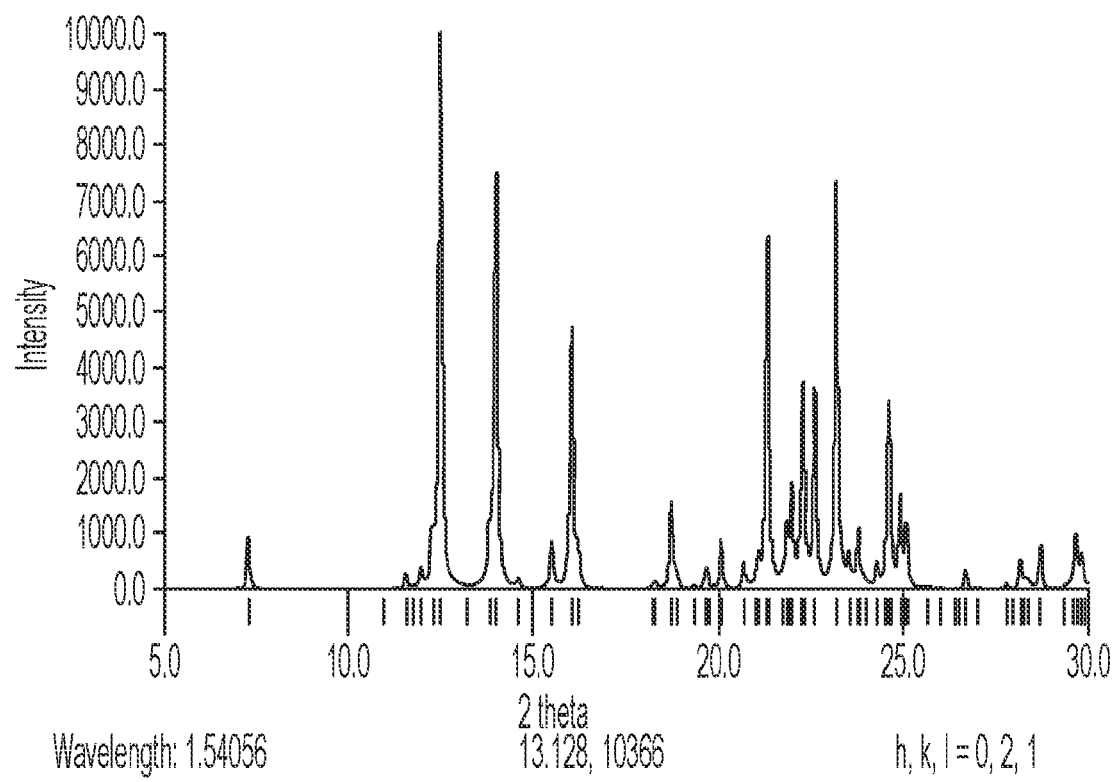
FIG. 14 shows the simulated X-ray powder diffraction pattern (XRPD) for crystalline form 1 of EPT fumarate.

FIG. 14 shows a simulated X-ray powder diffraction pattern (XRPD) for crystalline form 1 of EPT fumarate generated from its single crystal data. Table 16 lists the angles, °2θ±0.2°2θ, and d-spacing of the peaks identified in the experimental XRPD pattern of FIG. 14. The entire list of peaks, or a subset thereof, may be sufficient to characterize the cocrystal. For example, the cocrystal may be characterized by at least two peaks selected from the peaks at 7.3, 12.5, and 14.0°2θ±0.2°2θ or their corresponding d-spacing as well as by a XRPD pattern substantially similar to FIG. 14.

TABLE 16

| d-spacing (Å) | 2(Theta deg) | Intensity |
|---|---|---|
| 12.14 | 7.3 | 1073.0 |
| 7.66 | 11.5 | 730.4 |
| 7.41 | 11.9 | 988.4 |

TABLE 15

| Crystal data | |
|---|---|
| Chemical formula | $C_{15}H_{23}N_2 \cdot C_2HO_2$ |
| $M_r$ | 288.38 |
| Crystal system, space group | Monoclinic, $P2_1/n$ |
| Temperature (K) | 297 |
| a, b, c (Å) | 8.4443 (7), 24.284 (2), 9.0222 (8) |
| β (°) | 116.548 (2) |
| V (Å$^3$) | 1655.0 (2) |
| Z | 4 |
| F(000) | 624 |
| $D_x$ (Mg m$^{-3}$) | 1.157 |
| Radiation type | Mo Kα |
| λ (Å) | 0.71073 |
| θ (°) | 2.7-25.5 |
| μ (mm$^{-1}$) | 0.08 |
| Crystal size (mm) | 0.45 × 0.18 × 0.04 |
| BLOCK | Colourless |
| Data collection | |
| Diffractometer | Bruker APEX-II CCD |
| Absorption correction | Multi-scan SADABS (Bruker, 2016) was used. wR2(int) was 0.0603 before and 0.0531 after correction. The Ratio of minimum to maximum transmission is 0.9175. The λ/2 correction factor is not present. |
| $T_{min}$, $T_{max}$ | 0.684, 0.745 |
| No. of measured, independent, and observed [I > 2σ(I)] reflections | 45923, 3192, 2205 |
| $R_{int}$ | 0.053 |
| $\theta_{max}$, $\theta_{min}$ (°) | 25.9, 2.8 |
| h, k, l | −10 → 10, −29 → 29, −11 → 11 |
| Refinement | |
| R[F$^2$ > 2σ(F$^2$)], wR(F$^2$), S | 0.068, 0.183, 1.03 |
| No. of reflections | 3192 |
| No. of parameters | 245 |
| No. of restraints | 82 |
| H-atom treatment | H atom parameters constrained |
| w | $1/[\sigma^2(F_o^2) + (0.063P)^2 + 0.8691P]$ where $P = (F_o^2 + 2F_c^2)/3$ |
| $(\Delta/\sigma)_{max}$ | <0.001 |
| $\Delta\rho_{max}$, $\Delta\rho_{min}$ (e Å$^{-3}$) | 0.25, −0.18 |

Data collection: Bruker APEX32; cell refinement: Bruker SAINT; data reduction: Bruker SAINT; program(s) used to solve structure: SHELXS97 (Sheldrick 2008); program(s) used to refine structure: SHELXL 2018/3 (Sheldrick, 2015); molecular graphics: Olex2 1.3 (Dolomanov et al., 2009); software used to prepare material for publication: Olex2 1.3 (Dolomanov et al., 2009).

TABLE 16-continued

| d-spacing (Å) | 2(Theta deg) | Intensity |
|---|---|---|
| 7.21 | 12.3 | 2478.0 |
| 7.09 | 12.5 | 34021.7 |
| 6.72 | 13.2 | 188.8 |
| 6.41 | 13.8 | 3990.3 |
| 6.32 | 14.0 | 33088.5 |
| 6.07 | 14.6 | 637.6 |
| 5.72 | 15.5 | 4542.8 |
| 5.52 | 16.0 | 26787.5 |
| 5.47 | 16.2 | 3401.2 |
| 4.85 | 18.3 | 1261.2 |
| 4.73 | 18.7 | 12233.7 |
| 4.70 | 18.9 | 1846.1 |
| 4.59 | 19.3 | 452.3 |
| 4.51 | 19.7 | 3477.1 |
| 4.41 | 20.1 | 7845.6 |
| 4.29 | 20.7 | 4249.8 |
| 4.21 | 21.1 | 4928.0 |
| 4.16 | 21.3 | 46978.8 |
| 4.16 | 21.3 | 18444 |
| 4.09 | 21.7 | 2223.1 |
| 4.06 | 21.9 | 9911.2 |
| 4.05 | 21.9 | 273.1 |
| 4.04 | 22.0 | 18593.8 |
| 3.99 | 22.3 | 8069.0 |
| 3.99 | 22.3 | 424.9 |
| 3.98 | 22.3 | 37355.9 |
| 3.93 | 22.6 | 41155.2 |
| 3.83 | 23.2 | 90927.2 |
| 3.78 | 23.5 | 6456.7 |
| 3.74 | 23.8 | 3811.5 |
| 3.73 | 23.8 | 11905.8 |
| 3.70 | 24.0 | 638.3 |
| 3.66 | 24.3 | 4379.0 |
| 3.66 | 24.3 | 1041.1 |
| 3.62 | 24.6 | 5087.4 |
| 3.61 | 24.6 | 30922.5 |
| 3.61 | 24.6 | 10355.6 |
| 3.61 | 24.7 | 3849.1 |
| 3.57 | 24.9 | 21798.7 |
| 3.55 | 25.0 | 58.8 |
| 3.54 | 25.1 | 15775.1 |
| 3.47 | 25.7 | 6.5 |
| 3.42 | 26.0 | 876.0 |
| 3.37 | 26.4 | 32.5 |
| 3.36 | 26.5 | 257.7 |
| 3.33 | 26.7 | 5508.7 |
| 3.30 | 27.0 | 744.8 |
| 3.21 | 27.8 | 1643.8 |
| 3.19 | 28.0 | 171.6 |
| 3.19 | 28.0 | 128.1 |
| 3.16 | 28.2 | 9714.7 |
| 3.15 | 28.3 | 507.9 |
| 3.14 | 28.4 | 3693.8 |
| 3.10 | 28.7 | 14247.7 |
| 3.03 | 29.4 | 821.5 |
| 3.03 | 29.4 | 480.5 |
| 3.02 | 29.6 | 2088.8 |
| 3.00 | 29.7 | 19134 |
| 2.99 | 29.8 | 11121.1 |
| 2.98 | 29.9 | 1799.2 |

REFERENCES

Dolomanov, O. V., Bourhis, L. J., Gildea, R. J., Howard, J. A. K. & Puschmann, H. (2009). J. Appl. Cryst. 42, 339-341.

Sheldrick, G. M. (2015). Acta Cryst. C71, 3-8.

The invention claimed is:

1. Crystalline form 1 of [2-(1H-indol-3-yl)ethyl](methyl)propylazanium iodide (MPT iodide), characterized by at least one of:
    an orthorhombic crystal system at a temperature of about 297 K;
    a $P2_12_12_1$ space group at a temperature of about 297 K;
    unit cell dimensions a=8.1126 (3) Å, b=8.7837 (4) Å, and c=21.1953 (8) Å;
    an x-ray powder diffraction (XRPD) pattern substantially similar to FIG. 10; or
    an X-ray powder diffraction pattern characterized by peaks at 8.3, 11.7, 13.1, and 14.9°2θ±0.2°2θ.

2. A composition comprising crystalline form 1 of MPT iodide according to claim 1 and an excipient.

3. A composition comprising crystalline form 1 of MPT iodide according to claim 1 as a first component and a second component selected from at least one of (a) a serotonergic drug, (b) a purified psilocybin derivative, (c) a purified cannabinoid, (d) a purified terpene, (e) an adrenergic drug, (f) a dopaminergic drug, (g) a monoamine oxidase inhibitor, (h) a purified erinacine, or (i) a purified hericenone.

* * * * *